MAGNETIC DRUM TRANSLATOR

INVENTORS
John R. Maneschi
Joseph E. Meschi
Verner K. Rice
John G. Van Bosse
Lawrence W. Amiot

BY

ATTY

Jan. 17, 1967 J. R. MANESCHI ETAL 3,299,212

MAGNETIC DRUM TRANSLATOR

Filed March 27, 1963 34 Sheets-Sheet 3

MAGNETIC DRUM TRANSLATOR

MAGNETIC DRUM TRANSLATOR

Filed March 27, 1963 34 Sheets-Sheet 6

Jan. 17, 1967 J. R. MANESCHI ET AL 3,299,212

MAGNETIC DRUM TRANSLATOR

Filed March 27, 1963 34 Sheets-Sheet 7

Jan. 17, 1967 J. R. MANESCHI ETAL 3,299,212

MAGNETIC DRUM TRANSLATOR

Filed March 27, 1963 34 Sheets-Sheet 8

Jan. 17, 1967 J. R. MANESCHI ETAL 3,299,212

MAGNETIC DRUM TRANSLATOR

Filed March 27, 1963 34 Sheets-Sheet 9

Jan. 17, 1967 J. R. MANESCHI ETAL 3,299,212

MAGNETIC DRUM TRANSLATOR

Filed March 27, 1963 34 Sheets-Sheet 11

Jan. 17, 1967 J. R. MANESCHI ETAL 3,299,212

MAGNETIC DRUM TRANSLATOR

Filed March 27, 1963 34 Sheets-Sheet 13

Jan. 17, 1967 J. R. MANESCHI ETAL 3,299,212

MAGNETIC DRUM TRANSLATOR

Filed March 27, 1963 34 Sheets-Sheet 14

Jan. 17, 1967 J. R. MANESCHI ETAL 3,299,212

MAGNETIC DRUM TRANSLATOR

Filed March 27, 1963 34 Sheets-Sheet 15

Jan. 17, 1967 J. R. MANESCHI ET AL 3,299,212

MAGNETIC DRUM TRANSLATOR

Filed March 27, 1963 34 Sheets-Sheet 19

INFORMATION TRANSFER CONNECTIONS

PARALLEL INFORMATION TRANSFER

MAGNETIC DRUM TRANSLATOR

Filed March 27, 1963 34 Sheets-Sheet 25

PULSE TIMING

Jan. 17, 1967 J. R. MANESCHI ETAL 3,299,212

MAGNETIC DRUM TRANSLATOR

Filed March 27, 1963 34 Sheets-Sheet 28

PULSE TIMING TOLERANCES

SIP AND ASIP GENERATION

Jan. 17, 1967 J. R. MANESCHI ETAL 3,299,212

MAGNETIC DRUM TRANSLATOR

Filed March 27, 1963 34 Sheets-Sheet 33

Jan. 17, 1967 J. R. MANESCHI ET AL 3,299,212

MAGNETIC DRUM TRANSLATOR

Filed March 27, 1963 34 Sheets-Sheet 34

United States Patent Office 3,299,212

Patented Jan. 17, 1967

3,299,212

MAGNETIC DRUM TRANSLATOR

John R. Maneschi, Oak Park, Joseph E. Meschi and Verner K. Rice, Elmhurst, John G. Van Bosse, Park Ridge, and Lawrence W. Amiot, Villa Park, Ill., assignors to Automatic Electric Laboratories, Inc., Northlake, Ill., a corporation of Delaware Filed Mar. 27, 1963, Ser. No. 268,384

18 Claims. (Cl. 179—18)

The present invention relates to automatic telecommunication exchange systems generally, and more particularly to electronic translating arrangements for use in such systems.

The invention is particularly, but not exclusively, adapted for use in automatic crosspoint telephone switching systems of the type disclosed in the copending application of Ronald E. Schauer, Kenneth E. Prescher, John G. Van Bosse, and Alfred C. Lange, entitled "Register-Sender Arrangement for a Communication Switching System" filed March 27, 1963, Serial No. 268,385.

It is an improvement over the translator of the prior U.S. application Serial No. 231,627, filed October 19, 1962, of Edward J. Glenner, directed to a translator using magnetic drum techniques, now U.S. Patent No. 3,194,892 issued July 13, 1965.

The present invention provides the additional features and modifications necessary to the previously described translator to render it fully compatible and reliable for use in a commercial embodiment.

In accordance with an object of the present invention a greatly improved translator is provided.

A feature of this invention is the division of storage of the subscriber's switching instructions into odd and even thousands digit segments on the drum.

Another feature of this invention is the use of a modified binary coded decimal value for 1 in the thousands digit of the subscriber's directory number to make the address counter compatible with reading both odd and even thousands simultaneously.

Another feature of this invention is the use of two different address counters, one for directory number translation and one for line number translation.

Another feature of this invention is the use of common registers and coincidence circuit for both line number translations and directory number translations.

Still another feature of this invention is the ues of a control circuit involving only four different states, idle, receive, process and send and of three particular modes, write, directory number and line number.

The above mentioned and other objects and features of this invention and the manner of attaining them will become more apparent, and the invention itself will be best understood, by reference to the following description of an embodiment of the invention taken in conjunction with the accompanying drawings comprising FIGS. 1–37 wherein:

FIGS. 1–3 when arranged as shown in FIG. 20A comprise a block diagram of a telephone switching exchange;

FIGS. 4–19 when arranged as shown in FIG. 20B comprise an overall schematic of the translator.

FIG. 32 is a timing diagram for allotter lock in;

Figure 33A:
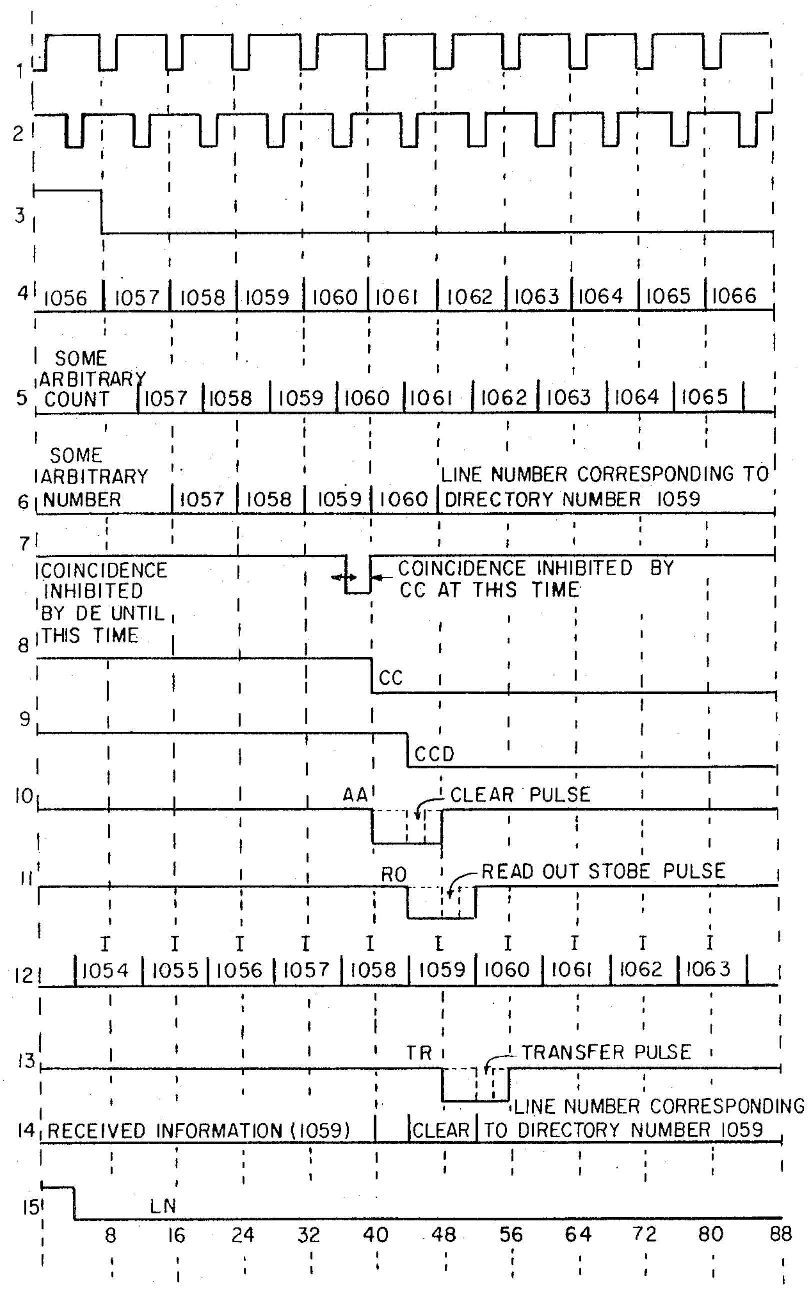
Figure 33B:
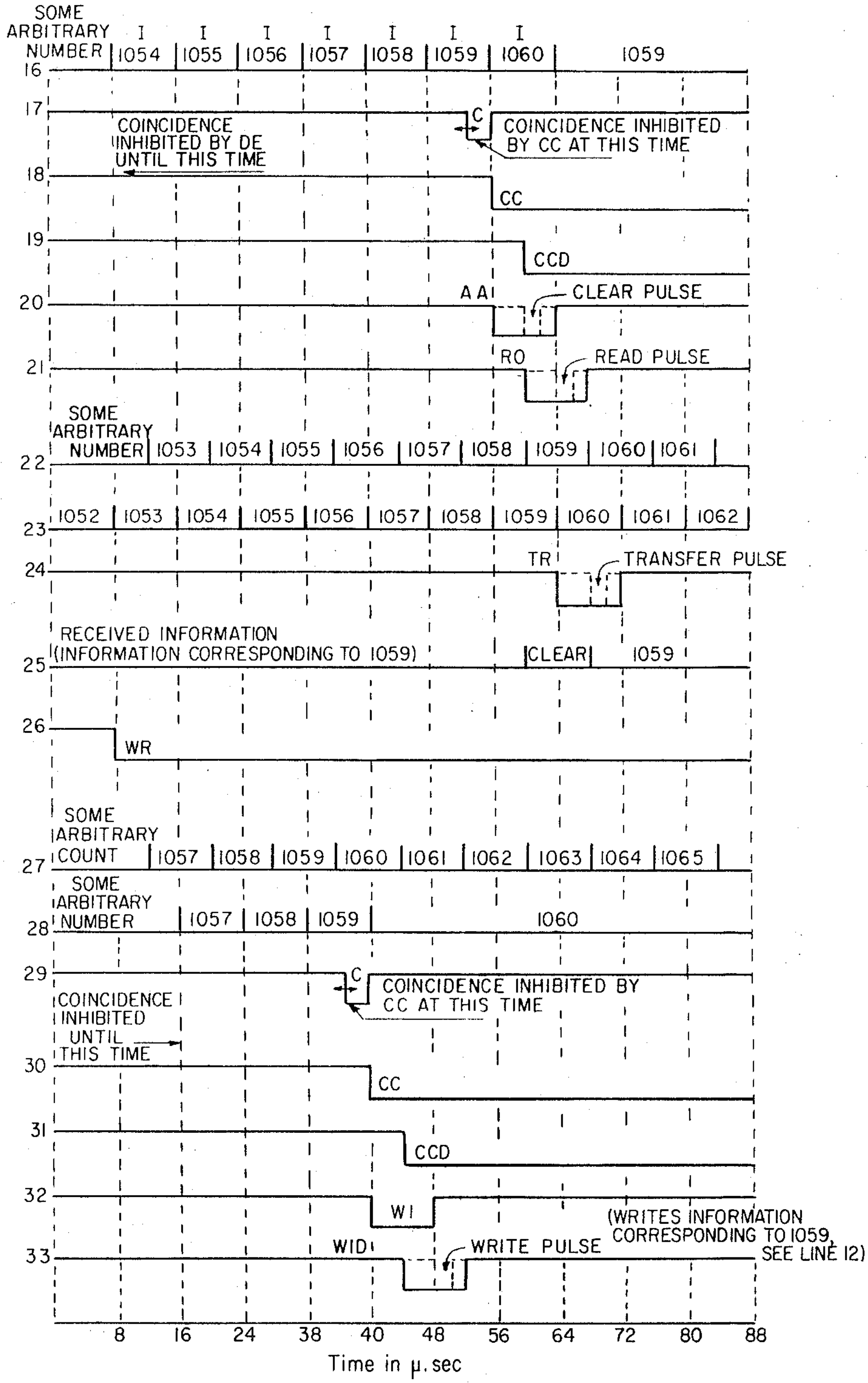
Figure 34:
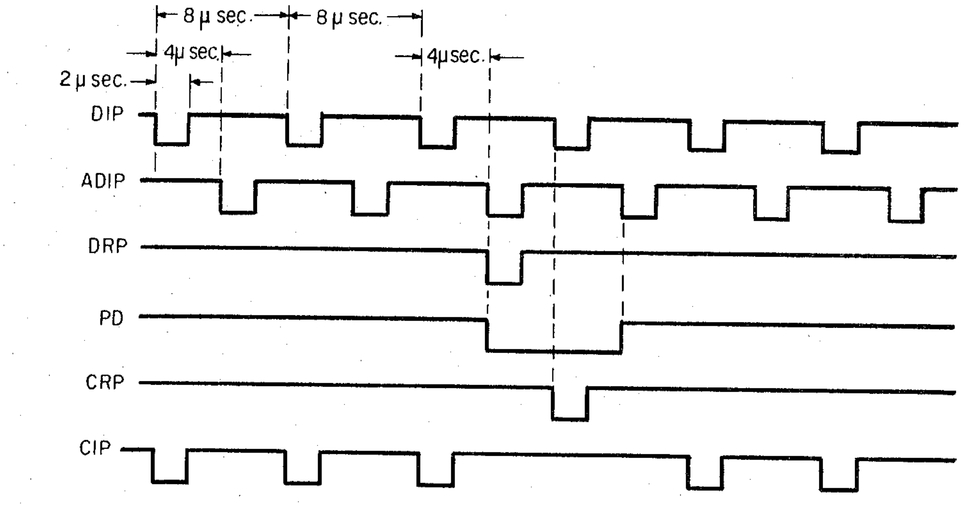
Figure 35:
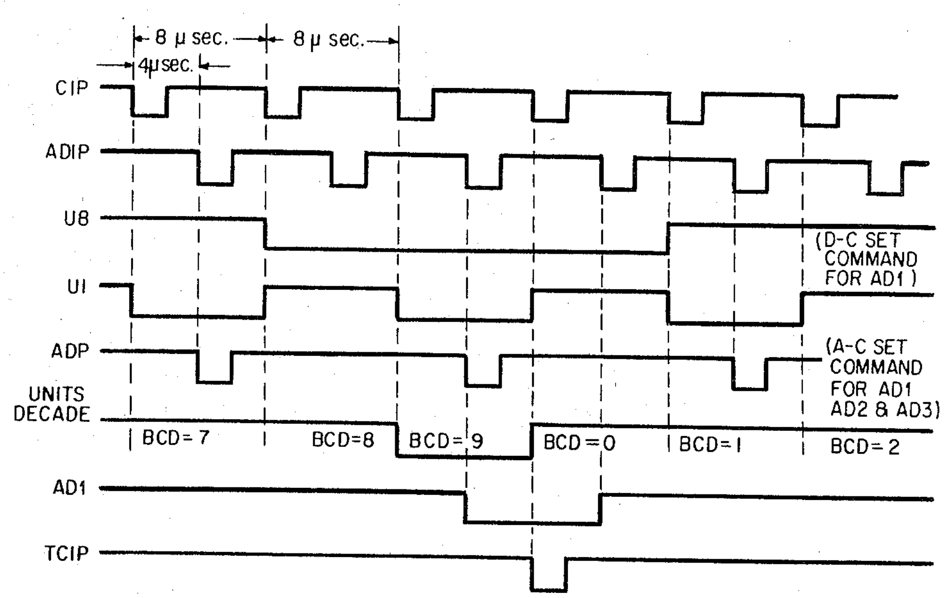
Figure 36:
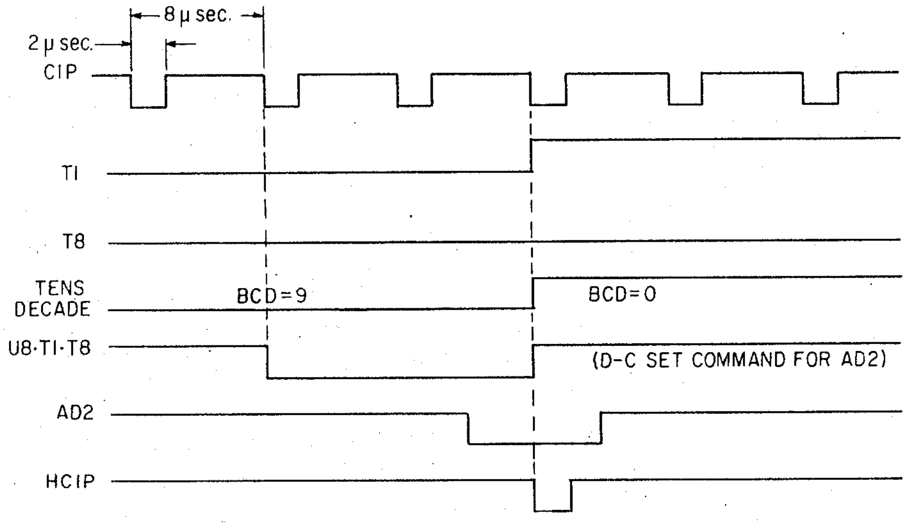
Figure 37:
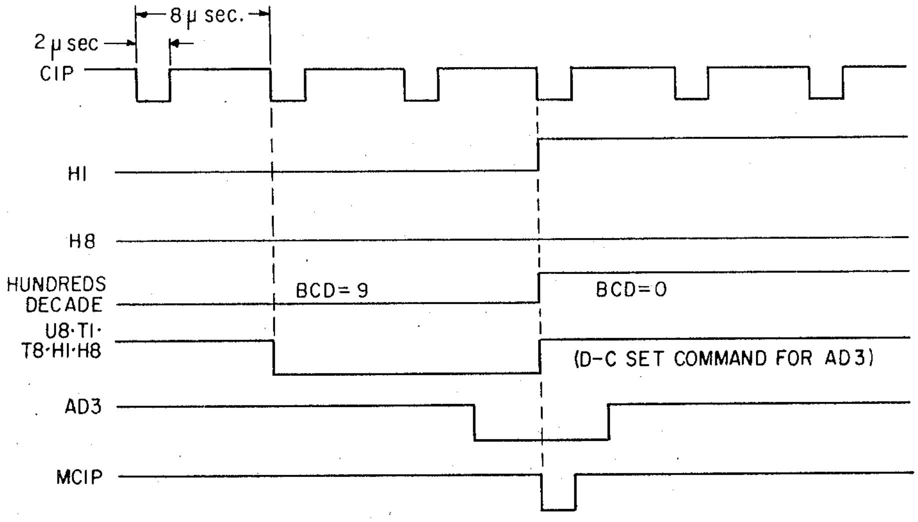

FIGS. 33A and 33B comprise a translator process timing diagram;

FIG. 34 is a timing diagram for the CRP and CIP generation;

FIGS. 35, 36 and 37 show the advance circuit timing for TCIP generation, HCIP generation and MCIP generation respectively.

The system is explained according to the following outline:

TABLE OF CONTENTS

Introduction

CHAPTER 1—General System Description 1.1 The general trunking diagram
1.2 Typical call
1.3 General description of the translator
1.4 Characteristics of system
1.5 Communication with register-sender groups CHAPTER 2—Functional Description 2.1 Translator receivers
2.2 Allotter
2.3 Translator access register
2.4 Translator sender
2.5 Console
2.6 Console register
2.7 Control and process coincidence auxiliary circuits
2.8 Coincidence circuit
2.9 Buffer register
2.10 Readout playback and record
2.11 Pulse generator shaping
2.12 Pulse distributor
2.13 Drum counter early
2.14 Drum counter late
2.15 Counter access register
2.16 Time out
2.17 Trouble recorder CHAPTER 3—Outline of Operation 3.1 Scanning
3.2 Receiving
3.3 Processing (DNT, LNT, Write)
3.4 Sending
3.5 Monitoring CHAPTER 4—Information Transfer
4.1 Binary coded decimals
4.2 Parallel transfer
4.3 Allocation of digits within registers
4.4 Input-output sequence
CHAPTER 5—Magnetic Drum Storage
5.1 Magnetic drum
5.2 System description
5.2.1 Magnetic drum
5.2.2 Recording operation
5.2.3 Reading operation
5.2.4 Information recovery
CHAPTER 6—Pulse Generation and Distribution
6.1 Pulse trains and tolerances
6.2 Derivation of pulse trains
6.3 Phonic disc circuitry
6.4 Pulse distribution
CHAPTER 7—Access and Exit Circuitry
7.1 Introduction
7.2 Sequence of operations
7.3 Translator allotter
7.4 Translator receiver circuit
7.5 Translator access register
7.6 Translator sender circuit
CHAPTER 8—Local Access and Exit Circuitry
8.1 Introduction
8.2 Sequence of operations
8.3 Console display panel
8.4 Console register circuit
8.5 Translator allotter
8.6 Translator access register
8.7 Translator receiver circuit
CHAPTER 9—The Control
9.1 General
9.2 IDLE state
9.3 RECEIVE state
9.4 PROCESS state
9.5 SEND state
9.6 H flip-flop
CHAPTER 10—The Translator in the Process State
10.1 General
10.2 Translator access register before coincidence
10.3 Buffer register before coincidence
10.4 Finding coincidence
10.5 Translator process timing
10.6 Buffer register after coincidence
10.7 Translator access register after coincidence
CHAPTER 11—Drum Address Circuitry
11.1 Introduction
11.2 Sequence of operations
11.3 Drum counter early
11.4 Drum counter late
11.5 Counter access register
CHAPTER 12—Auxiliary Circuits
12.1 Introduction
12.2 Translator time out circuit
12.3 Translator trouble recorder.

CHAPTER 1—GENERAL SYSTEM DESCRIPTION

The system arrangement and the components used are generally similar to those described in the following patent applications:

K. K. Spellnes, Communication Switching System, Serial No. 230,887 filed October 16, 1962, now U.S. Patent No. 3,170,041 issued February 16, 1965;

K. K. Spellnes et al., Communication Switching System, Serial No. 240,497 filed November 28, 1962;

K. E. Prescher et al., Communication Switching System Common Control, Serial No. 231,625 filed October 19, 1962, now U.S. Patent No. 3,173,994 issued March 16, 1965;

E. J. Glenner, Translator, Serial No. 231,627 filed October 19, 1962, now U.S. Patent No. 3,194,892 issued July 13, 1965.

Figure 1:
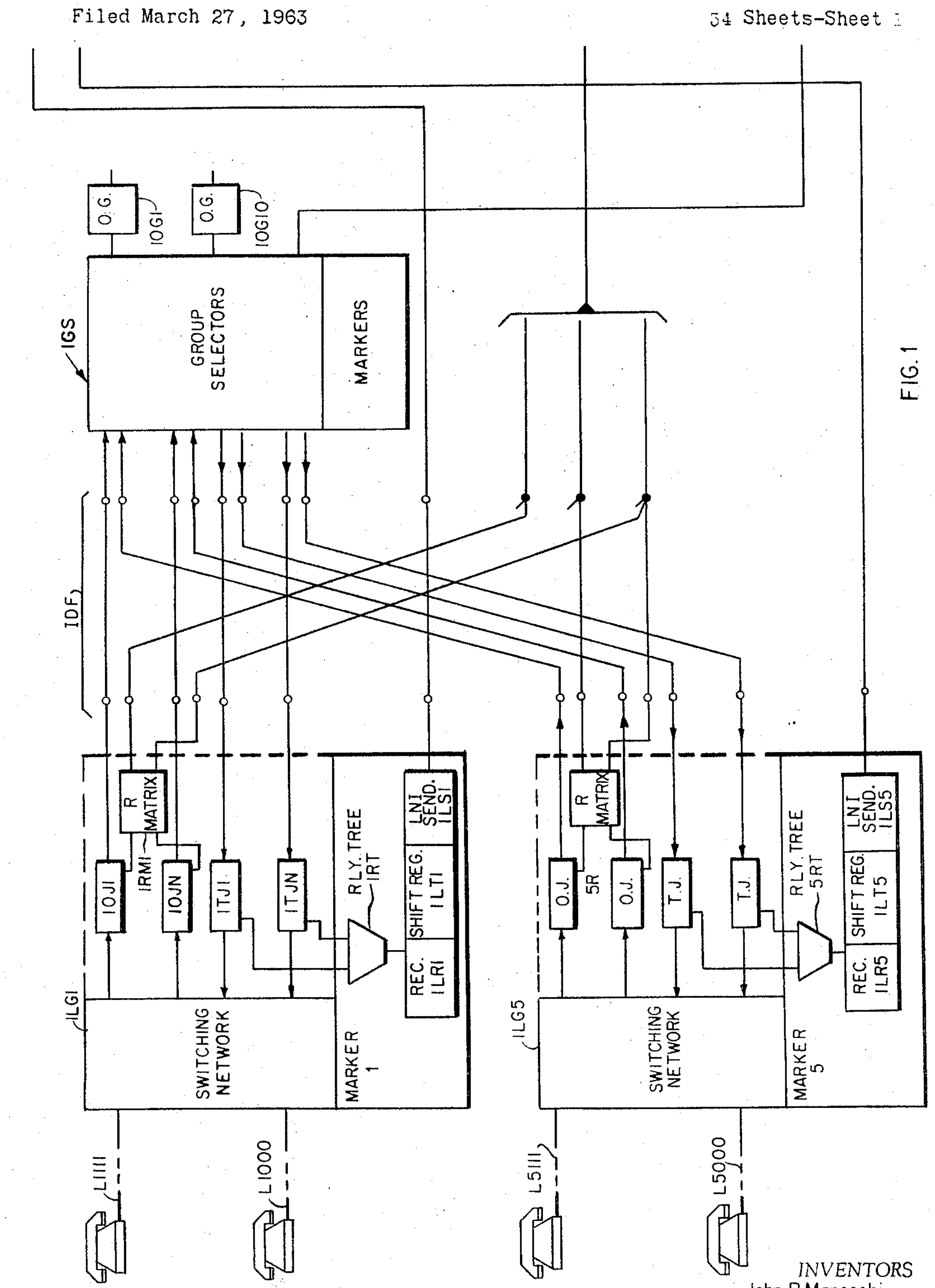
Figure 2:
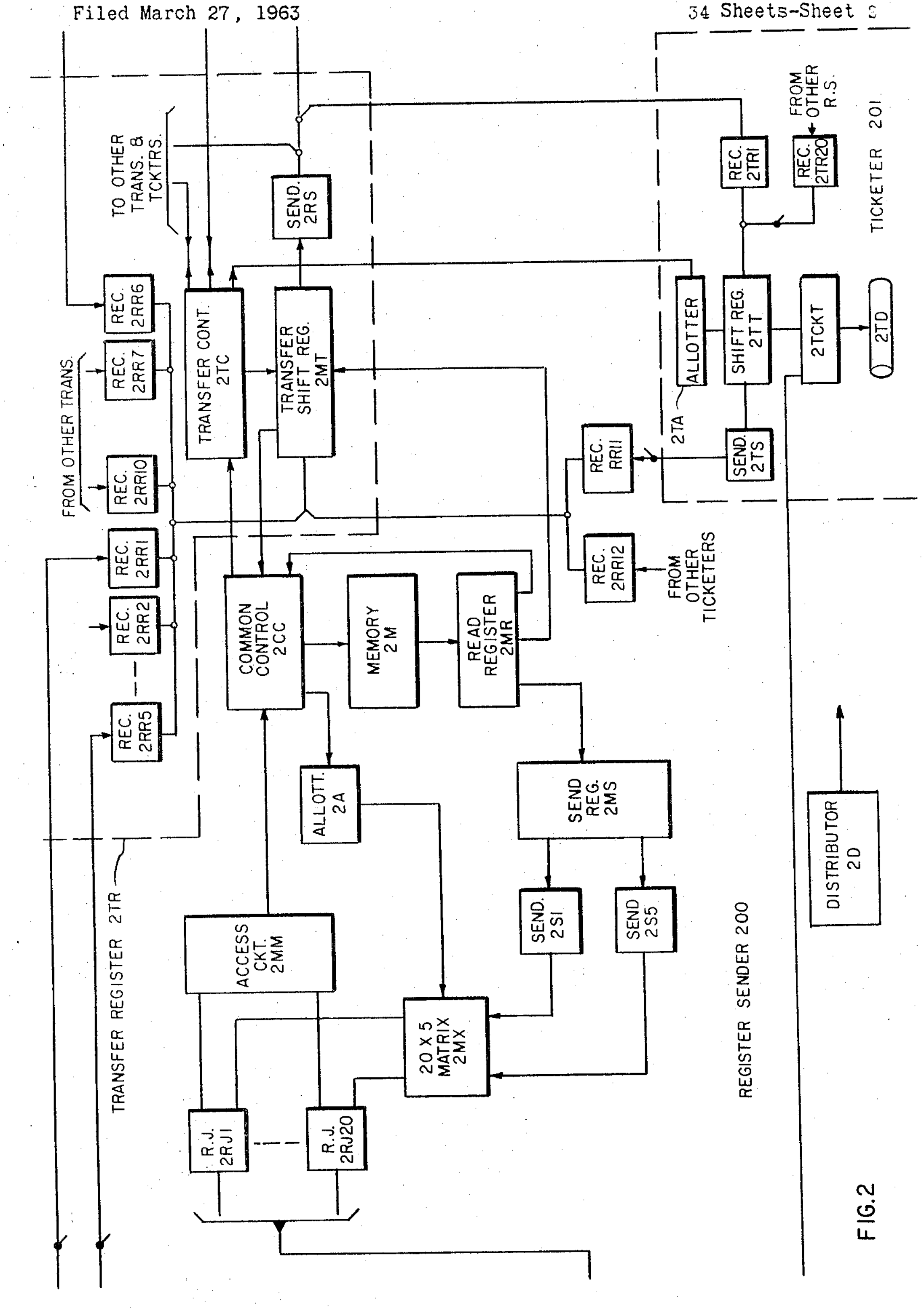
Figure 3:
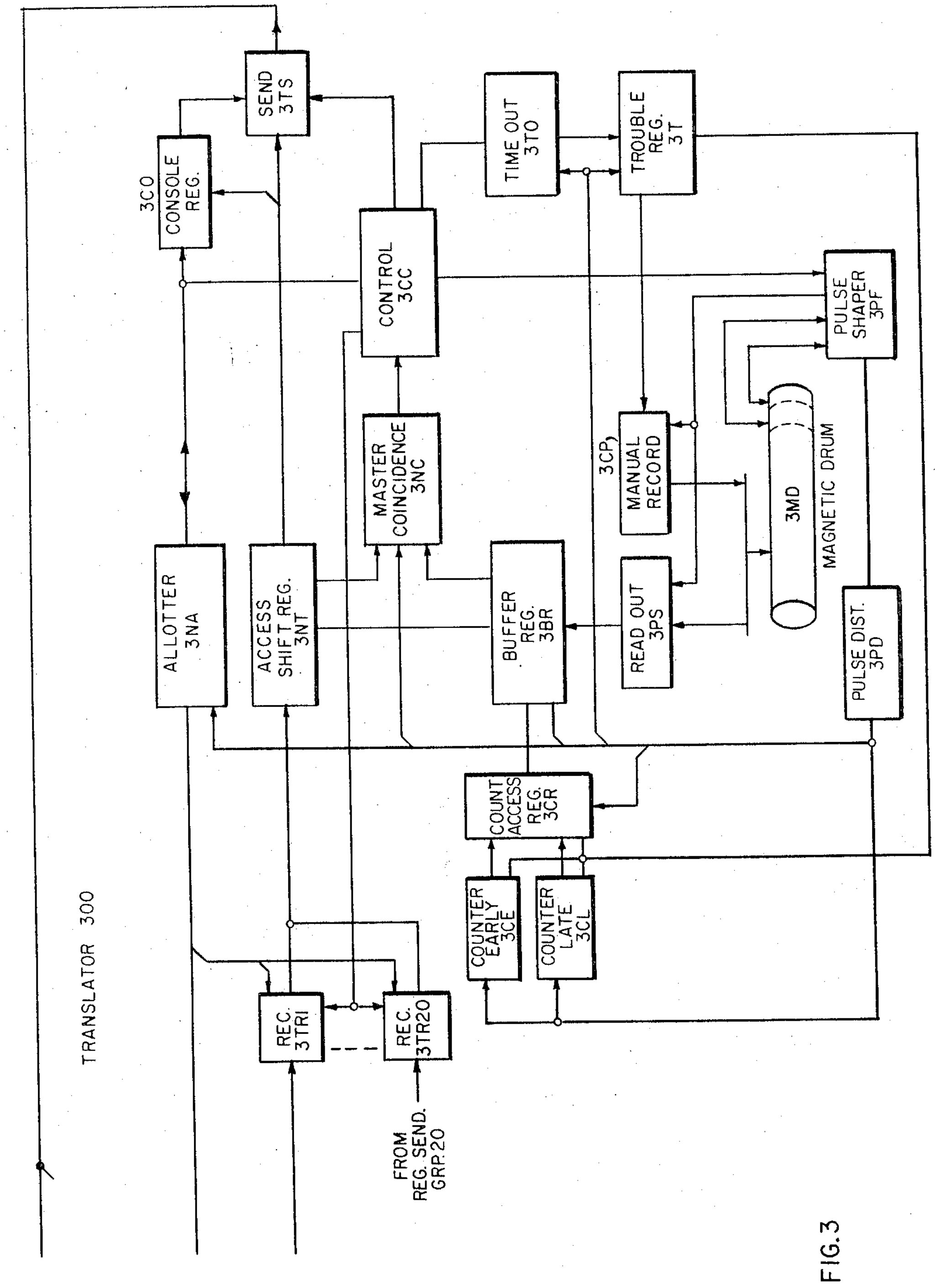
Figure 20A:
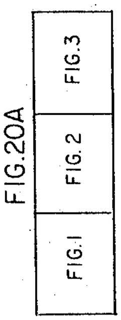
FIGS. 20A and 20B illustrate the manner of combining FIGS. 1–3 and 4–19 respectively.
Figure 20B:
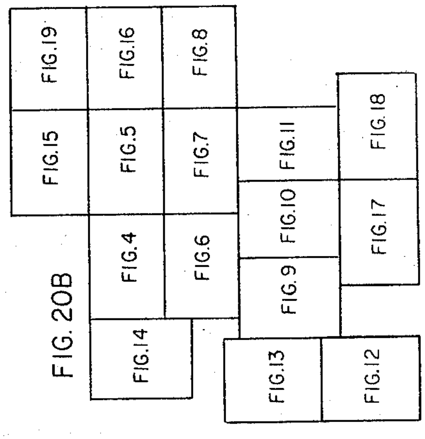

1.1 *The general trunking diagram.*—A general trunking block diagram is shown in FIGS. 1, 2 and 3 arranged as shown in FIG. 20A. The system consists of four basic system sections; namely, the line groups 1LG1–1LG5, the group selectors 1GS, the register-sender group 200, and the translator group 300. Each of these sections is self-contained and controlled by its own clock circuitry and operates independently and not in synchronism with any other section. A minimum of two register-sender groups 200 will be equipped per office and the translator 300, including its magnetic drum 3MD and logic circuitry, will always be furnished in pairs per 10,000 director numbers.

Time division techniques are used in the register-sender group 200 and in the translator 300. The line group and selector markers are designed on an electronic basis and semiconductor circuitry is employed throughout the system. A ferrite core memory 2M is used for temporary storage in the register-sender group, whereas the magnetic drum 3MD is used for semipermanent storage. The space division switching elements of the system consist of reed relay matrix assemblies; in which the cross points are made up of reed capsules normally having two windings.

The line groups and group selectors perform the switching by way of reed relay matrix assemblies in crosspoint configurations; each crosspoint comprising reed capsules and normally two windings. This means that the connections are made by reed relays and the control of these relays is performed by electronic circuitry. The line groups 1LG1–1LG5 each perform two way switching for 1000 lines and are graded by means of an intermediate distributing frame IDF for connection to register groups and group selectors.

The group selector 1GS provides one way switching from a total of 360 incoming trunks or originating junctors to a total of 1200 outgoing trunks or terminating junctors. The outlets may be divided into a maximum of 120 levels with a minimum of 10 outlets per level. A group selector is connected to other switching sections by a grading on the IDF.

A register-sender group consists of a maximum of 20 register junctors 2RJ1–2RJ20 and 5 senders 2S1–2S5. The register-sender group 200 is equipped to handle only local originating calls from the local line groups. The 5 senders 2S1–2S5 are equipped to handle all the various kinds of register traffic and are equipped to send dial speed pulsing, MF pulsing and binary code pulsing; the latter being used for intraoffice switching.

The register-sender group also makes connections to the translator 300 for translation of the stored dialed digits.

The translator 300 contains permanently stored information for the directory numbers as well as for area and office codes. The magnetic drums are always furnished in duplicate for safety reasons. There is a pair of these translators each including its own drum for each 10,000 directory numbers.

For handling incoming traffic the complete system also includes sections not shown herein, namely separate incoming register-sender groups, and an incoming trunk group having a crosspoint matrix for connecting these incoming trunks to the incoming register-sender group.

The method of signalling between the system groups is accomplished by a technique called diphase. This method employs a phase shift technique for serial sending and receiving of pulses.

1.2 *Typical call.*—As an introduction to the system operation, a brief description of a typical local call as processed through the system is now presented. The block diagram may be followed for tracing the call.

Assume that the subscriber on line L1111 goes into action first by detecting the originating call mark, identifying the calling line, and selecting an idle register junctor within the register-sender group. A path is then temporarily established from the calling telephone to the register junctor via three stages in tandem in the switching network through one of the originating junctors, such as junctor 10J1, and a crosspoint in the R matrix 1RM1, and the subscriber receives dial tone. The dialed digits are stored temporarily, coded, and process is continued as these digits are passed to the translator 300, analyzed for type of originating call, and instructions are selected from the drum memory 3MD and returned to the register-sender group 200 to guide further handling of the call. Upon receipt of the remaining digits, the translator 300 returns switching instructions corresponding to the called number as stored in the drum memory 3MD. The instructions are transmitted from the register-sender 200 via one of the senders 2S1–2S5 and the originating junctor 10J1 of the originating line group to the group selector 1GS. In the group selector 1GS, the instructions are analyzed by the marker, an idle terminating junctor in the terminating line group, and a path established to that line group via crosspoints in tandem in the group selector. The remaining instructions are followed by the line group marker to locate the called line terminals, select and seize a path from the terminating junctor through crosspoints in tandem to the called line. The terminating junctor establishes ringing, answer supervision, and talking battery for both parties when the call is answered.

Since the system is a common control operation, the markers of the line group and group selector function only to serve the assigned portion of the call processing and are then released to serve other calls. The register-sender 200 and the translator 300 are functioning on a time division basis and therefore are processing several calls simultaneously. The temporary signalling and control paths are released for further service while only the talking paths are held through the switching matrices and junctors in FIG. 1.

1.3 *General description of the translator.*—The translators in the semi-electronic cross-point system provide semipermanent storage of information relating to the terminal location of local subscribers' lines. Each translator provides storage for up to 10,000 numbers relating to a particular office code, and an exchange can be expanded in increments of 10,000 numbers. Equipment is provided to switch in up to five translators per exchange, for a maximum exchange size of 50,000 numbers.

A translator can be accessed from 20 register-sender groups and a console on a one-at-a-time basis. Two types of translations can be handled: (*a*) Directory number translation (DNT), also known as number group operation, in which the directory number of the called party is to be translated into switching instructions to enable register-sender groups to route the call to its destination; (*b*) Line number translation (LNT), also known as automatic number identification (A.N.I.), in which the calling party's line identification is to be translated into the calling party's directory number. This is useful for ticketing purposes.

Two identical translators are provided per office to share the traffic evenly with the register-sender groups. One of the pair may be taken out of operation for maintenance and all traffic switched to the duplicate, still meeting acceptable grade of service requirements.

1.4 *Characteristics of system.*—Information storage is provided by magnetic drums on the basis of one drum per translator. Memory words are recorded on the drum surface from a console, and can be altered at will by a simple keying process. Thus new directory numbers and their corresponding switching instructions can be added or existing ones altered by the console operator with a minimum of effort.

Because of the binary nature of magnetic drum storage, each digit must be represented in binary form and a four bit binary code was adopted.

The drum access circuitry, consisting of read and write amplifiers and playback switches is all-transistorized and is mounted on printed circuit cards in close proximity to the magnetic heads themselves. All logical operations in the system are carried out by the use of the crosspoint system's standard circuits, with a small number of special circuits for pulse generation, shaping, distribution, and buffering.

Information is serially transferred to and from the register-sender groups. Shift registers are used for this purpose as well as for interworking with the console. Within the translator itself, however, parallel transfer between registers is used in processing information.

1.5 *Communication with register-sender groups.*—In order to translate dialed digits into switching instructions and vice versa, two-way communication is used between translators and register-sender groups. Because of the large quantity of digits involved, serial transfer of information has been employed instead of parallel, to keep to a minimum the number of leads necessary. Diphase highways are used for this purpose, carrying high speed data in serial form.

Each register-sender group is equipped with one diphase receiver per translator pair, i.e. a maximum of 5 receivers, and with one diphase sender capable of sending information simultaneously to all translators. Each translator is equipped with one diphase receiver per register-sender group, i.e. a maximum of 20 receivers, and with one buffered diphase sender capable of sending information simultaneously to all register-sender groups. Provision is made for any of the diphase highways terminating at the register-sender group to be switched so as to be made to originate from either translator of a duplicate set.

CHAPTER 2—FUNCTIONAL DESCRIPTION 2.1 *Translator receivers.*—Provided on the basis of one receiver per register-sender group. Each receiver terminates the diphase highway from its corresponding register-sender group and returns a GO signal to it, as soon as it has been enabled to receive the input information to the translator. The received information is demodulated into logic levels which are serially fed to the translator access register. The allotter determines which receiver is to be enabled, and the control circuit determines at what time a receiver should be enabled.

2.2 *Allotter.*—Scans a field of 21 logic inputs from the 20 register-sender groups and the console while the system is idle. When one of the scanned inputs carries a request for service signal, the allotter stops scanning and locks in on this position. It also initiates a translation by setting the system busy and enabling a receiver (or the console register). After a translation has been performed, the allotter is unlocked and continues scanning.

2.3 *Translator access register.*—Used for serial shifting in or input information and for serial shifting out of translated information. One of the input digits is the X instruction, whose value determines whether a DNT, LNT, or write operation is required. Input information is temporarily stored here while a search for coincidence against the buffer register is being made. After coincidence has been found, translated information will be accepted in parallel from the buffer register.

2.4 *Translator sender.*—Modulates the output levels of the translator access register into signals to be fed to all register-sender groups along a diphase highway. It also provides shifting pulses when local access from the console register is desired.

2.5 *Console.*—The console consists of two sets of binary toggle switches and a binary lamp display. One set of switches is used to feed input information into the console register; the other set is used to feed information to the writing amplifiers directly; the lamps display the contents of the console register. Facilities are also provided for transferring even or odd numbered register-sender groups (or the console register) in and out of service.

2.6 *Console register.*—Used as local access to the translator for monitoring and writing operations. In effect it simulates a register-sender group for monitoring purposes; information transfer between itself and the translator access register occurs serially without the use of diphase highways.

2.7 *Control and process coincidence auxiliary circuits.*—The control circuit breaks a translation down into a series of sequential logic steps. By virtue of this circuit, the translator will always be in one of four states, IDLE, RECEIVE, PROCESS, or SEND. After receiving, it will analyze the X instruction in the translator access register and prepare the system for a DNT, LNT, or write operation.

The process coincidence auxiliary circuit comes into operation after coincidence has been found; it controls the timing steps which must be taken before readout or writing commands are given.

2.8 *Coincidence circuit.*—Used to search for parity between the contents of the translator access register and the contents of the buffer register during the initial stage of processing. Upon completion of this stage it produces a coincidence signal which is fed to the process coincidence auxiliary circuit.

2.9 *Buffer register.*—Provides temporary storage for information contained in the counter access register (during DNT or write) or for the drum readout (during LNT) while coincidence is being looked for against the translator access register. After coincidence has been found, it temporarily stores the drum readout (during DNT) or the counter access register information (during LNT) and transfers it into the translator access register.

2.10 *Readout playback and record.*—Provides access to the drum either for reading or for writing. It employs write amplifiers, read amplifiers, and playback (strobing) switches. Readout is continuous for the selected segment, but information is only strobed out into the buffer register when the command is given. Even or odd segment selection is under the control of the process coincidence auxiliary circuit, and the strobing or writing pulses are produced in the pulse generator shaping circuit.

2.11 *Pulse generator shaping.*—Receives the outputs of the two clock heads and generates five trains of pulses which are used throughout the system.

They are the drum index pulse DIP that occurs every 8.1 $\mu$sec. An auxiliary drum index pulse, ADIP, is derived from DIP and is delayed by 4 $\mu$sec. with respect to DIP. Writing pulses DIPW lead DIP by 0.5 $\mu$sec. and are subject to a stringent tolerance on pulse duration. Strobing pulses DIPR are derived from, and coincident with, DIP and are also subject to stringent tolerance on pulse duration. The fifth pulse train is the drum reset pulse, DRP, which occurs once per drum revolution.

Special amplifiers are provided to feed DIPW and DIPR directly to the playback and record circuitry. All other trains are buffered in the pulse distributor.

2.12 *Pulse distributor.*—Provides buffering and distribution of DIP, ADIP, and DRP to all parts of the system.

2.13 *Drum counter early.*—Used to count up to 5,000 positions arounds the drum circumference and is therefore directly stepped by DIP. It comprises four decades displaying units, tens, hundreds, and thousands respectively; each decade is represented in binary coded decimal form. The counter is automatically reset to zero by DRP every drum revolution. It is used to reference reading (or writing) operations during DNT (or write) to a particular directory number.

2.14 *Drum counter late.*—Identical to the drum counter early, but used during LNT to read out the calling party's directory number. To compensate for the delays incurred during an LNT, it is made to always lag the drum counter early by 4 unit steps.

2.15 *Counter access register.*—Intermediate buffering stage between the counters and the buffer register.

2.16 *Time out.*—Counts the number of drum revolutions from the beginning of a translation to check whether the control circuit remains in any one state for an excessive period of time. For example, an unsuccessful LNT will be timed out between the third and fourth drum revolution. The circuit causes the system to be returned to the IDLE state thus releasing the allotter. It also sends an alarm signal to the trouble recorder.

2.17 *Trouble recorder.*—It stores alarm signals received from the time out circuit and the drum counters and displays them on the console.

CHAPTER 3—OUTLINE OF OPERATION

*Summary*

The system is maintained in the IDLE state by the control circuit, which enables the allotter to scan. A request for service from a register-sender group appears as a call signal in the allotter's scanning field. The allotter locks in on such a signal, and the control circuit sets the system into the RECEIVE state. Input information is serially transferred into the system along diphase highways, and when all information has been received, the system is set to the PROCESS state. Depending on the value of the instruction digit, the system will either perform a DNT, LNT, or write operation. A search for coincidence must be made, after which the process coincidence auxiliary circuit determines when the readout or write commands are given. After the translated information has been transferred from the buffer register into the translator access register, the system is set to the SEND state. The translated information is thus returned to the register-sender, and when the last bit has been shifted out the system is returned to IDLE, enabling the allotter to continue scanning.

3.1 *Scanning.*—The translator can be accessed only by the register-sender groups and by the console. In normal operation only 10 register-sender groups and the console will be requesting service since traffic is shared with a duplicate drum. A register-sender group requests service by energizing a signaling relay (call signal) which causes a logic level to appear in the allotter's scanning field. The field consists therefore of the logic terminations of the 20 relays and the console signal. The allotter scans continuously, and when a request for service is detected, it stops and locks in on this position, until the required translation has been performed. Immediately the control circuit is advised that a translation is required; the control, which has been maintaining the system in the IDLE state now goes to the RECEIVE state. It also enables the receiver corresponding to the present locked allotter position to receive serial data from its associated register-sender group. The selected receiver in turn sends a GO command to its corresponding register-sender group.

3.2 *Receiving.*—Each receiver is connected to a register-sender group by means of a diphase highway. The diphase information requiring translation is sent in serial form to the selected receiver, which in turn demodulates it into zero and one logic levels. The demodulated outputs of all receivers are OR gated together and fed to the translator access register, which is a shift register used for temporary storage. Thus 10 digits are accepted by the translator access register in serial fashion, containing all the information required for the translation. After receiving is complete, the system is set to the processing state.

3.3 *Processing.*—The last digit to arrive in the translator access register, the X digit, is gated out to the control circuit where it is decoded. The value of this digit defines the operation to be performed, as follows:

$X=4$ directory number translation (DNT)
$X=2$ line number translation (LNT)
$X=5$ write operation 3.3.1 *Directory number translation.*—The object of this translation is to receive the last 4 dialed digits, referring to the thousands, hundreds, tens and units of the called subscriber's directory number, and to translate them into information which will route the call through the exchange to the correct outlet. The translated information consists of switching instructions and is returned to the translator access register in exchange for the subscriber's directory number. It is then fed to the sender which returns it via a diphase highway to the register-sender group being served.

3.3.1.1 *Details of directory number translation.*—As soon as the control circuit has decoded the X digit, it initiates the required operation. Since the switching instructions are stored in consecutive address intervals on the drum a binary- coded- decimal counter (drum counter early) is used to number each address interval as it passes under the drum heads. Thus, as the counter steps on through one revolution of the drum, it will count the 5000 intervals around the circumference. Therefore, at any instant of time, the drum counter state will indicate 2 addresses, situated in the even and odd drum segments. During a DNT, the contents of the drum counter early are continuously fed in parallel into the counter access register, and from there into the buffer register. The contents of the buffer register and those of the translator access register are constantly compared in the coincidence circuit, until parity is found. Since the drum counter early will run through all the numbers between 0000 and 9999 in one drum revolution, parity will be found in no longer than 33 milliseconds. At parity, the coincidence circuit will provide an output signal C, which is fed to the process coincidence auxiliary circuit.

Under the control of this latter circuit, a number of timing steps have to be taken in order to extract the desired information from the drum. At the correct moment the command to strobe out is given to all playback switches during one time interval. The information read out is temporarily stored in the buffer register, whose previous function has been inhibited.

The next step transfers the information into the translator access register, which has been reset: The switching instructions are now available to the sender.

3.3.2 *Line number translation.*—The object of this translation is to receive the line identity of the calling party and to translate it into the corresponding directory number. It is immediately apparent that this operation is the exact opposite of a directory number translation as regards information flow.

3.3.2.1 *Details of line number translation.*—Each segment of the drum is completely read out in turn, one word at a time, into the buffer register, and constantly compared with the contents of the translator access register. Since both segments have to be scanned, the maximum time for a line number translation is two drum revolutions or in a multidrum office 2N revolutions where N is the number of drums to be scanned. Again upon finding parity, the signal C is fed to the process coincidence auxiliary. Under the control of this circuit, a number of timing steps have to be taken in order to extract the desired information. Since the directory numbers are constantly appearing in the drum counter, it would seem necessary only to read the contents of the counter when parity is found. A detailed examination of system timing however reveals that, due to inherent delays, the drum counter early at this time has already counted past the position corresponding to parity. Consequently, a second counter is employed, known as the drum counter late, which runs 4 intervals behind the drum counter early and is stepped by the same DIP.

Now, under the control of the process coincidence auxiliary circuit, the contents of the drum counter late corresponding to the parity interval are read into the counter access register, whence they are transferred to the buffer register and in turn to the translator access register. The translation has therefore been performed, and the information can be seen out to the sender.

3.3.2.2 *Unsuccessful line number translation.*—In a multi-drum office, each drum has to be scanned in turn for parity. However, the register-sender group making this search needs to be informed that a particular drum did not produce parity, in order to access the next drum. Hence, if coincidence is not found after 3 to 4 drum revolutions, the timeout circuit stops the search and the process coincidence auxiliary circuit loads the buffer register with the code signifying unsuccessful line number translation. Then, in the ordinary manner, the contents of the buffer register are transferred to the translator access register, preparatory to sending.

3.3.3 *Write operation.*—The object of this operation is to record new information on the drum in selected address locations, or to modify an existing word.

3.3.3.1 *Console.*—The writing operation is initiated at the console. Two switch banks are provided: switch bank 1 is set to the directory number whose switching instructions are to be written, and this address loaded into the console register. This is a shift register in which the last digit X is made=5 as explained in Sec. 3.2: a lamp display on the console panel indicates whether the directory number has been correctly loaded into the console register.

Switch bank 2 is set to the information which is to be written on the drum; this information is fed parallel directly to the D.-C. inputs of the write amplifiers.

Now a GO button is pressed sending a call signal to the alloter's scanning field. It is seen therefore that the write operation does not cut into any translation in progress but rather takes its turn with other register-sender groups requesting service.

When the allotter locks in on the console signal, the information contained in the console register is shifted into the translator access register and the X digit is decoded. The control circuit now initiates a procedure identical with a directory number translation up to the time the signal C is produced. The process coincidence auxilary circuit takes a number of timing steps, then gives the write amplifiers to the command to write in the selected interval.

Still under control of the process coincidence auxiliary circuit, the drum is allowed to take at least one more revolution, after which a directory number translation procedure is automatically started using the directory number which is still contained in the translator access register: the purpose of this operation is to read out the switching instructions which were just written, in order to vertify that a correct entry has been made. This procedure is explained in the next two sections.

3.4 *Sending.*—Once a translation has been performed, the required information is stored in the translator access register. The control circuit now sets itself into the S, or SEND state and directs the translator access register to shift its contents to the sender, which communicates by means of a diphase highway with all register-sender groups.

The only exception occurs in the case of a write operation (or monitoring), where it is desired to monitor the contents of the translator access register. In this case, the information is returned to the console register, providing a visual display of what was written (or is being monitored). The correctness of the entry is verified by comparing each console register lamp with the corresponding key position of the switch bank.

When all information has been shifted out of the translator access register, an end of send signal is produced, which is fed to the control circuit. This means that the translation has been completed. Now the control circuit returns the whole system to the IDLE state, so that it may accept a new operation. The allotter is unlocked from its position and continues scanning.

3.5 *Monitoring.*—The console panel can also be used to monitor a particular directory number or switching instruction. In this case, the first switch bank only is used, the X digit being set either for a LNT or DNT operation. The rest of the console register is loaded with the required input information, arranged in the order in which it must be shifted into the translator access register. The console register behaves in this case exactly as a register-sender group requesting service, except that no diphase highways are involved. It is hence possible to check any word and any address location on the drum, using either a DNT or an LNT operation. The monitor function is especially useful in system testing.

CHAPTER 4—INFORMATION TRANSFER

*Summary*

This chapter explains the significance of the digits which are received, processed, and returned during a translator operation. It is shown how the various digits are placed in the counters and registers with the translator, so that the correct input and output sequence of digits is always maintained. Parallel transfer of information is discussed and register interconnections illustrated in schematic and tabular form.

4.1 *Binary coded decimals.*—All digits are represented by four bits of information in binary coded decimal form. This coding allows decimal values up to 15 to be assigned to a digit, although most digits only vary between 0 and 9.

The coding is shown in Table 4–1. It should be noted that the binary weights are assigned in ascending order from left to right. This convention is adopted in all registers, with serial information flow always occurring from left to right. A one is represented by a −8 v. negative voltage and a zero is represented by ground.

TABLE 4-1

| Decimal | BCD Weights | | | |
|---|---|---|---|---|
| | 1 | 2 | 4 | 8 |
| 0 [1] | 0 | 1 | 0 | 1 |
| 1 [2] | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 [1] | 0 | 1 | 0 | 1 |
| 11 [2] | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 [3] | 0 | 0 | 0 | 0 |

[1] Decimal 0 is coded as a decimal 10.

[2] For a subscriber's thousands directory digit, decimal 1 is coded as decimal 11 for purposes of making a parity check against the drum counter as well as for counting such a digit in the counter (see also Chapter 11).

[3] Decimal 16 is not interpreted as a valid code, since the "all zeros" condition is the normal reset state of all registers.

Figure 21:
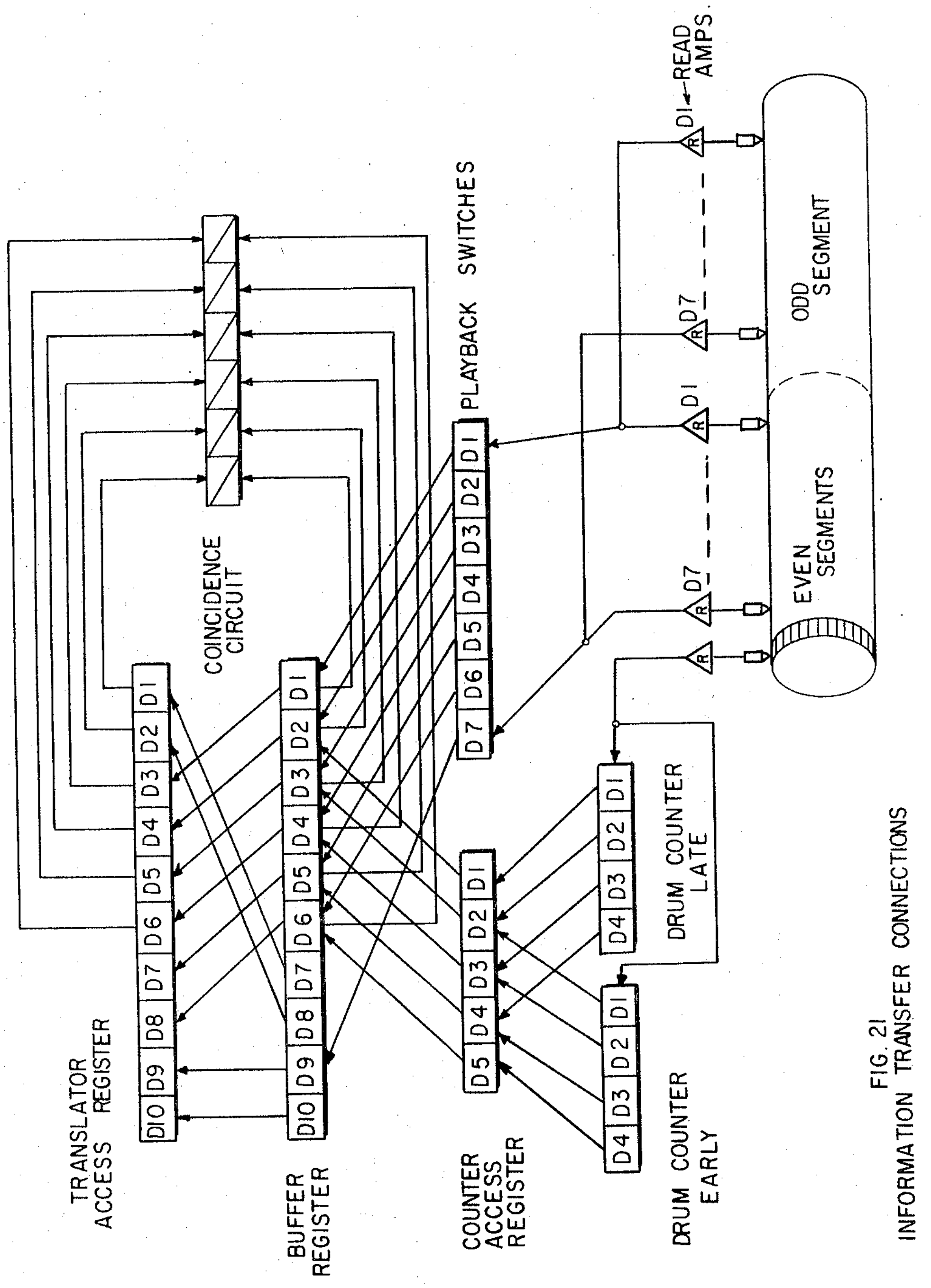
FIG. 21 shows the information transfer connections.
Figure 22:
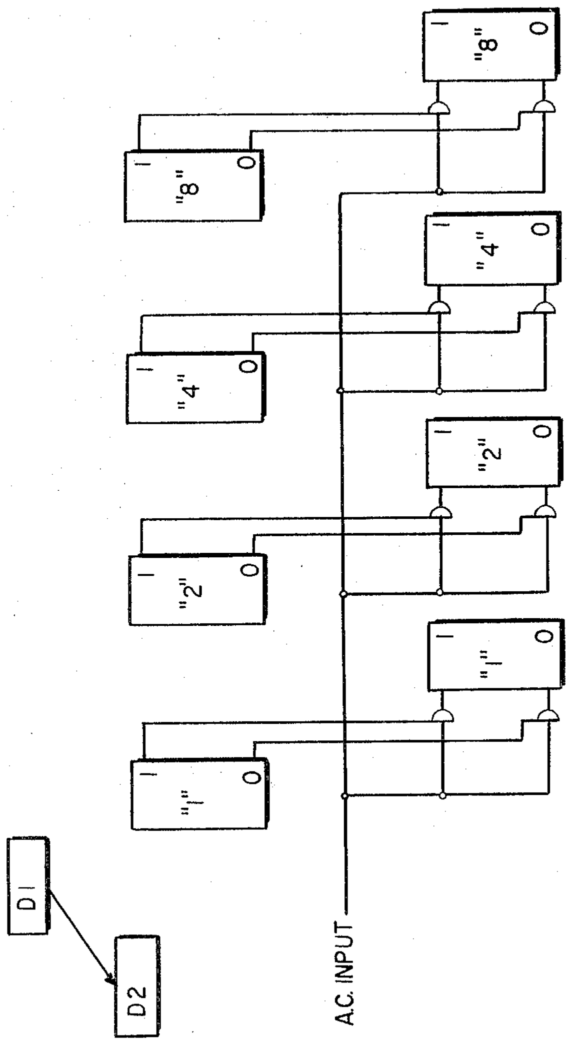
FIG. 22 shows parallel information transfer.

4.2 *Parallel transfer.*—Within the translator, digits are transferred in parallel, as shown in FIGURE 21. Each box represents four flip-flops set to the binary decimal code of the digit inside the box: this is shown in FIGURE 22 which also illustrates how flip-flops are interconnected for 4-bit parallel transfer. Tables 4–3 and 4–8 show all transfers in detail, including the 3-bit transfers as well. Table 4–2 shows the identity of the actual circuit elements (flip-flops, playback switches, write amplifiers, toggle switches) represented by the D digit designation.

Figure 23:
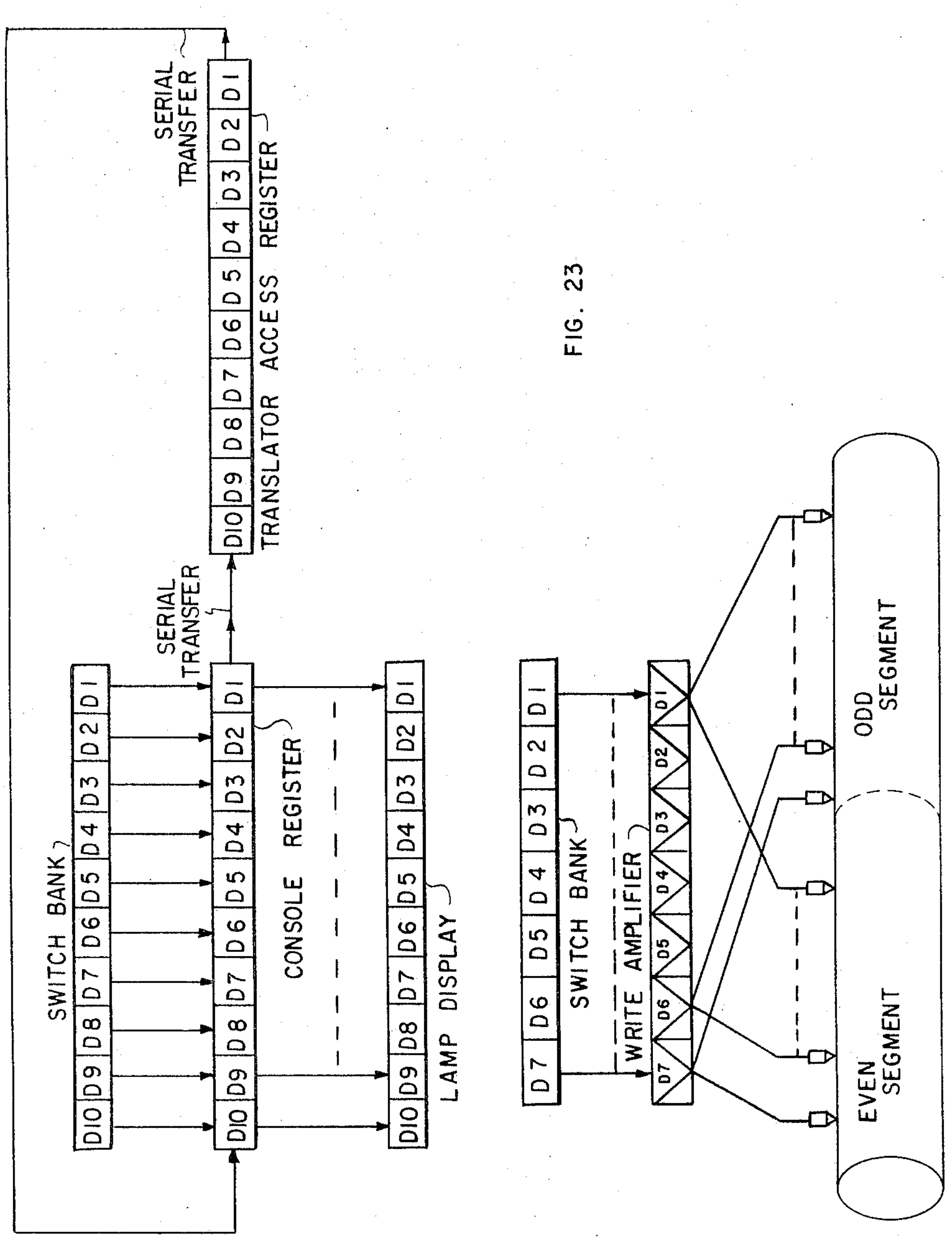
FIG. 23 shows the information transfer connections for use with the console.

At the console, digits are keyed into the console register in parallel fashion, as well as the digits that are keyed into the write amplifier, as shown in FIGURE 23. However, digit transfer between the console register and the translator access register is seen to take place serially.

TABLE 4-2

CIRCUIT REPRESENTATIONS OF DIGITS D1 THROUGH D10

| D1 | D2 | D3 | D4 | D5 | D6 | D7 | D8 | D9 | D10 |
|---|---|---|---|---|---|---|---|---|---|
| Translator Access Register and Console Register | | | | | | | | | |
| R37-R40 | R33-R36 | R29-R32 | R25-R28 | R21-R24 | R17-R20 | R13-R16 | R9-R12 | R5-R8 | R1-R4 |
| Buffer Register | | | | | | | | | |
| BR37-BR40 | BR33-BR36 | BR29-BR32 | BR25-BR38 | BR21-BR24 | BR17-BR20 | BR13-BR16 | BR9-BR12 | BR5-BR8 | BR1-BR4 |
| Counter Access Register | | | | | | | | | |
| R17-R19 | R13-R16 | R9-R12 | R5-R8 | R1-R4 | | | | | |
| Drum Counter Early and Drum Counter Late | | | | | | | | | |
| M2, M4, M8 | H1, H2, H4, H8 | T1, T2, T4, T8 | U1, U2, U4, U8 | | | | | | |
| Playback Switches | | | | | | | | | |
| PB21-PB24 | PB17-PB20 | PB13-PB16 | PB9-PB12 | PB5-PB8 | PB1-PB4 | PB25-PB27 | | | |

TABLE 4-2.—Continued

CIRCUIT REPRESENTATIONS OF DIGITS D1 THROUGH D19

| D1 | D2 | D3 | D4 | D5 | D6 | D7 | D8 | D9 | D10 |
|---|---|---|---|---|---|---|---|---|---|
| Write Amplifiers | | | | | | | | | |
| WE21-WE24, WO21-WO24 | WE17-WE20, WO17-WO20 | WE13-WE16, WO13-WO16 | WE9-WE12, WO9-WO12 | WE5-WE8, WO5-WO8 | WE1-WE4, WO1-WO4 | WE25-WE27, WO25-WO27 | | | |
| Switch Bank 1 | | | | | | | | | |
| AK37-AK40 | AK33-AK36 | AK29-AK32 | AK25-AK28 | AK21-AK24 | AK17-AK20 | AK13-AK16 | AK9-AK13 | AK5-AK8 | AK1-AK4 |
| Switch Bank 2 | | | | | | | | | |
| WK21-WK24 | WK17-WK20 | WK13-WK16 | WK9-WK12 | WK5-WK8 | WK1-WK4 | WK25-WK27 | | | |
| Lamp Display | | | | | | | | | |
| L37-L40 | L33-L36 | L29-L32 | L25-L28 | L21-L24 | L17-L20 | L13-L16 | L9-L12 | L5-L8 | L1-L4 |

TABLE 4-3

INFORMATION TRANSFER

| From Buffer Register Digit | To Translator Access Register Digit |
|---|---|
| D1 | D3 |
| D2 | D4 |
| D3 | D5 |
| D4 | D6 |
| D5 | D7 |
| D6 | D8 |
| D7 | D1 |
| D8 | D2 |
| D9 | D9 |
| D10 | D10 |

TABLE 4-4

PARITY CHECKING IN COINCIDENCE CIRCUIT

| Between Buffer Register Digit | And Translator Access Register Digit |
|---|---|
| D1-(1) | D1-(1) |
| D2-(1) | D2-(1) |
| D3-(1) | D3-(1) |
| D4 | D4 |
| D5 | D5 |
| D6 | D6 |

NOTE.—(1) The matching of digits D1, D2, and BR29 of D3 is inhibited during DNT or write.

TABLE 4-5

INFORMATION TRANSFER

| From Playback Switches Digit | To Buffer Register Digit |
|---|---|
| D1 | D1 |
| D2 | D2 |
| D3 | D3 |
| D4 | D4 |
| D5 | D5 |
| D6 | D6 |
| D7-(2) | D9-(2) |

NOTE.—(2) This transfer consists of only 3 bits: PB25 to BR5, PB26 to BR6, PB37 to BR7.

TABLE 4-6

INFORMATION TRANSFER

| From Counter Access Register Digit | To Buffer Register Digit |
|---|---|
| D1-(3) | D2-(3) |
| D2 | D3 |
| D3 | D4 |
| D4 | D5 |
| D5 | D6 |

NOTE.—(3) This transfer consists of 3 bits only: R17 to BR34, R18 to BR35, R19 to BR36, with the output of the H flip-flop being fed to BR33 during LNT.

TABLE 4-7

INFORMATION TRANSFER

| From Drum Counter Early Digit | To Counter Access Register Digit |
|---|---|
| D1-(4) | D2-(4) |
| D2 | D3 |
| D3 | D4 |
| D4 | D5 |

NOTE.—(4) This transfer consists of 3 bits only: M2 to R14, M4 to R15, M8 to R16.

TABLE 4-8

INFORMATION TRANSFER

| From Drum Counter Late Digit | To Counter Access Register Digit |
|---|---|
| D1-(5) | D1-(5) |
| D2 | D2 |
| D3 | D3 |
| D4 | D4 |

NOTE.—This transfer consists of 3 bits only: M2 to R17, M4 to R18, M8 to R19.

Figure 24B:
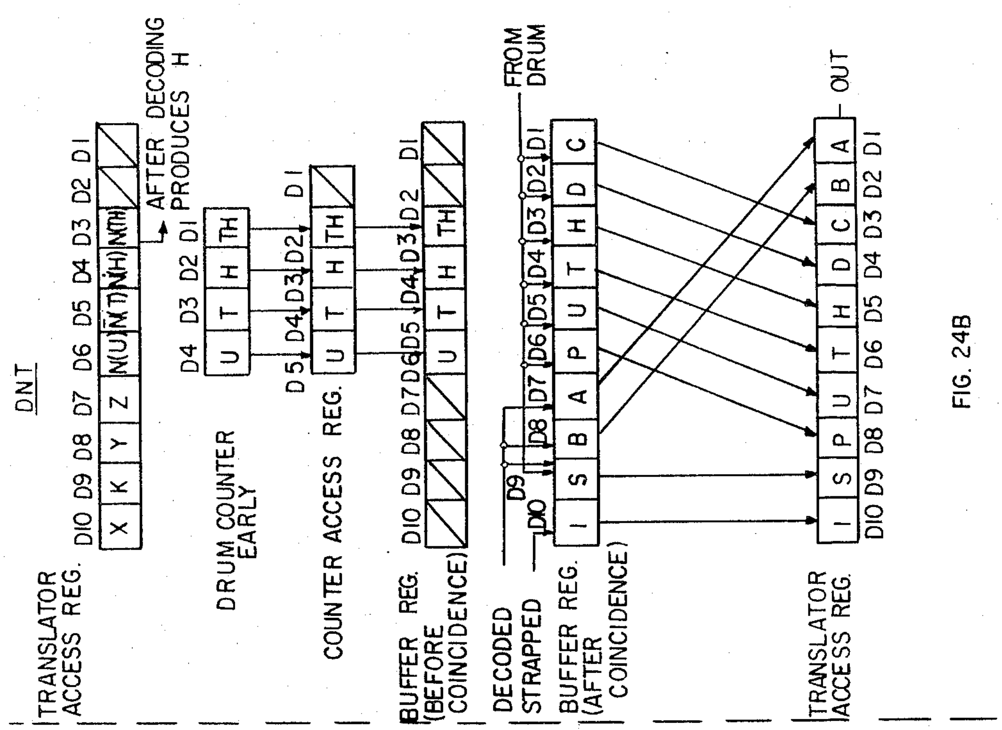
FIGS. 24A and 24B show the information transfer connections for a line number translation and for a directory number translation respectively.
Figure 24A:
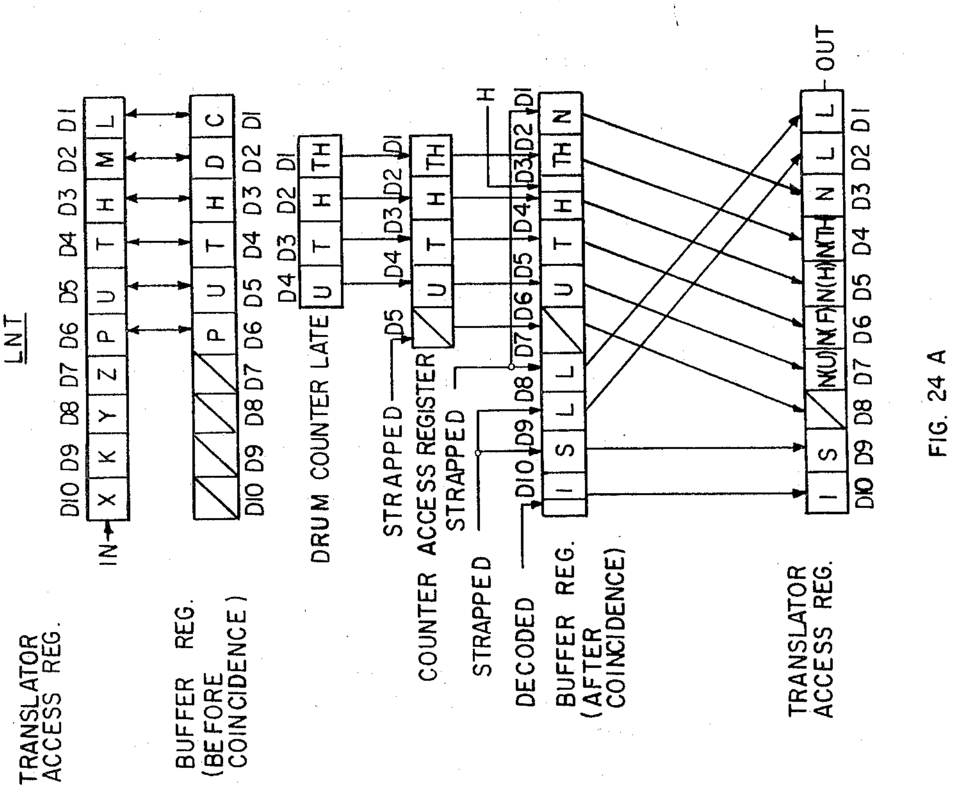

4.3 *Allocation of digits within registers* (FIG. 24).—The allocation of digits within the translator access register is made on the basis of the given sequence of input and output digits (see Sec. 4.4). All parallel transfer operations must be so arranged as to finally produce the correct sequence of output digits, irrespective of whether a DNT or a LNT is being performed. All flip-flops used in the system have only two sets of inputs: in the case of the translator access register one set of inputs is used for serial shifting. This leaves only one set of inputs for parallel transfer from the buffer register, the interconnections used being shown in FIGURES 21 and 24, and in Table 4–3. The organization of digits within the other registers is best explained by following through each type of translation.

sidering the translator access register, which is a 10 digit shift register, the input information is delivered from the register sender groups in serial fashion, starting with the bit weighted 8 of digit D1, and ending with the bit weighted 1 of digit D10. (A prefix precedes the transmission of all serial data (see Chapter 7).

| Digit | D10 | D9 | D8 | D7 | D6 | D5 | D4 | D3 | D2 | D1 |
|---|---|---|---|---|---|---|---|---|---|---|
| Prefix bit | X | K | Y | Z | N(U) | N(T) | N(H) | N(th) | — | — |

4.3.1 *Directory number translation.*—The contents of the drum counter early are fed via the counter access register into the buffer register, where they are placed in positions D3 through D6. A direct comparison between buffer register digits D3 through D6 and translator access register digits D3 to D6 is made in the coincidence circuit. After coincidence has been found, the buffer register stores the drum readout in digit positions D1 to D6, and D9 (3 bits only), with decoded information in digits D9 (one bit only), D8 and D7, and strapped information in D10. Thus the two input options to the digits D3 to D6 of the buffer register are used by the counter access register (before coincidence) and by the drum readout (after coincidence). Digit allocation during LNT must be made compatible with these established connections.

4.3.2 *Line number translation.*—The drum readout before coincidence has to be placed in digit positions D1 to D6 of the buffer register, a direct comparison being made where:

$N(th)$=thousands digit of the called subscriber
$N(H)$=hundreds digit of the called subscriber
$N(T)$=tens digit of the called subscriber
$N(U)$=units digit of the called subscriber
$Z$=prefix recognition digit
$Y,K$=class of service digits
$X$=translator instruction digit=4

The N(th), N(H), and N(U) digits are compared against the contents of the drum counter early in the coincidence circuit.

The Y, K and Z digits are fed to a matrix in the buffer register where they are decoded as shown in Table 4–9 (see also Chapter 10). The combinations of the K and Y digit used in Table 4–9 still leave 219 possibilities for further classes of service.

After processing, the following information is temporarily stored in the translator access register, preparatory to shifting out:

| Digit | D10 | D9 | D8 | D7 | D6 | D5 | D4 | D3 | D2 | D1 |
|---|---|---|---|---|---|---|---|---|---|---|
| Prefix bit | I | S | P | U | T | H | D | C | B | A |

against digits D1 to D6 in the translator access register. After coincidence, the counter access register must be read out in positions D2 to D6 of the buffer register, the counter address being stored in positions D2 to D5 of the buffer register. The state of the segment selector flip-flop H is stored in BR33 of D2, the office code is stored in D1, D7 and D8, with sender instruction digits in D9 and D10.

4.4 *Input-output sequence:*

4.4.1 *Directory number translation (FIG. 24).*—Conwhere:

*A,B*=encoded class of service digits, as shown in Table 4–9.
*C,D,H,T,U*=routing digits read off the drum (switching instructions).
*P*=party digit read off the drum
*S*=sender instruction digit, which is read off the drum, except for the bit weighted 8 which is encoded as shown in Table 4–9 to signify ticketing
*I*=sender instruction digit=7

TABLE 4-9

| Decode | | | Calls | Description | Encode | | | Bit Weighted "8" |
|---|---|---|---|---|---|---|---|---|
| K | Y | Z | | | B | A | S | |
| 0 | 1 | - | Local | Coin Box | 1 | 8 | 0 | |
| 0 | 2 | - | Local | Metered Service | 2 | 8 | 0 | |
| 2 | 1 | - | Trunk | Busy Verification | 3 | 8 | 0 | |
| 2 | 2 | - | Trunk | Wire Chief Test Call | 4 | 8 | 0 | |
| 2 | 3 | - | Trunk | Ticketing | 0 | 8 | 1 | |
| 2 | 4 | 0 | Trunk | 0-Prefix Busy Verification | 3 | 8 | 0 | |
| Other combinations | | | | | 16 | 16 | 0 | |

4.4.2 *Line number translation* (*FIG. 24*).—The following information is received from the register-sender groups and is temporarily stored in the translator access register:

| Digit | D10 | D9 | D8 | D7 | D6 | D5 | D4 | D3 | D2 | D1 |
|---|---|---|---|---|---|---|---|---|---|---|
| Prefix bit | X | K | Y | Z | P | U | T | H | M | L |

where:

*L,M,H,T,U,P*=line identity digits
*Y,K*=class of service digits
*Z*=prefix recognition digit
*X*=translator instruction digit=2

The L,M,H,T,U,P digits are compared in the coincidence circuit against all the switching instructions stored on the drum in a sequential manner.

After processing, the following information is available in the translator access register, preparatory to sending:

| Digit | D10 | D9 | D8 | D7 | D6 | D5 | D4 | D3 | D2 | D1 |
|---|---|---|---|---|---|---|---|---|---|---|
| Prefix bit | I | S | — | N(U) | N(T) | N(H) | N(th) | N | L | L |

where:

*L,L,N*=office code digits, strapped per translator
*N(th)*=thousands digit of the calling subscriber
*N(H)*=hundreds digit of the calling subscriber
*N(T)*=tens digit of the calling subscriber
*N(U)*=units digit of the calling subscriber
*S*=sender instruction digit (not used in this application)
*I*=sender instruction digit=13 for an unsuccessful translation and 12 for a successful one.

The N(th), N(H), N(T), and N(U) digits are read out through the counter access register from the drum counter late.

4.4.3 *Write operation* (*FIG. 23*).—The console switch bank 1 is set to the following digits, to be loaded in the same order into the console register.

| Digit | D10 | D9 | D8 | D7 | D6 | D5 | D4 | D3 | D2 | D1 |
|---|---|---|---|---|---|---|---|---|---|---|
| Prefix bit | X | — | — | — | N(U) | N(T) | N(H) | N(th) | — | — |

where:

N(th), N(H), N(T), and N(U) are the thousands, hundreds, tens, and units digit of the subscriber's directory number whose switching instructions are being altered.

*X*=translator instruction digit=5

Switch bank 2 is loaded with the following digits, which are the switching instructions to be written on the drum:

| Digit | D7 | D6 | D5 | D4 | D3 | D2 | D1 |
|---|---|---|---|---|---|---|---|
| . | S<br>1 2 4 | P | U | T | H | D | C |

whose meaning is the same as in a line number translation.

CHAPTER 5.—MAGNETIC DRUM STORAGE

*Summary*

This chapter deals with the storage medium used in the translator to record the system line numbers. A complete discussion of all the circuits directly related to the storage and recovery of information on the magnetic drum is presented.

The chapter has been divided into four general categories that cover the drum features. The first category is a discussion of the physical characteristics of the drum, the mode of recording used, how the information is organized on the drum and other pertinent facts about the drum. The second section deals with the recording operation, how the write amplifiers function, the input requirements to the recording heads, and the logic associated with the writing operation. The third section covers the readout operation, how the read amplifiers work, output characteristics of the information sensed on the drum, and logic associated with the reading operation. The fourth section covers the recovery of the information read off the drum, the playback switch and how it functions, and the logic of the information recovery operation.

5.1 *General*:

5.1.1 *Magnetic drum*.—The magnetic drum used in the translator provides a semipermanent library storage of all the line number information (switching instructions) necessary to complete a call through the system. The magnetic drum consists of a nonmagentic cylinder that has a thin layer of magnetic material deposited on its outer surface. The magnetic material on the surface can be magnetized in either of two states, and then the two states can be recognized by the sensing circuits. Information can be stored by coding it in a binary form and then magnetizing the coating to correspond to the code.

5.1.2 *Recording operation*.—To record information on the magnetic drum, it is necessary to drive the coating into one of its two possible states of saturation. The recording head consists of a horseshoe shaped ring of low reluctance material with a coil of wire wound around a portion of the ring. When current is passed through the coil, it sets up a flux that travels through the ring of low reluctance material until it reaches the gap in the ring where it fringes out around the gap and some of it passes through the coating of the drum. The flux generated by the current is of sufficient magnitude to saturate the portion of the coating under the head in one direction or the other, depending on the direction of current flow. When the writing current is stopped, the coating retains a portion of the magnetism and, thus, becomes a small dipole on the surface whose orientation is representative of the information stored there.

5.1.3 *Reading operation*.—The cylinder rotates inside of a shroud in which salient sensing and recording heads are mounted. As the drum rotates, the spots of flux on the drum pass under the sensing heads. The pole pieces in the head offer a lower reluctance path to the flux than the air gaps and, thus, cause the flux to flow around the head and cut the wire wound on the head structure. The changing flux through the coils causes a voltage to be induced in the coil whose amplitude is proportional to the speed of the drum, the field strength of the saturated spot, and the turns of wire in the coil. The polarity of the induced voltage is dependent on which of the two states the coating is magnetized. The read out is produced by relative motion between the head and the drum surface and is non-destructive, i.e. it remains the same every time it is sensed unless it is changed by writing.

5.1.4 *Information recovery*.—The signal that is sensed from the drum is approximately sinusoidal in nature. The information is contained in the phase of the sinusoid within the interval in which the information was recorded. Depending on the method used, either the positive or negative going portion of the wave can be placed in a definite position in the interval. Since these voltage peaks represent a transition from one magnetic state to the other, they are indicative of the code recorded in the cell. It is the job of the information recovery system to recognize these positions and decode them into the original data that was recorded.

5.2 *System description*:

5.2.1 *Magnetic drum*:

5.2.1.1 *Physical characteristics of drum and heads*.—The magnetic drum used can be for example a Bryant Computer Product, Model 10,008, general purpose drum. The drum is a completely enclosed unit driven by a single phase induction motor that is an integral part of the drum shaft.

The following specifications are listed for the drum:

Motor: 115 volt, 60 cycle, single phase, 1800 r.p.m.
Drum diameter: 10".
Coating: "GRIMACO" of 1 mil (.001") radial thickness.
Coating surface velocity: 942 inches/second
Recording frequency: 122.8 kc./sec.
Bit period: 8.12 μsec.
Bit density: 130 bits/inch.
Head to drum spacing: 1 mil (.001").

The magnetic heads used can be the unshielded general storage Bryant Type #A–1362–22. The heads are dual purpose in that they are used for both reading and recording.

These heads are a standard ring-type structure with a center tapped coil wound on them. The whole coil is used for sensing, and half the coil is used to record ones and the other half to record zeroes.

This arrangement of a center tapped coil for a record and sense head is an attempt to satisfy the two opposing conditions that are desirable for ease of writing and larger playback.

When recording, the number of turns should be kept small enough that a reasonable current rise time can be achieved without large voltages. Sharp current pulses produce better resolution of information recorded in the bit cells. On the other hand, the larger number of turns on the sensing head, the larger the amplitude of the playback voltage will be.

The A–1362–22 read, write head has the following specifications:

120 turns—full coil
60 turns—one-half coil.

Head windings rated at 250 ma. continuous D.-C. current inductance:

68 microhenrys ±15% at 120 kc. per half coil
280 microhenrys ±15% at 120 kc. full coil series aiding.

5.2.1.2 *Mode of recording*.—The mode of recording used on the present magnetic drum is called Return to Zero. This method of recording was chosen because it offers the simplest circuitry for both the actual sensing and recording and also the logic circuits necessary to drive the recording and sensing circuits.

Return to Zero derives its name from the fact that fixed duration positive or negative current pulses are used to saturate the drum coating when writing, and the current remains at zero at all other times. Since the current pulses are equal in magnitude, the playback waveform is a balanced sinusoidal waveform whose period is equal to the bit cell length in time. The effect of the opposite sense of the two current pulses is to make the playbacks, derived from them, be 180 degrees out of phase with each other.

By noting that the positive current pulse always produces a playback sine wave whose positive portion occurs in the first half of the bit cell, we can say that by always causing positive current to flow in the head coil when a one is written, we will always produce a positive playback voltage in the first half of the bit cell. Conversely, by assigning the negative current pulse to the zero, we will produce a playback whose positive half cycle always occurs in the last half of the bit cell.

Thus, to recover the information written with this type of recording, it is only necessary to sample the playback either during the first or last half of the bit cell and determine whether it is positive or negative. These samplings will indicate the information stored, dependent on the convention established, as to which polarity in which half of the bit cell is to be considered a one or zero. The convention used is strictly arbitrary and can be any of the four possible combinations depending only on what is required.

5.2.1.3 *Magnetic neutralization*.—Magnetic neutralization, or A.-C. erasing, is a process used to remove the past history of magnetism from the drum coating and restore it to a state of zero remanence. A.-C. erasing is a preparatory step to the actual recording of information on the drum.

In order to recover the stored information, the playback should be free of any false signals that can be caused by old information written at different frequencies, noise splurges, and other disturbances on the track. A.-C. erasing removes all erroneous magnetic information that might be present and leaves an unsaturated medium for the new recording. Erasing is accomplished by connecting a 115 volt, 60 cycle signal from a variac through a step-down transformer and a series limiting resistor across the head, on the track to be erased. By causing the output of the variac to decrease at a logarithmic rate from 115 volts to zero, the coating on the drum is forced to traverse a hysteresis loop that decreases in area until it reaches zero, thus forcing the coating into a neutral state.

In the exemplary model the transformer connects to a common bus called AC4 and AC5, which, in turn, connects to all the write amplifier connectors.

5.2.1.4 *Head setting technique*.—The amplitude and resolution of the playback waveform was dependent on two factors involved in physically setting the recording head in the drum shroud; they are orientation of the gap normal to the direction of rotation and radial adjustment of the pole face with respect to the coating surface. When installing new recording heads or replacing damaged ones, there is a certain technique that must be observed to assure proper head alignment, and a standardized playback of 45 millivolts ±5 millivolts.

Figure 25:
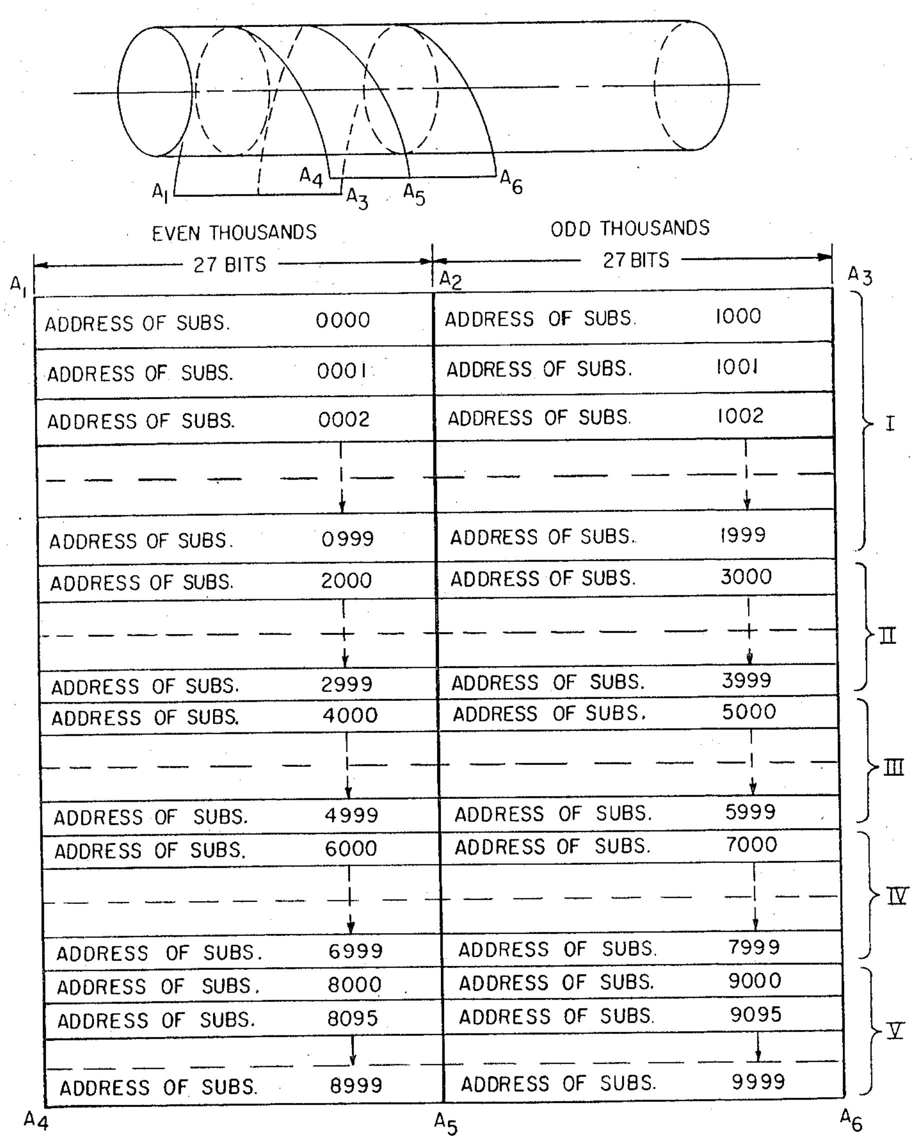
FIG. 25 shows the information layout of the drum.

5.2.1.5 *Information organization*.—Information is recorded in parallel fashion around the drum. Each word consists of 27 bits on 27 different tracks, such that at any given moment all 27 bits of a word are under their respective heads on all 27 different tracks (see FIG. 25). This method of writing is different than serial writing which would place the 27 bits of a word in sequence on a single track. The parallel method of recording allows us to perform the necessary operations of reading or writing in the shortest time possible. It takes only one bit cell time to read or record all 27 bits of a subscriber's word, rather than the 27 bit cell times it would require with serial recording. Furthermore, parallel recording provides a shorter access time than serial recoding.

Since 10,000 27-bit words must be stored on the drum (8192 on the exemplary model) and there are only 5000 slots (4096 on the model) available around the drum, the number grouping must be split up. The words have been separated in half by considering the thousands digit of their address. All the words whose thousands digit in the address is even have been assigned to one segment of 27 tracks; all numbers whose thousands digit is odd have been assigned to the other segment of 27 tracks. All connecting circuits have been assigned a suffix letter to correspond to the thousands segment that they are used with; for example, RE1 and WE1 are the read and write amplifiers connected to the first track on the even thousands segment of the drum.

The drum layout serves only as a guide to how the drum information is organized and to which tracks contain which digits. There is no specification as to which group of heads will be used for any particular digit, and the actual head assignment is strictly an arbitrary choice with the exception of the clock heads.

5.2.2 *Recording operation:*

5.2.2.1 *Recording head input requirements.*—The recording heads used in the model drum require an input pulse of current of approximately 100 ma. amplitude and a duration of 2.25 $\mu$sec. $\pm 0.25$ $\mu$sec. to give proper recording performance.

The head itself contains a center tapped, balanced coil, whose windings are of opposite sense with respect to the center tap. This type of construction offers two advantages as far as input requirements are concerned. The opposite sense of the two windings allow us to use the same type of switch for both the one and zero recording.

In both cases the writing current flows into the head center tap and out through the switch. However, since the head coils are wound in opposite directions with respect to the center tap, currents through the half heads produce magnetic fields that are in opposite directions. These opposing magnetic fields allow production of positive or negative saturation by selection of the half of the head in which current flows.

To prevent interaction between recorded pulses, it is necessary to have a current pulse through the head whose duration is short compared to the bit cell time. These short current pulses require a reasonably fast rise time. To maintain the necessary ampere-turns to achieve saturation, as the number of turns used decreases, the current increases in direct proportion. However, the inductance of a coil increases as the number of turns squared: if a coil using a larger number of turns is used to decrease the current level, i.e. full coil, the voltage swing across the coil must increase along with the value of L in order to maintain a definite rise time for the current. Thus, by using a half coil writing arrangement, voltage swings that are compatible with transistor ratings can be attained.

5.2.2.2 *Change of information recorded on drum.*—Information that has been recorded on the magnetic drum can be changed at will simply by recording the new information over the old information. Since we are using saturation recording, we must only pass sufficient current through the head to place the coating in a saturated state; and we automatically erase the old information when we write the new.

5.2.2.3 *Logic of the write operation.*—To allow the system to write correctly on the magnetic drum, two conditions must be satisfied:

(1) The correct information instructions, i.e. one or zero must be present at the write amplifier input.

(2) The write amplifier must perform its writing function at the correct time.

Each of the write amplifiers has three inputs; two of the inputs, IN and $\overline{\text{IN}}$, are under control of the write keys in the console, while the third input CWP is under control of the process coincidence auxiliary circuit through the pulse generator.

The two information inputs from the console set the amplifiers so that the one or zero side of either the even or odd set of 27 amplifiers will write when the correct time occurs. The set up of the thousands digit in the subscriber address determines whether WKE or WKO, the even or odd segment of the drum, is to be written on. The individual keys for the binary weight of the various digits determine whether a one—$WK=1$, $\overline{WK}=0$—or a zero—$WK=0$, $\overline{WK}=1$—is written by the amplifier.

The CWP (coincident write pulse) input is a pulse that comes from the pulse generator when the correct bit cell is under the head. CWP is generated by gating DIPW (drum index pulse write) and the WID flip-flop (see Chapter 10), which is in the process coincidence auxiliary circuit, together in the pulse generator.

The following two equations logically describe the writing function where N can be any number from 1 to 27.

Write one or zero even segment $$=AP-WID\cdot DIPW\cdot(CP-WKEn+CP-\overline{WKEn})$$

Write one or zero odd segment $$=AP-WID\cdot DIPW\cdot(CP-WKOn+CP-\overline{WKOn})$$

5.2.2.4 *Write amplifier operation.*—The purpose of the write amplifier is to switch a pulse of writing current through the drum heads when commanded to do so by the system logic. Since we have a balanced head, the circuits of the write one side and the write zero side are identical and share a common pulse source.

5.2.3 *Reading operation:*

5.2.3.1 *Read head output and characteristics.*—The read head used with the magnetic drum uses the same coils as the write head. The output from the read head is sensed across the full coil. Since the output voltage is directly proportional to the number of turns on the coil, we realize a larger playback for full coil than we would for half coil.

The actual voltage output from the coil is a sinusoid whose phase within a bit cell is dependent on the information stored. The amplitude lies between 40 and 50 millivolts peak to peak.

5.2.3.2 *Function and logic of the reading operation.*—The read amplifiers have been designed to perform the three following functions.

(1) Sense the drum playback, amplify, and present it as a usable output.

(2) Read out the odd or even segments of the drum as commanded by the system logic.

(3) Fan in from 54 to 27 outputs.

There are 54 read amplifiers used in the model translator, one for each of the 27 tracks on the odd and even segments of the drum. Since we have only a single buffer register, the outputs of the similar digits on the odd and even tracks must share each flip-flop. To select which of the two segments will be read out, the outputs of the sense amplifiers and AND gated together with the H flip-flop. When $H=1$ the circuit is commanded to read from the odd segment of the drum and when $\overline{H}=1$ from the even segment of the drum. Logically the following equations describe the action of the read operation, where $n$ can be any integer from 1 to 27.

$$PB-\overline{RAn}=[(DH-REn)(AP-\overline{H})+(DH-ROn)(AP-H)]$$

5.2.3.3 *Read amplifier operation.*—The drum read amplifier circuit can be broken down into three sections, each of which performs one of the functions discussed in Section 5.2.3.2. The sense and squaring amplifier form a transistor AND gate where the read out and segment selection are gated, and the external load when wired correctly produces the OR function.

5.2.4 *Information recovery*:

5.2.4.1 *Method of information recovery*.—The final output of the read amplifiers is a train of square waves whose position relative to a bit cell contains the stored information on the drum. The function of the playback switch is to interpret this information and then use the signals thus generated to set the recovered information into the buffer register.

The convention has been established, in this system, that the information will be determined by the level of the read amplifier output during the first half of the bit cell. If $\overline{RA}=1$, i.e., output at ground during the first half of the bit cell, the information under the head is a zero; if $\overline{RA}=0$, i.e., output at $-8V$ during the first half of the bit cell, the information under the head is a one. The bit cell is defined by the time between leading edges of DIPW (the drum index pulse write). A strobing pulse is introduced during the first half of the bit cell and looks at the state of $\overline{RA}$ to determine what the information is; the result of the strobing operation is used to set and reset the buffer register flip-flops.

5.2.4.2 *Logic of the information recovery operation*.—The playback switch is an arrangement of gates designed to recover the drum information.

The signal $\overline{RA}$ is fed into an AND gate and an inverter. The signal $\overline{RA}$ after the inversion is fed into another AND gate; the outputs of these gates generate the set PBS and reset PBR A.-C. commands to a buffer register flip-flop.

The pulse inputs to the AND gates called SP (Strobe Pulse) are produced in the pulse generator circuit. The signal SP always occurs in the first half of the bit cell in which it is generated. SP is gated out in accordance with the type of operation, either DN or LN, in progress in the translator.

When a DN operation is being performed, $$SP=DIPR\cdot AP-RO\cdot CC-DN$$

and occurs only when the selected address of the 5000 (4096 for the exemplary model) is under the read heads (Chapter 10). When a LN operation is in progress, $$SP=DIPR\cdot NC-\overline{CCD}\cdot CC-LN$$

This causes continuous read out of the drum until coincidence is found between the line numbers on the drum and the one in the translator access register (Chapter 3, Section 3.3.2).

Logically the following equations apply, during the strobing interval, where $n$ is any integer from 1 to 27.

$$PS\text{-}PBRn=[(DH\text{-}REn\cdot AP\text{-}\overline{H})+(DH\text{-}ROn\cdot AP\text{-}H)]\cdot[(NC\text{-}\overline{CCD}\cdot CC\text{-}LN)+(AP\text{-}RO\cdot CC\text{-}DN)]\cdot(DIPR)$$

$$PS\text{-}PBSn=[(DH\text{-}REn\cdot AP\text{-}\overline{H})+(DH\text{-}ROn\cdot AP\text{-}H)]\cdot[NC\text{-}\overline{CCD}\cdot CC\text{-}LN)+(AP\text{-}RO\cdot CC\text{-}DN)]\cdot(DIPR)$$

Figure 26:
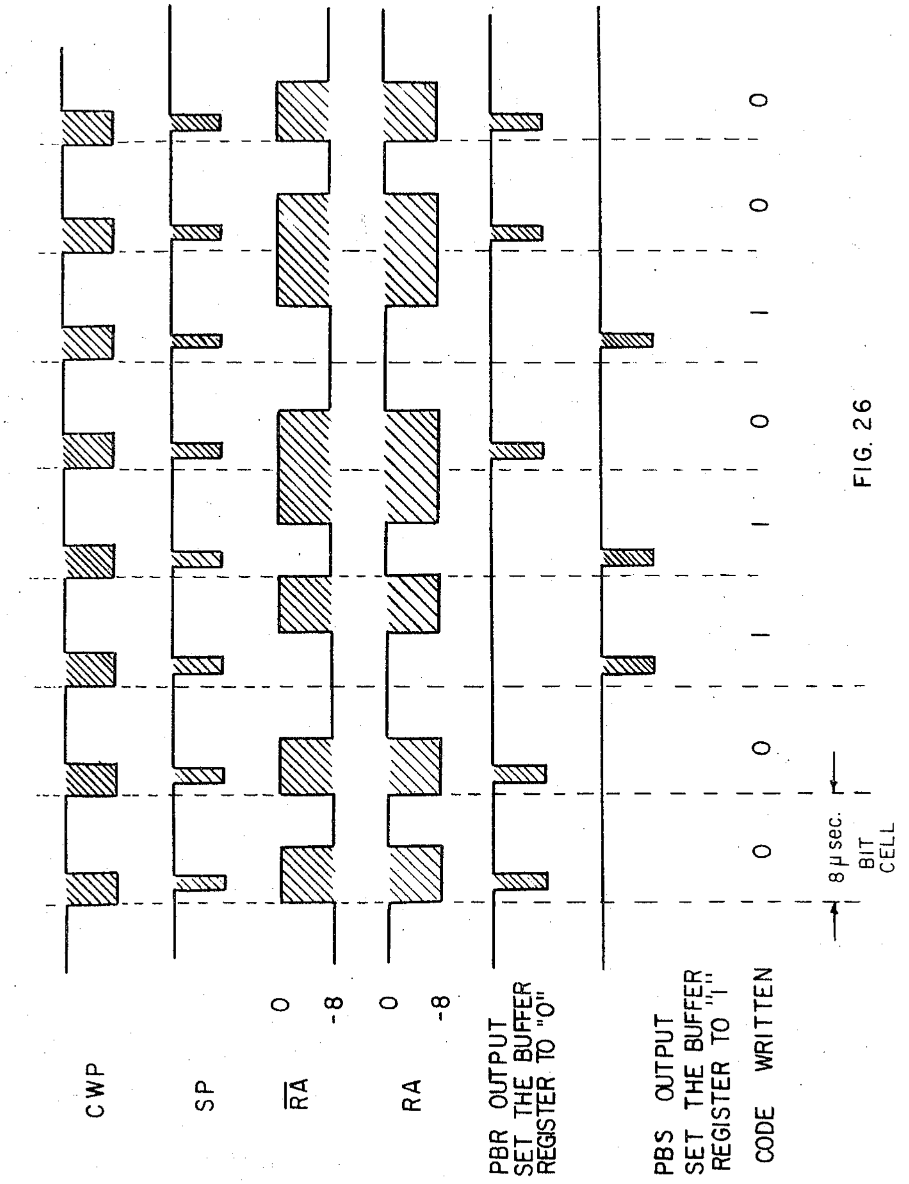
FIGS. 26 and 27 are the waveforms and pulse timing diagrams useful for an understanding of the system.

FIGURE 26 shows a timing diagram of the strobing process.

CHAPTER 6—PULSE GENERATION AND DISTRIBUTION

*Summary*

The pulse generation circuit generates the clock trains necessary for the operation of the translator. It makes use of monostable multivibrators to provide the required delays and shaping of pulses.

6.1 *Pulse trains and tolerances*.—Timing is derived from two master clock tracks recorded on the drum, one track providing 4096 pulses per drum revolution, the other providing one pulse per revolution. The master clock tracks are written from two discs engraved on the drum surface (phonic discs). The pulse trains developed are shown in Table 6–1 and FIGURE 27.

TABLE 6-1

| Pulse | Description | Duration | Delay | Period |
|---|---|---|---|---|
| DIP | Drum Index Pulse | 2+0.25 μsec. | 0 | 8.1 μsec. |
| ADIP | Auxiliary Drum Index Pulse | 2+0.25 μsec. | 4+0.25 μsec. | 8.1 μsec. |
| DIPR | Strobe Pulse | 0.75+0.25 μsec. | 0 | 8.1 μsec. |
| DIPW | Write Pulse | 2.25+0.25 μsec. | −(0.5+0.7) μsec. −0.4 | 8.1 μsec. |
| DRP | Drum Reset Pulse | 2+0.25 μsec. | Coincident with ADIP | 33.3 μsec. |

Delay is measured from an arbitrary zero reference which for convenience is taken as being the 10% point of the leading edge of DIP or DIPR. It can be seen that the most critical tolerance has to be met in the delay between DIPW and DIPR: nominally DIPW must precede DIPR by ½ μsec.

DIP, DIPR, DIPW, and ADIP are derived from one written track, which is read out continuously through read amplifier RC1; DRP is derived from the second written track, being read out through read amplifier RC3.

Figure 28:
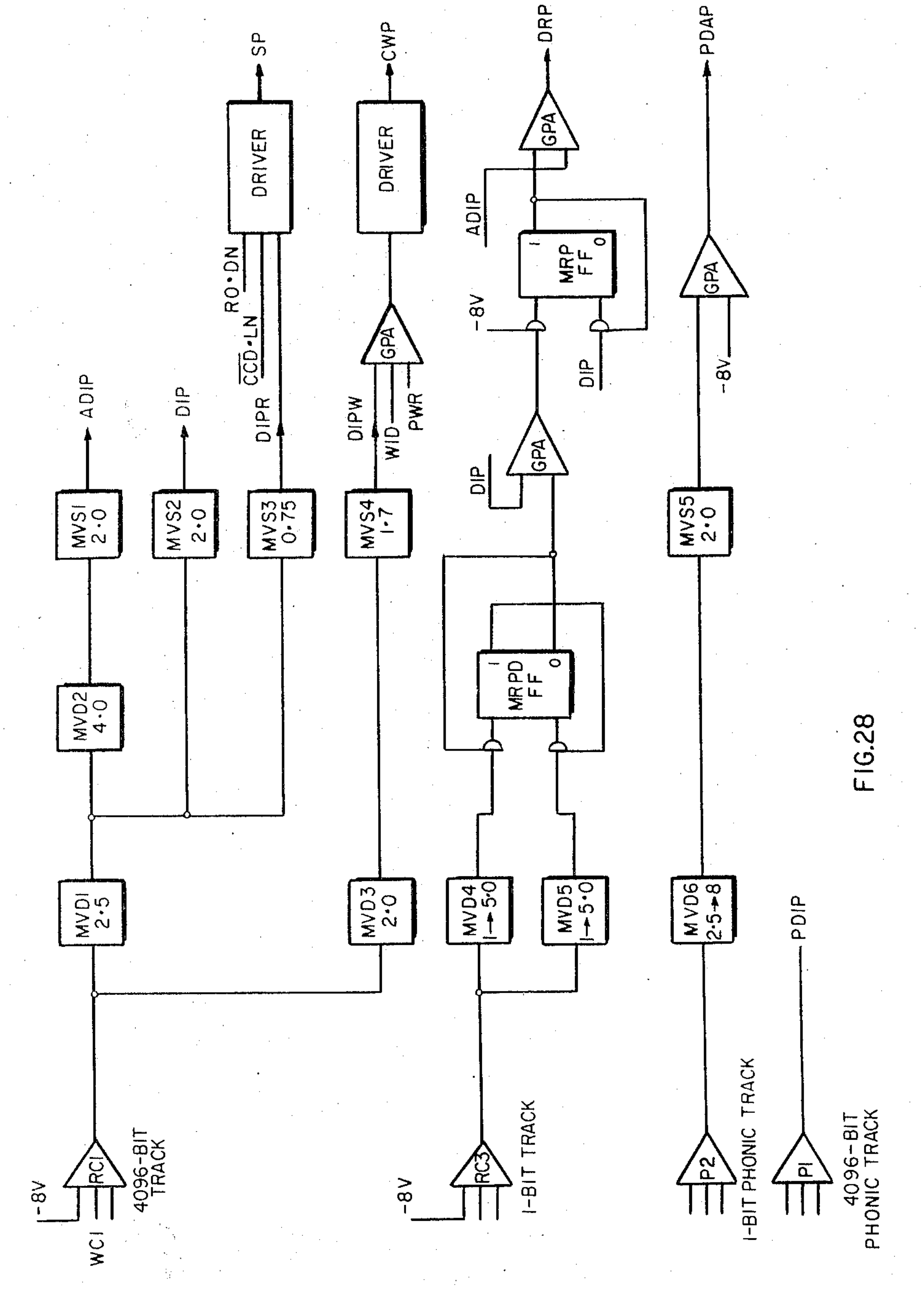
FIG. 28 is a pulse generator block diagram.
Figure 29:
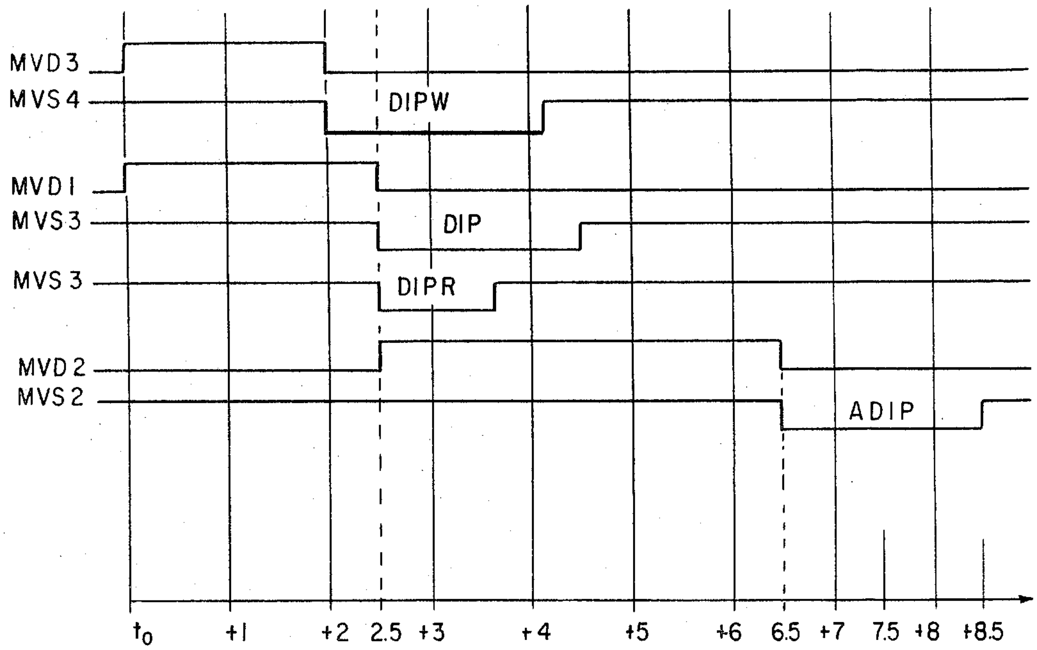
FIG. 29 is a pulse timing tolerance diagram.

6.2 *Derivation of pulse trains* (*FIG. 28*).—With reference to FIG. 28, it can be seen that monostable multivibrators are used for either delays (MVD) or shaping (MVS). The 4096-bit clock track WC1 is read out through RC1 at time $t=t_0$ (see FIG. 29). DIPW is produced from MVS4, and being delayed through MVD3 is produced at $t=t_0+2$ μsec. Similarly DIP and DIPR are produced from MVS2 and MVS3 respectively and being delayed through MVD1 are produced at $t=t_0+2.5$ μsec. Thus, is can be seen that DIPW leads DIPR by 0.5 μsec. MVD1 is a variable delay monostable (1–5 μsec.) to enable DIPR to be adjusted to either precede or follow DIPW. The delays are as shown in FIGURES 28 and 29; it can be seen that there is no need for the MVD3 delay, provided $MVD1=0.5$ μsec. ADIP is subject to the delays of MVD1 and MVD2 and is therefore produced at $t=t_0+6.5$ μsec. However, it is delayed with respect to DIP by only 4 μsec.

DIP and ADIP are fed to the pulse distributor circuit where they are buffered through cascaded gated pulse amplifiers, and distributed throughout the system. Given the critical timing tolerances between DIPW and DIPR, both these pulse trains are buffered in special pulse amplifiers capable of driving all writing amplifiers and playback switches simultaneously. This minimizes both differential propagation delays and the pulse stretching effect involved in cascading gated pulse amplifiers. The logical gating of DIPW is performed using a gated pulse amplifier, so that the driver output CWP is produced as follows:

$$CWP=(AP\text{-}WID+TP\text{-}PWR)\ DIPW$$

CWP, coincident write pulse, is therefore gated out during WID (see Chapter 10) in the process coincidence auxiliary circuit, and causes all write amplifiers of the selected segment to write in the appropriate address location. CWP can also be enabled for a complete drum revolution by depressing the prerecord button PWR in the test panel. This procedure enables all tracks of a selected segment to be pre-recorded with either ones or zeros. The logical gating of DIPR is performed on the driver itself so that the driver output SP is produced as follows:

$$SP=(AP-RO\cdot CC-DN+NC-\overline{CCD}\cdot LN)DIPR$$

SP, strobe pulse, is gated out during a directory number translation at time RO (see Chapter 10), under the control of the process coincidence auxiliary circuit, and causes all playback switches to be strobed simultaneously, thus causing a drum readout into the buffer register. During a line number translation, strobing takes place continuously until coincidence is found, i.e. during $\overline{CCD}$.

Figure 27:
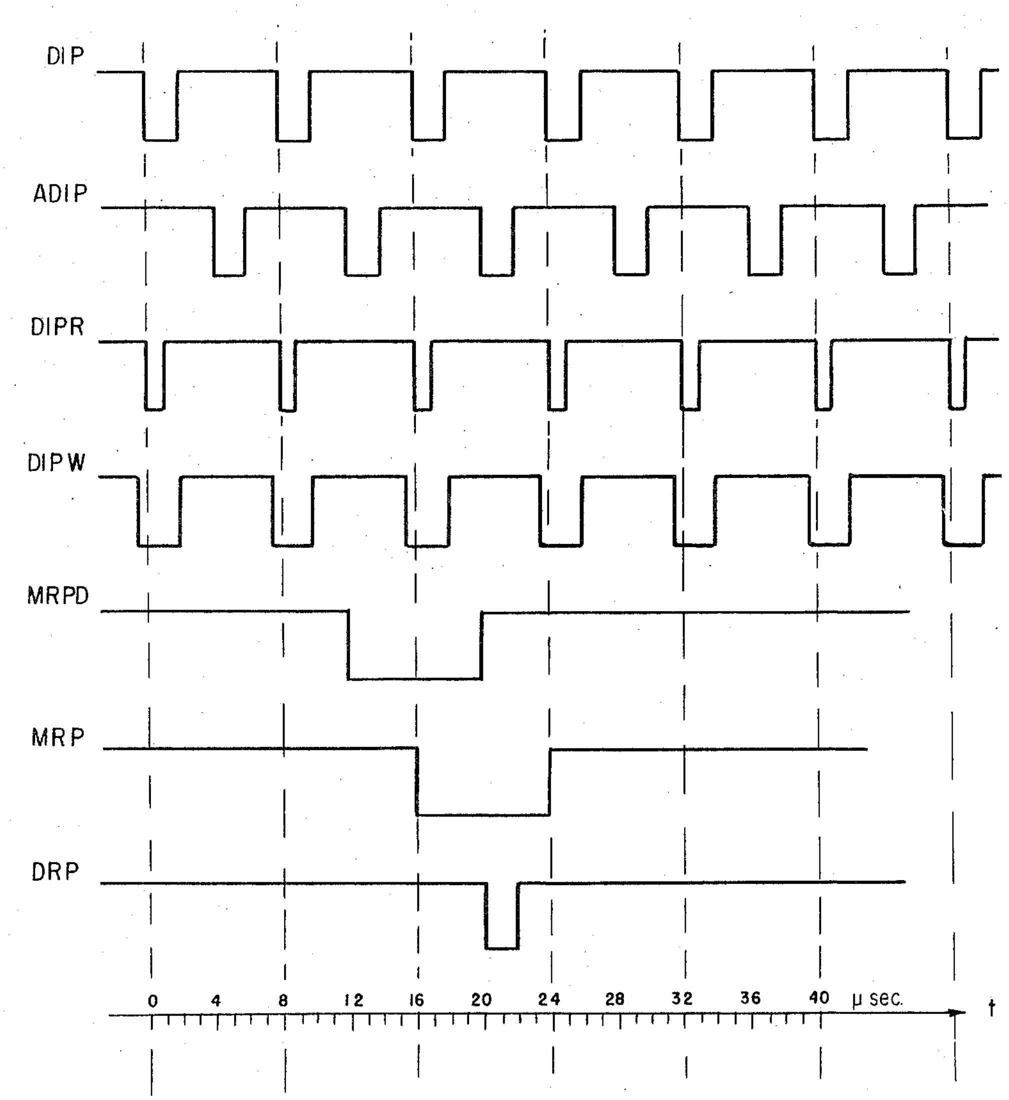

DRP is derived from a clock track on the drum, in which one bit only is recorded. The read out from RC3 is fed to MVD4 and MVD5; the trailing edge of the output of MVD4 is used as the A.-C. set command to the MRPD flip-flop, and the output of MVD5 similarly used for the A.-C. reset. The delays of MVD4 and MVD5 can be so adjusted as to cause MRPD to gate out only one DIP in a gated pulse amplifier, as shown in FIGURE 27. This gated pulse is used in turn to set the MRP flip-flop, so that one ADIP pulse can be gated out of the succeeding gated pulse amplifier, thus producing the system's DRP.

6.3 *Phonic disc circuitry.*—The phonic discs are read out through special read amplifiers, with variable gain adjustment. The 4096-bit disc, read out of P1 as PDIP, is fed to the test panel where it is used to write the system's master clock tracks. The 1-bit disc is read out of P2, delayed through MVD6, shaped through MVS5, and buffered through a gated pulse amplifier to form PDRP. This pulse is also fed to the test panel where it is used to write the system's DRP track: MVD6 delay adjustment enables the recorded DRP to be placed approximately between two ADIP pulses, thus supplementing the delay adjustments of MVD4 and MVD5.

6.4 *Pulse distribution.*—The distribution system buffers the generated pulse trains and distributes them to all parts of the translator. For purposes of loading and timing the loads presented to the pulse distributor are divided into 2 general classes, direct and indirect.

6.4.1 *Load classification.*—Direct loads are class 4 *inputs* (flip-flop A.-C. inputs) with no intervening gating between the distributor and loads. Indirect loads are class 2 loads that interpose another stage of gating between the distribution system and flip-flops. After the clock buffer gated pulse amplifier, all direct loads are fed through one more level of gated pulse amplifiers and all indirect loads are fed directly.

The extra GPA introduces a compensating delay into the direct loads and also provides isolation between the flip-flops A.-C. commands and the other pulse inputs.

6.4.2 *Loading.*—For system pulse allocation, the distribution system is set up so that each gated pulse amplifier drives about 10 loads. This is done to limit the pulse stretch and deterioration of the trailing edge as much as possible while keeping the number of gated pulse amplifiers at a minimum.

6.4.3 *Special drivers*:

6.4.3.1 *Coincident write pulse, CWP.*—A complementary driver is used to distribute CWP to the A.-C. inputs of all 54 write amplifiers. The write pulse, DIPW, is thereby subject to the delay and stretch of one gated pulse amplifier and a complementary driver which is considered tolerable.

6.4.3.2 *Strobe pulse, SP.*—A modified gated pulse amplifier is used to distribute SP to all 27 playback switches. The strobe pulse DIPR is thereby subject to only the delay and stretch of the modified gated pulse amplifier, which is considered tolerable. The modified circuit is suitable to buffer and distribute pulses of very short duration, 0.7 $\mu$sec to 1.0 $\mu$sec (and high current level) and can be effectively used to strobe readout from the read amplifiers.

CHAPTER 7—ACCESS AND EXIT CIRCUITRY

*Summary*

This chapter covers the allocation of Translator services to the originating register-sender groups, the receiving of information to be translated, and the sending of translated information back to the originating register-sender group being served.

7.1 *Introduction.*—The translator provides service to a number of register-sender groups. The register-sender groups request service from the translator in a random fashion by producing a D.-C. signal over a call line connected to the allotter, and it is conceivable that many will be requesting service simultaneously. Since the translator can serve only one register-sender group at a time, an allotter is provided which interrogates the condition of one call line at a time. Furthermore, since all the register-sender groups are given equal preference as far as acquiring the services of the translator, the allotter is equipped to scan the call lines in succession. Once a register-sender group call signal has been detected, the allotter will lock in the corresponding position and remain locked while the translator receives information and completes the required translation. Completion of the translation allows the allotter to unlock and continue scanning.

After the call signal has been acknowledged by the allotter, the translator receiver circuit allows the translator to accept binary data from the register-sender group. The locked in state of the allotter causes the receiver circuit to send a GO signal to the register-sender group requesting service. At this particular time, the correct receiver is enabled to receive diphase information from the register-sender group over a diphase highway. The register-sender group awaits the GO signal before it starts sending diphase information. The selected receiver demodulator and synchronizer accepts and decodes the diphase information from the highway and presents the proper binary levels and shift pulses to the translator access register.

The translator access register serves the purpose of conveying the decoded binary input information into the translator for subsequent translation. It also is used to accept the translated binary information in parallel form and serially shift this information out to the translator sender.

The translator sender accepts logic level outputs from the translator access register and converts this information to diphase signals to be sent back to the register-sender groups.

7.2 *Sequence of operations*:

7.2.1—A logic level (derived from a call signal operating a reed relay) appears at the input of an allotter position gate (AP1 to AP20).

7.2.2—The allotter scans this position by presenting two scanner position signals to the input of the allotter position gate (7.2.1 above).

7.2.3—The signals in 7.2.1 and 7.2.2 are gated together in the same allotter position gate which is also being held enabled by the transfer signal.

7.2.4—The output of the allotter position gate in 7.2.3 is used to set flip-flop L0.

7.2.5—$\overline{LO}$ is fed to the control circuit and changes the control state from IDLE to RECEIVE.

7.2.6—The reception of the not idle signal back from the control circuit prevents further scanning, i.e., the allotter is now locked in.

7.2.7—The allotter scanner position leads belonging to the locked in decoded position are gated with the receive signal from the control circuit in the translator receiver circuit.

7.2.8—The gating in 7.2.7 above produces a GO signal which is sent to the register-sender group being served.

7.2.9—The same gating in 7.2.7 above enables the particular receiver (synchronizer and demodulator) to accept diphase information from the register-sender group.

7.2.10—Once the GO signal is received the register-sender group begins to send diphase modulated information to the receiver chosen in 7.2.9 above.

7.2.11—The receiver (synchronizer and demodulator) decodes the diphase signals into logic levels which are fed serially into the translator access register.

7.2.12—As soon as the translator access register has received its information, the control circuit is placed in the PROCESS state which inhibits the receiver. The PROCESS state continues until the required translation has been completed.

7.2.13—Once the translation has been completed, the translated information appears in the translator access register; and the control circuit is changed to the SEND state.

7.2.14—The translator sender synchronizer is activated and proceeds to serially shift the translated information out of the translator access register. At the same time, the sender modulator converts the outgoing logic levels into diphase information which is sent back to the register-sender group.

7.2.15—After sending has been completed, the control circuit is returned to the IDLE state.

7.2.16—Reception of idle signal from the control circuit causes the allotter to unlock itself and continue scanning.

7.3 *Translator allotter*:

7.3.1 *General.*—The circuit contains a scanner which is an eleven-stage ring counter S1–S11 with 21 two-bit decoded position outputs. The scanner is driven by its own pulse distributor which produces the scanner stepping pulse SSP and the scanner reset pulse SRP. The pulse distributor also produces a frequency division from the basic 122.8 kc. rate (8.1 $\mu$sec. period) of the system to the scanner rate of 30.8 kc. (32.5 $\mu$sec. period). The 21 two-bit decoded position outputs of the scanner are sensed by 21 allotter position gates, AP1 to AP21. Each allotter position gate is also fed by a logic level derived through a reed relay energized by the call signal initiated at the register-sender group assigned to that particular scanner position. In this application, 20 register-sender groups and a local console are capable of gaining access to the Translator. Access to the Translator is achieved by the successful gating of an allotter position and its corresponding logic level input from the respective register-sender group along with the transfer signal. Once the call for service is detected, the allotter communicates with the control circuit changing it from the idle state to the receive state. The control circuit, in turn, causes the allotter to stop scanning and lock.

7.3.2 *Circuit description*:

7.3.2.1 *Scanner counter.*—The scanner counter is a 21-position ring counter consisting of 11 flip-flops (S1 to S11) and 21 decoding NOR gates (AP1 to AP21). The flip-flops are arranged in shift register fashion. The ring is closed by a reversal of feedback from the last stage back to the first, i.e., the 1 output of S11 is fed back to the D.-C. reset of S1, while the 0 output of S11 is feedback to the D.-C. set of S1. The A.-C. set and reset inputs are all tied together and are fed by the SSP pulse lead. The D.-C. resets of all the flip-flops are tied to −8 volts, and the correspanding A.-C. resets are tied together and fed by SRP which resets all the flip-flops once per scanner cycle. This feature allows the scanner to be self-starting and self-correcting.

The counter exhibits the code shown on the table below. The decoding is facilitated with only two outputs per position being necessary, as shown.

| S1 | S2 | S3 | S4 | S5 | S6 | S7 | S8 | S9 | S10 | S11 | Decoding Logic | No. |
|---|---|---|---|---|---|---|---|---|---|---|---|---|
| 0 | 0 | 0 | 0 | 0 | 0 | 0 | 0 | 0 | 0 | 0 | $\overline{S1}$ $\overline{S11}$ | 1 |
| 1 | 0 | 0 | 0 | 0 | 0 | 0 | 0 | 0 | 0 | 0 | S1 $\overline{S2}$ | 2 |
| 1 | 1 | 0 | 0 | 0 | 0 | 0 | 0 | 0 | 0 | 0 | S2 $\overline{S3}$ | 3 |
| 1 | 1 | 1 | 0 | 0 | 0 | 0 | 0 | 0 | 0 | 0 | S3 $\overline{S4}$ | 4 |
| 1 | 1 | 1 | 1 | 0 | 0 | 0 | 0 | 0 | 0 | 0 | S4 $\overline{S5}$ | 5 |
| 1 | 1 | 1 | 1 | 1 | 0 | 0 | 0 | 0 | 0 | 0 | S5 $\overline{S6}$ | 6 |
| 1 | 1 | 1 | 1 | 1 | 1 | 0 | 0 | 0 | 0 | 0 | S6 $\overline{S7}$ | 7 |
| 1 | 1 | 1 | 1 | 1 | 1 | 1 | 0 | 0 | 0 | 0 | S7 $\overline{S8}$ | 8 |
| 1 | 1 | 1 | 1 | 1 | 1 | 1 | 1 | 0 | 0 | 0 | S8 $\overline{S9}$ | 9 |
| 1 | 1 | 1 | 1 | 1 | 1 | 1 | 1 | 1 | 0 | 0 | S9 $\overline{S10}$ | 10 |
| 1 | 1 | 1 | 1 | 1 | 1 | 1 | 1 | 1 | 1 | 0 | S10 $\overline{S11}$ | 11 |
| 1 | 1 | 1 | 1 | 1 | 1 | 1 | 1 | 1 | 1 | 1 | S1 S11 | 12 |
| 0 | 1 | 1 | 1 | 1 | 1 | 1 | 1 | 1 | 1 | 1 | $\overline{S1}$ S2 | 13 |
| 0 | 0 | 1 | 1 | 1 | 1 | 1 | 1 | 1 | 1 | 1 | $\overline{S2}$ S3 | 14 |
| 0 | 0 | 0 | 1 | 1 | 1 | 1 | 1 | 1 | 1 | 1 | $\overline{S3}$ S4 | 15 |
| 0 | 0 | 0 | 0 | 1 | 1 | 1 | 1 | 1 | 1 | 1 | $\overline{S4}$ S5 | 16 |
| 0 | 0 | 0 | 0 | 0 | 1 | 1 | 1 | 1 | 1 | 1 | $\overline{S5}$ S6 | 17 |
| 0 | 0 | 0 | 0 | 0 | 0 | 1 | 1 | 1 | 1 | 1 | $\overline{S6}$ S7 | 18 |
| 0 | 0 | 0 | 0 | 0 | 0 | 0 | 1 | 1 | 1 | 1 | $\overline{S7}$ S8 | 19 |
| 0 | 0 | 0 | 0 | 0 | 0 | 0 | 0 | 1 | 1 | 1 | $\overline{S8}$ S9 | 20 |
| 0 | 0 | 0 | 0 | 0 | 0 | 0 | 0 | 0 | 1 | 1 | $\overline{S9}$ S10 | 21 |

7.3.2.2 *Pulse distributor.*—The pulse distributor provides the following three functions:

(1) Counts down the basic DIP pulse rate by four.

(2) Produces the scanner stepping pulse train SSP and the scanner reset pulse SRP.

(3) Prevents the above pulses from stepping the scanner upon reception of a not idle signal.

The count down of four is accomplished by utilizing a two-stage binary counter consisting of flip-flops CD1 and CD2 and NOR gates #1 and #3. The design considerations are:

| CD1 | CD2 | Pos. | Logic Equations |
|---|---|---|---|
| 0 | 0 | 1 | Set NA-CD1=NA-$\overline{\text{CD1}}$ |
| 1 | 0 | 2 | Reset NA-CD1=NA-CD1 |
| 0 | 1 | 3 | Set NA-CD2=NA-CD1 NA-$\overline{\text{CD2}}$ |
| 1 | 1 | 4 | Reset NA-CD2=NA-CD1 NA-CD2 |

Figure 30:
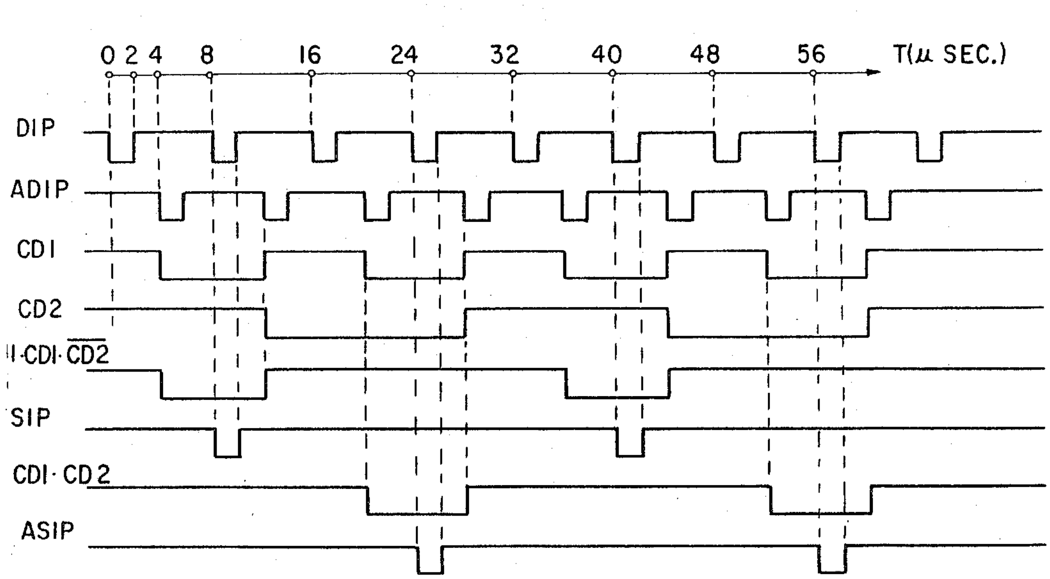
FIG. 30 is a timing diagram for the SIP and ASIP generation.

The A.-C. set and A.-C. reset inputs of CD1 and CD2 are tied together and fed by ADIP. CD1 is connected in complementary fashion. Position 4 feeds both the D.-C. reset of CD2 and the D.-C. input to a gated pulse amplifier GPA #6. The output of GPA #6 becomes the auxiliary scanner index pulse ASIP. Position 2 feeds the D.-C. set of flip-flop CD2. A gate 4 containing the position 2 input leads ($\overline{\text{CD1}}$ and CD2) and the inhibit lead $\overline{\text{I}}$ feeds the D.-C. input of a GPA #7. The output of GPA #7 becomes the scanner index pulse SIP. The above configuration yields the following logical expressions for SIP and ASIP. Refer to FIGURE 30 which shows time relationship between the drum index pulses and the scanner index pulses.

$$SIP=NA\text{–}CD1\ NA\text{–}\overline{CD2}\ CC\text{–}\overline{I}\ DIP \quad (1)$$

$$ASIP=NA\text{–}CD1\ NA\text{–}CD2\ DIP \quad (2)$$

A flip-flop PD, gates #2 and #5, and GPA #8 and #9 are arranged in such a manner as to produce the following:

$$SRP=NA\text{–}PD\ SIP \quad (3)$$

$$SSP=NA\text{–}\overline{PD}\ SIP \quad (4)$$

where:

$$\text{Set } NA\text{–}PD=NA\text{–}\overline{S9}\ NA\text{–}S10\ ASIP \quad (5)$$

$$\text{Reset } NA\text{–}PD=NA\text{–}\overline{S9}\ NA\text{–}S10\ ASIP \quad (6)$$

Figure 31:
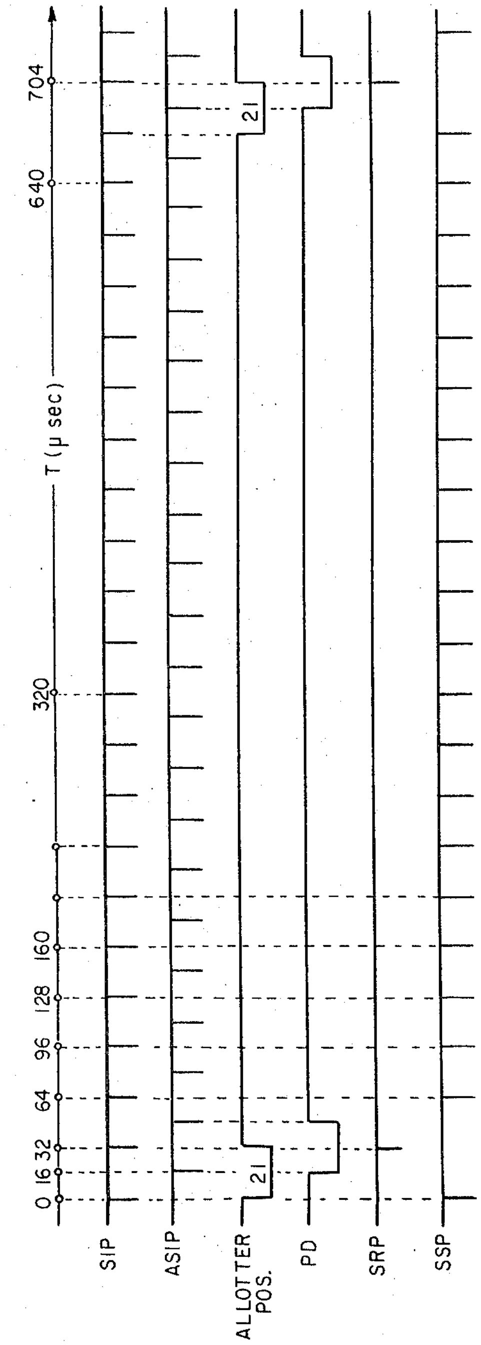
FIG. 31 is a timing diagram for the SRP and SSP generation.

By the above treatment (refer to FIGURE 31) both a stepping pulse SSP is produced as well as a scanner reset pulse SRP. SRP resets the scanner in a particular code (all zeros) once per cycle of 21; i.e. there are 20 SSP pulses and 1 SRP per 21 steps of the counter. If the counter starts off in a redundant code (one not represented in the code table), this code will propagate till the PD flip-flop becomes set. Once this happens SRP will become true, and the counter will be forced into a usable code (all zeros). The use of such an arrangement allows the counter to be self-starting and self-correcting.

7.3.2.3 *Allotter seizure.*—To successfully acknowledge a call signal, the following logic must be fulfilled.

$$NA\text{–}FL=NA\text{–}AP1+NA\text{–}AP2+NA\text{–}AP3\ \ldots\ +NA\text{–}AP21$$

where:

NA as a prefix indicates the allotter circuit.
CP as a prefix indicates the console panel.
CO as a prefix indicates the console register.

$NA\text{–}AP1=NA\text{–}\overline{S1}\ NA\text{–}\overline{S11}\ NA\text{–}TC1\ CP\text{–}TSO$ (Pos. 1)

$NA\text{–}AP2=NA\text{–}S1\ NA\text{–}\overline{S2}\ NA\text{–}TC2\ CP\text{–}TSE$ (Pos. 2)

$NA\text{–}AP20=NA\text{–}\overline{S8}\ NA\text{–}\overline{S9}\ NA\text{–}TC20\ CP\text{–}TSE$ (Pos. 20)

$NA\text{–}AP21=NA\text{–}\overline{S9}\ NA\text{–}S10\ CO\text{–}CEF\ CP\text{–}TSCE$ (Pos. 21)

The TC signals are the logic levels from the register circuits.

The FL signal becomes the D.-C. set command for flip-flop 10 which is triggered by ASIP. $\overline{\text{LO}}$ is fed to the control circuit where it is used to reset the I flip-flop and set the R flip-flop. After LO becomes set, I is returned from the control circuit and is uesd to prevent further scanning by inhibiting the SIP pulse. When the allotter is locked in, the allotter position outputs, which are fed to the receivers along with the receive signal, select the correct receiver and send back a GO signal to the register-sender group.

Figure 32:
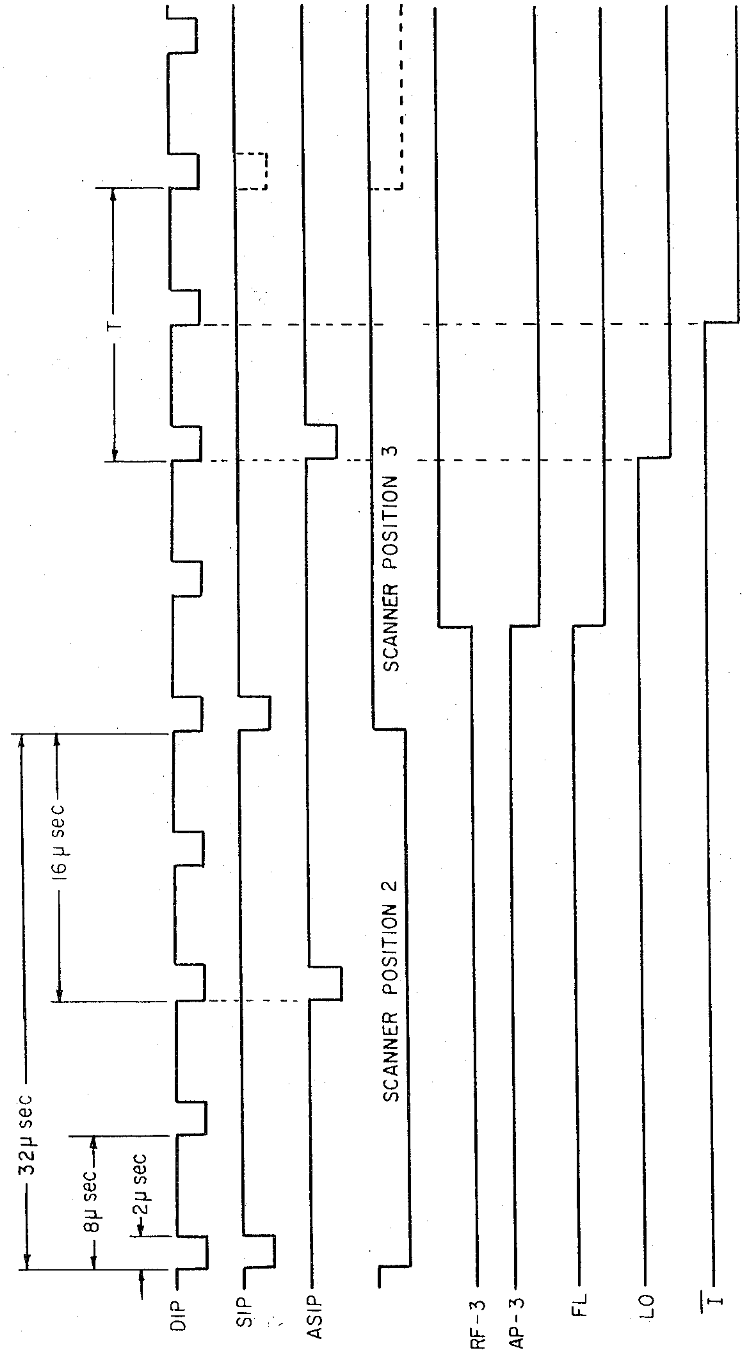

The LO flip-flop serves other purposes aside from storing the FL signal. It eliminates the possibility of partial gating, i.e. if a call signal should appear toward the end of a particular time interval, there is a possibility that by the time the idle signal is returned from the control circuit the scanner may have stepped on, resulting in a faulty locked in postion. Because the LO flip-flop is strobed with an ASIP pulse, it will always be set in the middle of a time interval thus giving the $\overline{\text{I}}$ signal 16 μsec. to be returned from the control circuit (see FIGURE 32 for reference).

Secondly, the LO flip-flop serves as a buffer stage between the register-sender group call signal and the electronic circuitry. FL might be the result of a spurious signal due to contact bounce, which will be sufficient to set the LO flip-flop. Thus, a signal which is subjected to contact bounce from closure of relay contacts will produce a distinct output from the flip-flop.

7.3.2.4 *Transfer facility.*—The manner in which the traffic load is distributed between two translators (A and B) of a translator pair is decided upon at the allotter. Each translator is allowed to carry full, half, or no load in the following manner:

Condition 1: Translator A serving 10 odd-numbered register-sender groups; Translator B serving the 10 even-numbered register-sender groups (half load).

Condition 2: Translator A serving 10 even-numbered register-sender groups; Translator B serving the 10 odd-numbered register-sender groups (half load).

Condition 3: Translator A serving all 20 register-sender groups (full load); Translator B serving none (no load).

Condition 4: All 20 register-sender groups disconnected from Translator A (no load); Translator B carrying full load.

The transfer leads $\overline{\text{TSE}}$, $\overline{\text{TSO}}$, and $\overline{\text{TSCE}}$ originating from the console panel are presented as inputs to the AP gates. $\overline{\text{TSE}}$ is connected to the even-numbered AP gates. $\overline{\text{TSO}}$ is connected to the odd-numbered AP gates (except AP21). $\overline{\text{TSCE}}$ is connected to AP21 (for local entry, see Chapter 8). Ground presented by the transfer lead enables the AP gates while −8 volts disables.

7.4 *Translator receiver circuit:*

7.4.1 *General.*—The translator receiver circuit consists of a receiver synchronizer and receiver demodulator for each register-sender group served by the translator. The receiver circuit includes provisions for serving twenty register-sender groups. The function served by the translator receivers consists of four main parts.

(1) To choose the correct diphase highway.

(2) To send a GO signal to the register-sender group requesting service.

(3) To decode the input diphase information from the register-sender group and present the D.-C. levels with corresponding shift pulses for the serial shifting of information into the translator access register during the RECEIVE state of the control circuit.

(4) To provide a bypass for processing local transmission from the console.

7.4.2 *Circuit description:*

Figure 14:
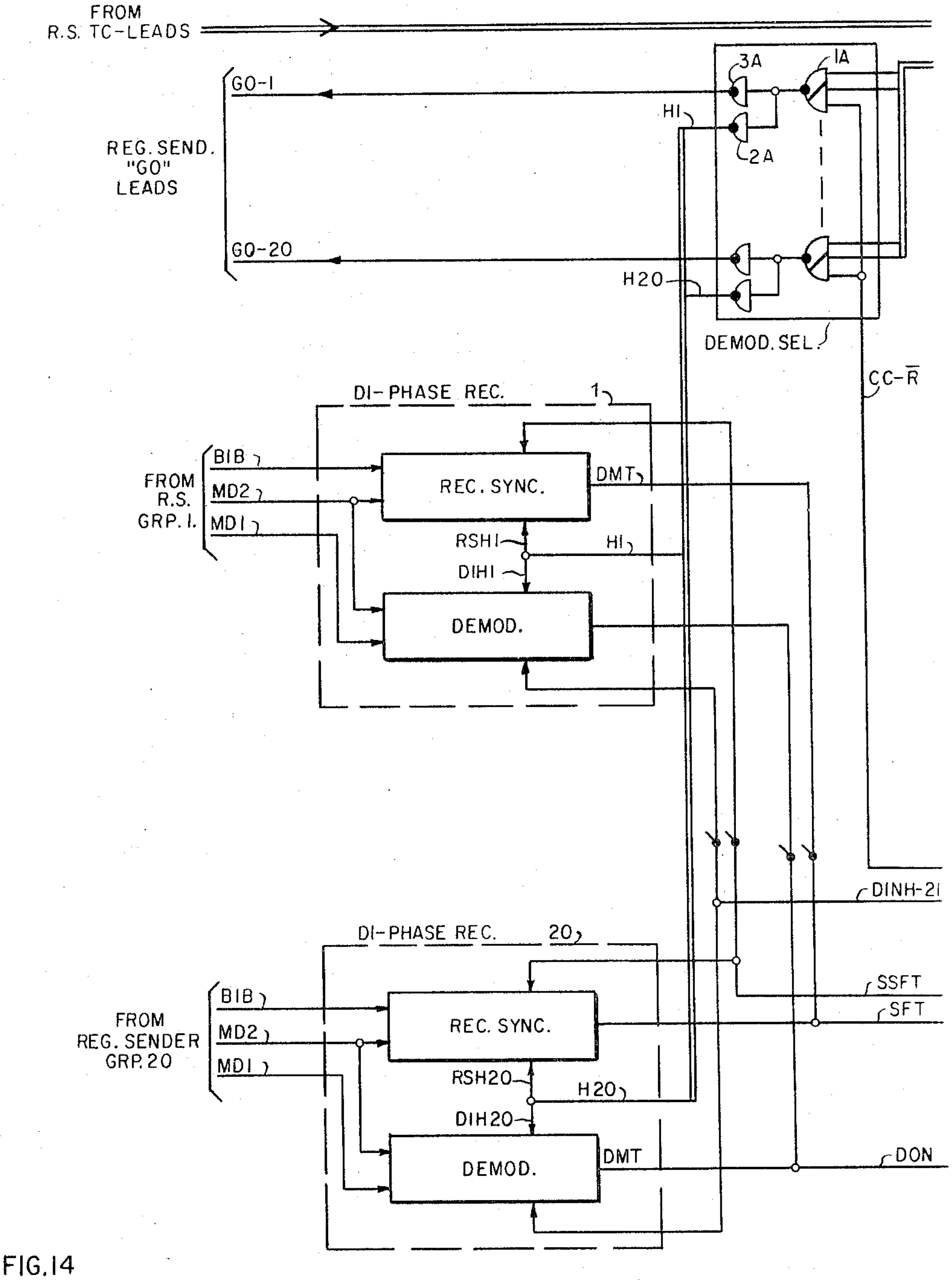

7.4.2.1 *Receiver selection.*—The selection of a particular receiver (demodulator and synchronizer FIG. 14) (TR) is made through gates #1A, #1B, #1C, #1D, etc. The logic of these gate outputs is as follows:

$TR\text{-}1A = NA\text{-}\overline{S1}\ NA\text{-}\overline{S11}\ CC\text{-}R$ (for register-sender group #1)

$TR\text{-}2A = NA\text{-}S1\ NA\text{-}\overline{S2}\ CC\text{-}R$ (for register-sender group #2)

$TR\text{-}3A = NA\text{-}S2\ NA\text{-}\overline{S3}\ CC\text{-}R$ (for register-sender group #3)

$TR\text{-}4 = NA\text{-}S3\ NA\text{-}\overline{S4}\ CC\text{-}R$ (for register-sender group #4)

Where S11, S1, $\overline{S1}$, S2, $\overline{S2}$, S3, $\overline{S3}$, and S4 are scanner position leads from the allotter; and $\overline{R}$ is taken from the R flip-flop in the process control circuit.

Each of the logic outputs (from receiver selection gates #1A, #2A, #3A, etc.) is fed to an inverter. The output of each inverter (#1B, #2B, #3B, etc., respectively) is fed to its particular receiver demodulator input (DIH–1 to DIH–20) which is commoned with its corresponding receiver synchronizer input (RSH–1 to RSH–20). In this application a zero voltage level presented to the DIH and RSH inputs enables the demodulator and synchronizer while a −8 volt signal disables.

7.4.2.2 *GO signal generation.*—The logic output of each receiver selection gate (#1A, #2A, #3A, etc., as mentioned above) is also fed to a second inverter (#1C, #2C, #3C, etc.) whose output is sent over a highway back to its corresponding register-sender group. The −16 volt lead along with the collector output constitute a signal pair which is used to energize a reed relay in the MT register of the corresponding register-sender group. This GO signal is interpreted as a signal to commence the sending of diphase modulated information to the translator.

7.4.2.3 *Diphase information handling.*—With the receiver demodulator and synchronizer enabled and the GO signal sent as described, the register-sender is capable of communicating with the translator via a diphase modulator highway. Diphase data enters the chosen translator receiver over a three-wire highway whose inputs are denoted by MT–MD1, MT–MD2, and MT–B1B. Each demodulator-synchronizer pair is fed by an individual register-sender group.

The outputs of the receiver demodulators (DMT–1, 2, 3, etc.) are tied together in OR gate fashion to produce the common output signal, DON. The enabled demodulator will produce a logic level (properly synchronized with the receiver synchronizer) on the DON output. This output carries the decoded binary information to be fed into the translator access register in serial form.

The outputs of the receiver synchronizers (RSS–1, 2, 3, etc.) are also tied together to form the common SFT output. SFT constitutes the translator access register shift pulses which propagate the logic levels appearing on the DON output into the translator access register at a basic period of 25 $\mu$sec. The synchronizer outputs are synchronized with the demodulator in such a manner as to have the D.-C. level changes of DON strobed at the midpoint of their cycle time. The period of DON is also 27 $\mu$sec.

7.4.2.4 *Bypass provision for local access* (see Chapter 8).

7.5 *Translator access register:*

Figure 6:
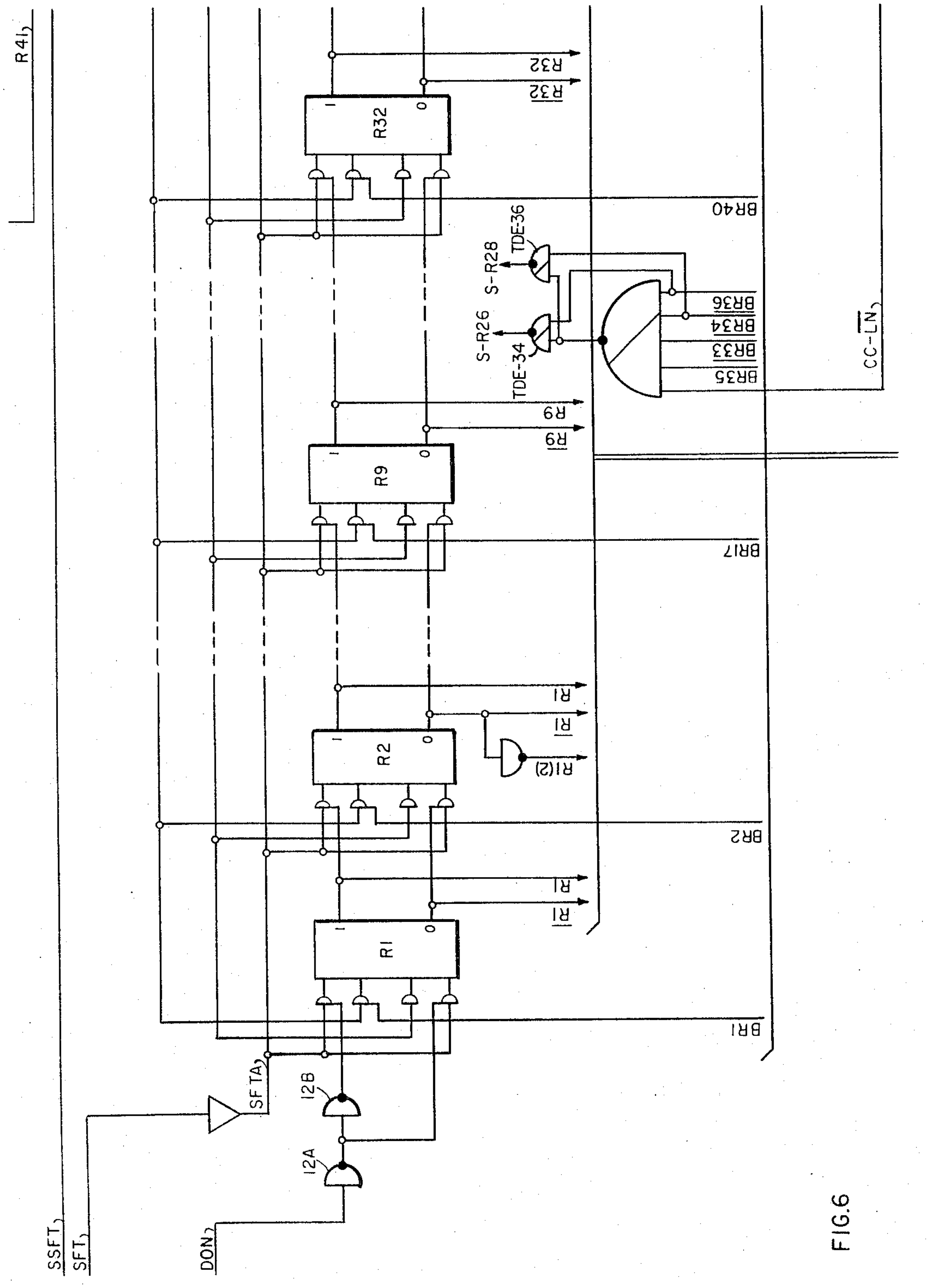
Figure 7:
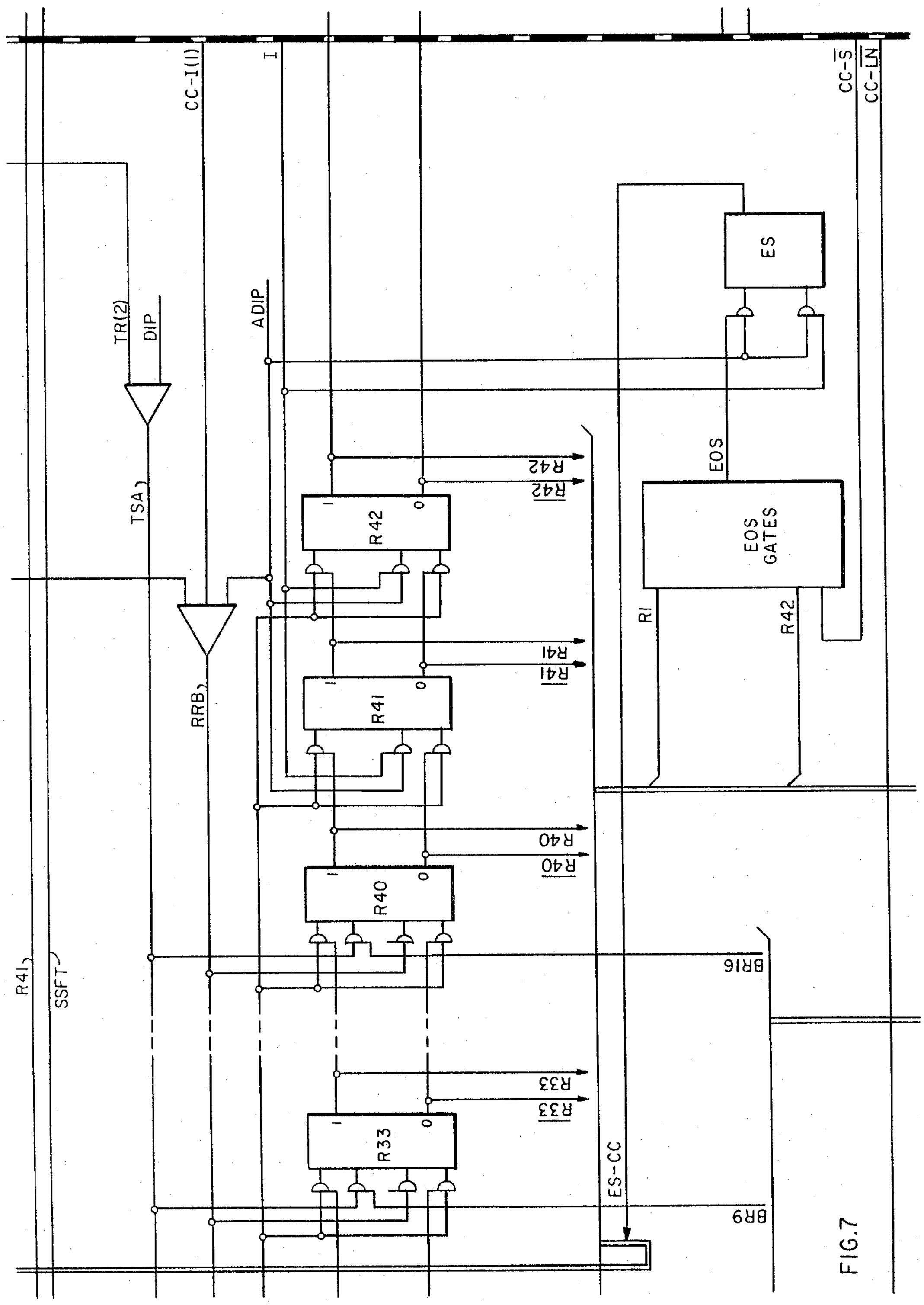

7.5.1 *Receiving.*—The DON signal input from the translator receiver circuit conveys a logic level which is fed to inverter #12A. The output of inverter #12A ($\overline{DON}$) is fed to the D.-C. reset of flip-flop R1 as well as the input of inverter #12B. The output of inverter #12B (DON) is fed to the D.-C. set of flip-flop R1. Flip-flops R1 to R42 (FIGS. 6 and 7) are connected in shift register fashion.

The SFT (shift pulse output from the translator receiver circuit) input is connected in multiple to the A.-C. sets and resets of flip-flops R1 to R42.

The above connections involving the flip-flop inputs allows the logic level appearing at the DON input to be propagated in serial fashion through each successive flip-flop. The information in any message conveyed by the DON input is always preceded by a prefix bit. When the prefix bit reaches the 41st flip-flop in the translator access register (R41) the control circuit will be put in the PROCESS state causing the shift pulses to cease; and the correct binary information in the prescribed order will then be contained in the translator access register, i.e. the RECEIVE state is complete (see also Chapter 4).

7.5.2 *Sending.*—After the desired translation has been completed, the control circuit is put in the SEND state; and the translator access register begins to receive SFT pulses causing the whole register to commence shifting out its information (consisting of the translated digits). In the SEND state the DON input will be forced to the zero state, thus feeding zeros into the translator access register. The DON inhibit in this application is made in the translator receiver circuit by the signal $\overline{R}$ from the control circuit. The output of the translator access register is fed to the translator sender circuit.

After the translator access register reaches the condition of having all zeros in its flip-flops, sending is considered to be completed; and an end of send signal EOS is produced by the EOS Gate circuit. This signal is recorded in the ES flip-flop (which is strobed with an auxiliary index pulse, ADIP). The output of the ES flip-flop communicates with the control circuit causing it to change from the SEND to the IDLE state. The ES flip-flop is then reset with the idle signal which is returned from the control circuit.

7.6 *Translator sender circuit:*

7.6.1 *General.*—The translator sender circuit provides the translator with a means for encoding the binary information stored in the translator access register and presenting a diphase modulated output to be sent via a diphase highway to the register-sender groups. It also is used to produce shift pulses for local transmission between the console register and the translator access register (see Chapter 8). The sender employs a diphase modulator and sender synchronizer.

7.6.2 *Circuit description:*

Figure 15:
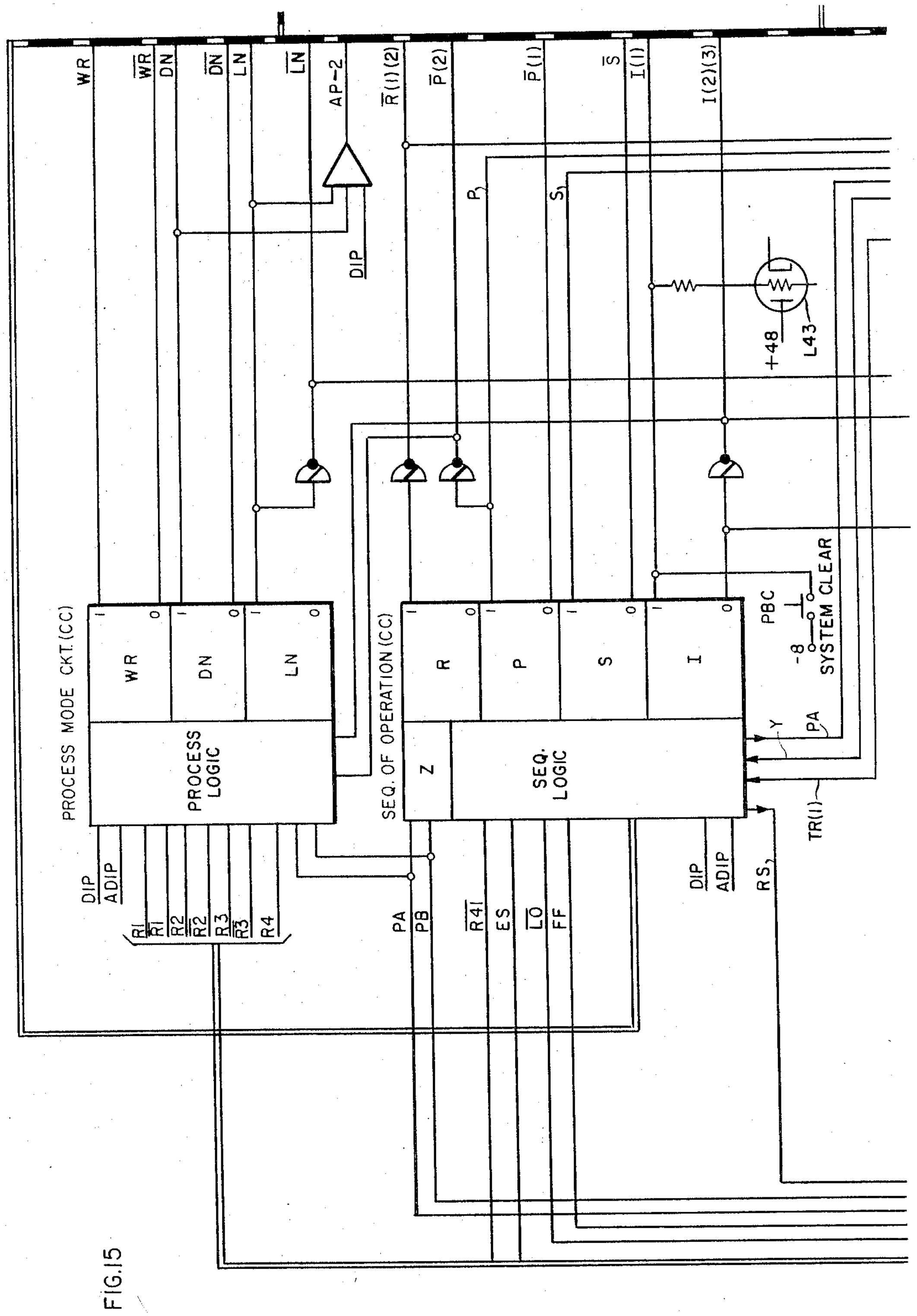

7.6.2.1 *Sending via the diphase highways.*—With the control circuit placed in the SEND state flip-flop S FIG. 15 along with the sender synchronizer timing pulse SST, will cause flip-flop SE to become set. The SE output enables the sender synchronizer by placing a logic zero at the SSH input to the synchronizer. Once enabled, the sender synchronizer will begin producing shift pulses at a 25 $\mu$sec. period which appear at the SSS output. The SSS pulses are buffered and leave the circuit as SHP pulses. The SHP pulses are transmitted to the test panel (Key SHPK shown) and enter the translator receiver circuit as SSFT pulses which are gated in OR fashion along with the receiver synchronizer pulses RSS to produce SFT pulses which are fed to the translator access register. The SFT pulses are used to serially shift the translated information out of the translator access register.

Figure 16:
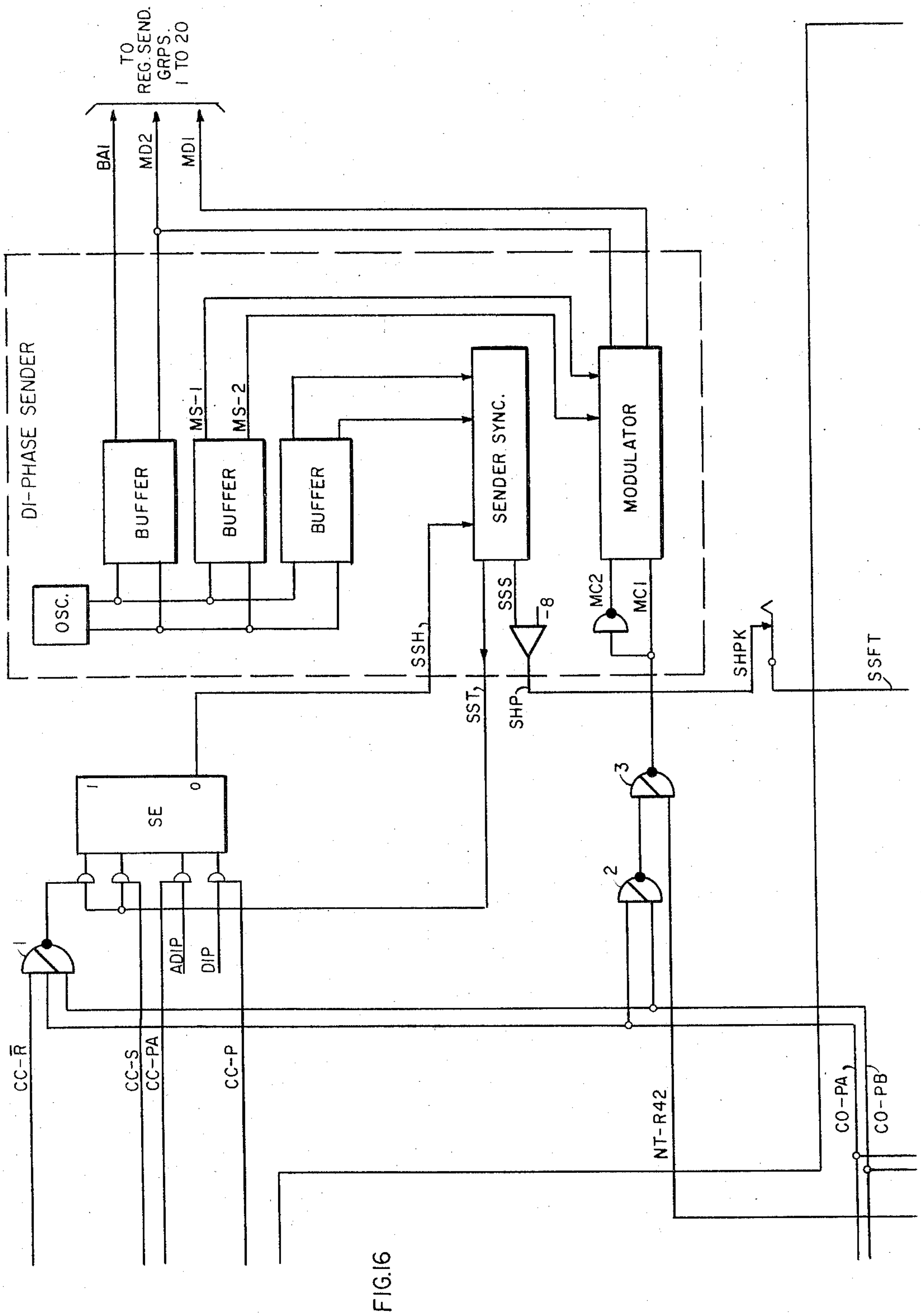

The logic levels appearing at the last stage of the translator access register (NT–R42) are propagated through gates #3 and 4 of FIGURE 16. The output of gate #3 is fed to the MC1 input of the sender modulator while the output of inverter #4 is fed to the MC2 input. In this application a one appearing at the MC2 input with a zero appearing at the MC1 input produces a modulated zero at the diphase output (MD1, MD2, and B1A). Conversely, a one presented to MC1 while a zero appears at MC2 will produce a one output. It should be noted here that the last flip-flop of the translator access register, NT–R42, serves as a buffer stage between the translator access register and the diphase sender modulator, i.e. during the processing of information (control circuit in the PROCESS state) NT–R42 will be in the zero state thus presenting a modulator output of zero. In the manner during processing no positive code is sent over the diphase highway.

The PA signal from the control circuit along with the auxiliary index pulse (ADIP) resets the SE flip-flop, when sending has been completed (or a time out signal detected).

The MD1 and MD2 outputs of the sender modulator along with the BA1 output from the buffer constitute the three outputs which are sent via a diphase highway to the register-sender groups. When the system is not in the SEND state, the diphase modulated output will be such that no positive code is sent, i.e. a constant sequence of zeros will be sent.

CHAPTER 8 LOCAL ACCESS AND EXIT CIRCUITRY

*Summary*

This chapter covers the allocation of Translator services to the local console for providing MONITOR (for directory or line number translations) and WRITE operations, the manner in which information (to be translated or written) is keyed in from the console panel, the receiving of this information is the translator, and the sending of the translated (or written) information back to the console.

8.1 *Introduction*.—The Translator is equipped to provide service to the local console for MONITOR and WRITE operations. In this application the local console and each of the 20 register sender groups (see Chapter 7) are given equal preference in acquiring the services of the translator. For a MONITOR operation the address and X instruction digit information are manually keyed by use of switch bank on the console display panel. This keyed information is transferred into the console register. The console request for service signal is also initiated manually at the console panel by engaging a pushbutton which sets a flip-flop in the console register. The output of the flip-flop is fed to the allotter where it is subsequently acknowledged (as described in 7.3.2.3). The locked in state of the allotter allows the contents of the console register to be serially shifted out of the console register and into the translator access register. In this application the sender synchronizer pulses are used for shifting, while the sender diphase modulator is kept by-passed in the translator sender circuit.

In performing a WRITE operation, the information to be written must be keyed by use of the switch bank on the console display panel, in addition to the keying of address and X digit instruction information described above, and prior to initiating the request for service signal. Entry into the translator for performing a WRITE operation is identical to that for performing a MONITOR operation. The WRITE information is strapped directly to the write amplifier circuits from the switch bank (see Chapter 5).

The information returned to the console register as a result of a MONITOR or WRITE operation is displayed by an indicator lamp bank on the display panel.

8.2 *Sequence of operations:*

Figure 18:
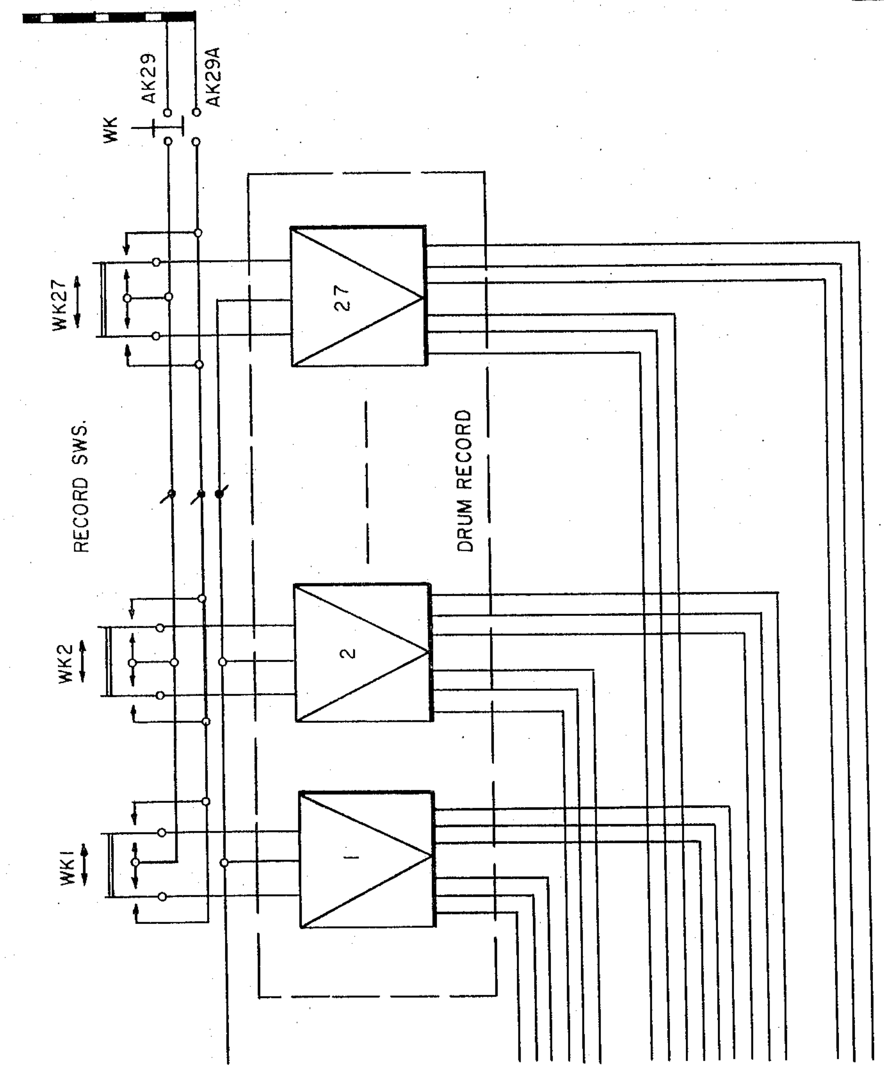

8.2.1 *Monitoring (for directory and line number translations)*:

8.2.1.1—The access keys (AK1 to AK41, FIG. 18) in the console display panel are set to the proper code representing the X instruction digit and the address.

Figure 8:
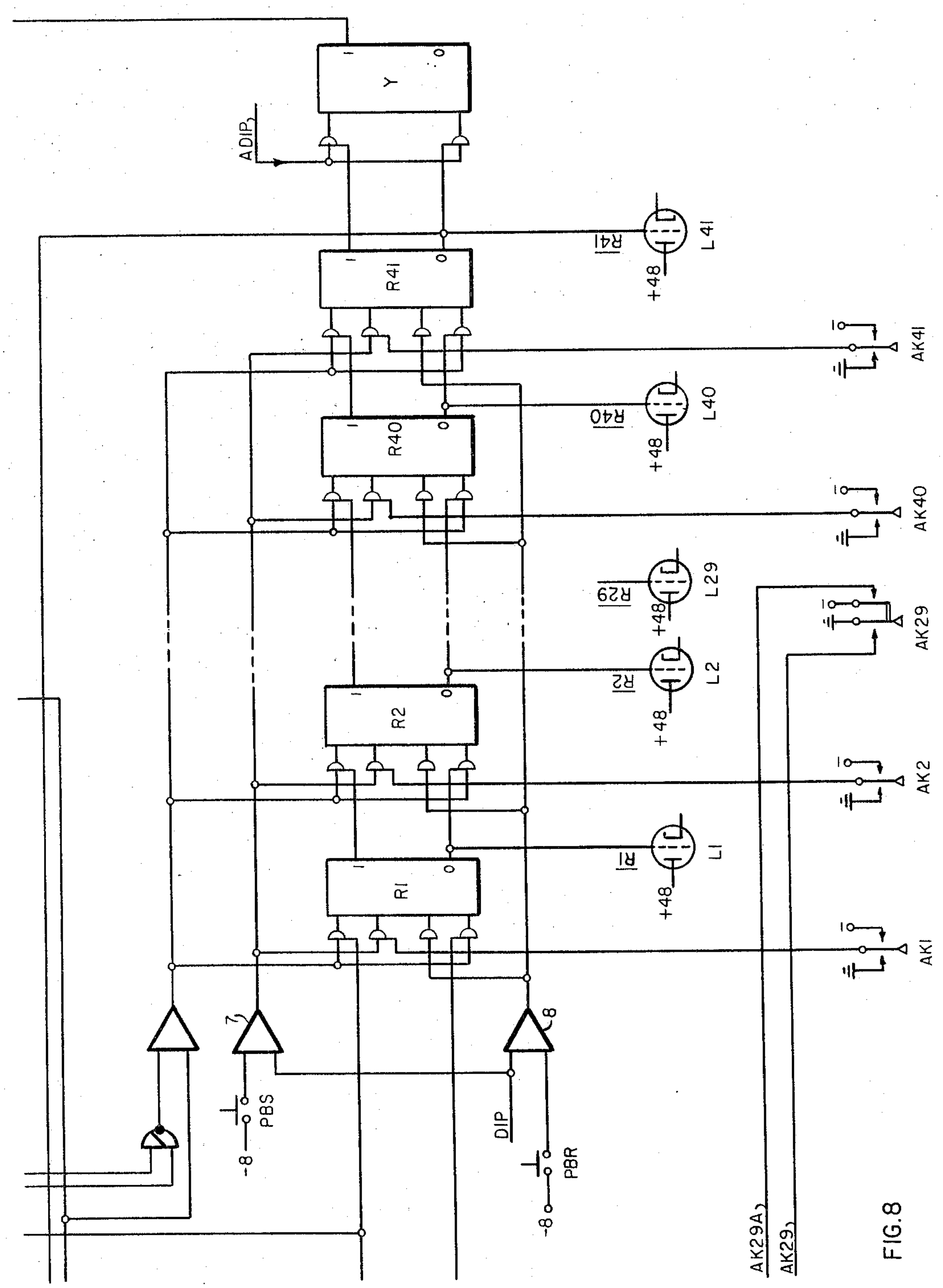
Figure 9:
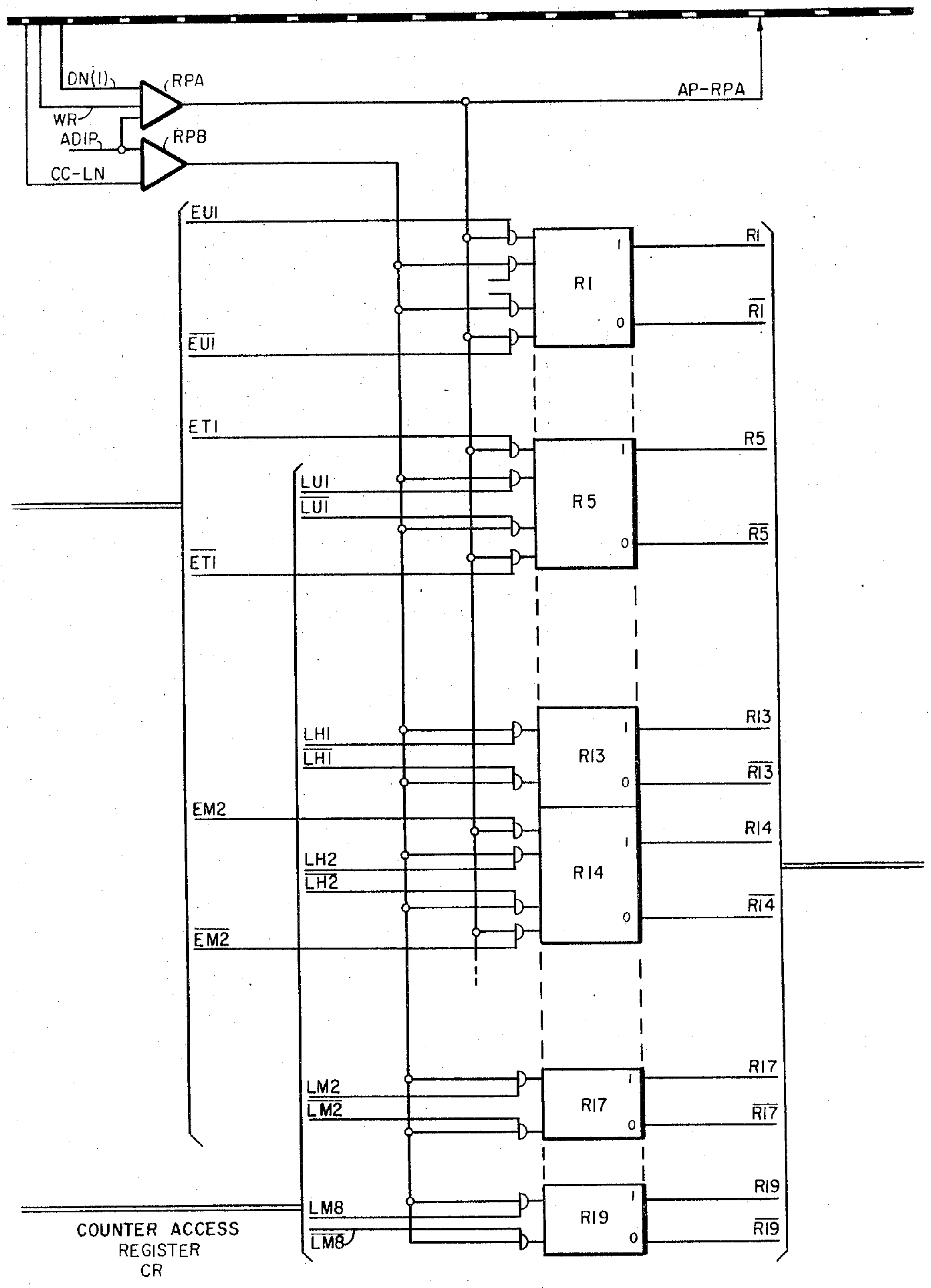

8.2.1.2—The console register is reset to the all zero state by engaging pushbutton switch PRB FIG. 8 on the console display panel.

8.3.1.3—The information coded in 8.2.1.1 above is set into the console register by engaging pushbutton PBS FIG. 8.

8.2.1.4—The PBG pushbutton is activated which sets the CEF flip-flop in the console register.

8.2.1.5—The 0 output of CEF presents a zero logic level at the input of allotter position gate #21 in the allotter.

8.2.1.6—The allotter scans this position by presenting two scanner position signals to the input of the allotter position gate in 8.2.1.5 above.

8.2.1.7—The signals in 8.2.1.5 and 8.2.1.6 are gated together in the same allotter position gate which is also being held enabled by the transfer signal, TSCE.

8.2.1.8—The output of 8.2.1.7 (AP–21) is used to set flip-flop LO in the allotter.

8.2.1.9—$\overline{\text{LO}}$ is fed to the control circuit and changes the control state from IDLE to RECEIVE.

8.2.1.10—The reception of the "not idle" signal back from the control circuit prevents further scanning, i.e. the allotter is locked in.

8.2.1.11—The buffered allotter scanner position leads PA and PB belonging to the locked in console position are gated with $\overline{\text{LO}}$, in gate #9 of the console register circuit.

8.2.1.12—The gating in 8.2.1.11 resets the CEF flip-flop.

8.2.1.13—The allotter position leads belonging to the locked in console position (PA and PB) are gated together in gate #2 FIG. 16 of the translator sender circuit.

8.2.1.14—The gating in 8.2.1.13 disables the sender modulator, thus by-passing the diphase sender.

8.2.1.15—The allotter position leads in 8.2.1.13 above are gated with CC–$\overline{\text{R}}$ from the control circuit in gate #1 of the translator sender circuit.

8.2.1.16—The gating 8.2.1.15 above sets the SE FIG. 16 flip-flop in the translator sender circuit.

Figure 4:
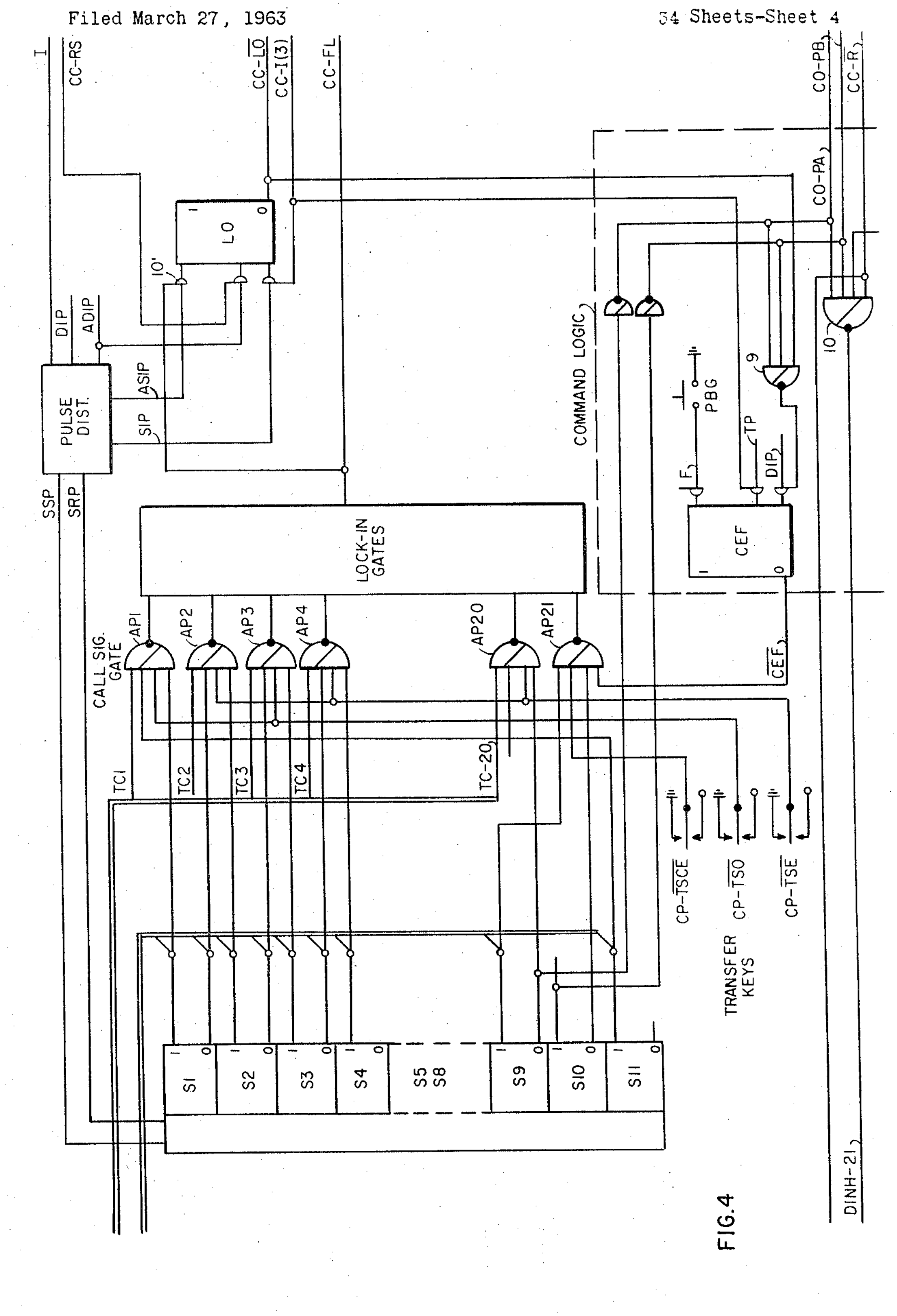

8.2.1.17—The same logic signals as in 8.2.1.15 are gated together with R41 in gate #10 FIG. 4 of the console register circuit.

8.2.1.18—The gating in 8.2.1.17 produces DINH–21.

8.2.1.19—The $\overline{\text{SE}}$ signal enables the sender synchronizer to produce shift pulses, SSS.

8.2.1.20—The SSS pulses shift information from the console register to the translator access register using the DINH–21 lead for conveying the D.C. logic signals directly from the console register. The diphase highway is not used during the RECEIVE state in serving the local console.

8.2.1.21—After the translator access register has received its information from the console register the control circuit is changed from the RECEIVE to the PROCESS state.

8.2.1.22—Once the translation has been completed the control circuit is placed in the SEND state.

8.2.1.23—The sender synchronizer is activated and the sender modulator by-passed.

8.2.1.24—Information is serially shifted out of the translator access register and into the console register.

8.2.1.25—Once sending 8.2.1.24 has been completed, the control circuit is returned to the IDLE state.

8.2.1.26—The translated information appears in the console register, and is displayed on a console panel lamp bank.

8.2.2 *Writing:*

8.2.2.1—The information to be written is keyed with the write keys (WK1 to WK27) on the console panel switch bank.

8.2.2.2 to 8.2.2.22 is the same as 8.2.1.1 to 8.2.1.21 respectively.

8.2.2.23—The information keyed in 8.2.2.1 above is written in the address keyed in 8.2.2.2 and a directory number translation is subsequently performed, which produces a readout of the written number.

8.2.2.24—Once the write (and subsequent directory number translation) operation has been completed the control circuit is placed in the SEND state.

8.2.2.25 to 8.2.2.27 are identical to 8.2.1.23 to 8.2.1.25 respectively.

8.2.2.28—The written information appears in the console register, and is displayed on the console panel display lamps.

8.2.2.29—The information displayed by the console display lamps is checked against the setting of the write keys, keyed in 8.2.2.1 above.

8.3 *Console display panel:*

8.3.1 *General.*—The console display panel contains two switch banks. One switch bank is made up of the access keys (AK1 to AK41) which are used to convey manually keyed binary information into the console register. The other switch bank is used for keying in the binary number which is to be written, during a write operation. The panel also contains pushbutton controls for setting and resetting the console register, producing the console request for service signal, and a general system reset for returning the translator to the IDLE state.

The information present in the console register can be displayed on the console panel indicator lamps for checking purposes. The lamp display also indicates when the system is not idle (busy), when a general alarm is present, and when a specific alarm signal is present.

The transfer keys for traffic control are also located on the console display panel.

8.3.2 *Keying operations:*

8.3.2.1 *Access keys.*—The access keys AK1 to AK41 (FIG. 8) are 2 position switches which are capable of presenting either of two voltage levels; −8 volts or ground. All of the access keys except AK29 are single pole double throw switches. AK29 is a double pole double throw switch, which presents two complementary outputs, i.e. AK29 and $\overline{AK29}$. (The use of $\overline{AK29}$ will be described below in 8.3.2.2). The keys are grouped in sets of four with each set representing a digit. The individual keys in each digit are weighted 1–2–4–8 respectively. In this manner the outputs AK1 to AK40 form 10 digits, and AK41 represents the prefix bit. The 10 digits are situated in a specific sequence so as to be compatible with the information transfer format (see Chapter 4). The outputs AK1 to AK41 are fed to the console register (see Section 8.4.2).

The access keys are also used in performing WRITE operations. In this application the access keys are keyed in accordance with the DNT designations.

8.3.2.2 *WRITE keys.*—The information to be written is keyed with the write keys (WK1 to WK27). The WRITE keys (FIG. 18) are double pole double throw switches with a center off position. The 27 keys are grouped in six groups of 4 representing the P, U, T, H, D, and C digits and one group of 3 representing the 1, 2, and 4 binary weights of the S digit. Each key has four outputs, i.e. WKO, $\overline{WKO}$, WKE, and $\overline{WKE}$. These outputs are fed directly to the write amplifiers. WKO and $\overline{WKO}$ are fed to the odd segment write amplifier while WKE and $\overline{WKE}$ are fed to the even segment write amplifier as described in Chapter 5.

The interpretation of the nomenclature of the outputs (WKO $\overline{WKO}$, WKE, and $\overline{WKE}$), is as follows: The 0 suffix signifies writing is to take place on the odd segment of the drum while the E suffix signifies writing is to take place on the even segment of the drum. The negation bar signifies a zero is to be written, while the absence of a negation bar signifies that a one is to be written. A −8 volt signal on one of the outputs provides the D.-C. command for the selected side of the chosen write amplifier. In this application AK29 (described in 8.3.2.1 above) is used to present −8 volts at the write key poles that produce the WKO and $\overline{WKO}$ outputs, while the complement of AK29 (AK29A) is used to produce −8 volts at the write key poles that produce the WKE and $\overline{WKE}$ outputs. In this application AK29 ($AK29A=\overline{AK29}$) representing the least significant bit in the thousands digit of the address determines whether the odd or even segment of the drum is to be written on. As a safety feature, a spring loaded pushbutton on the console panel (write enable) must be held depressed to enable the signals AK29 and AK29A to be conveyed to the write keys. The positioning of the write key itself determines whether a binary one or binary zero is to be written. When not in use, the write keys should be kept in the center off position, which isolates the write amplifiers from the write keys.

The following tabulation shows the assignment of digit values to the write keys:

WK1 through WK4 for P digit
WK5 through WK8 for U digit
WK9 through WK12 for T digit
WK13 through WK16 for H digit
WK17 through WK20 for D digit
WK21 through WK24 for C digit
WK25 through WK27 for first 3 bits of S digit.

The outputs of the above switches are represented by the following Boolean expressions. WK represents the key in the up (or one) position and $\overline{WK}$ represents the down (or zero) position.

$$WKO1=AK29\cdot WK1$$
. . .
. . .
. . .
$$WKO27=AK29\cdot WK27$$
$$\overline{WKO1}=AK29\cdot \overline{WK1}$$
. . .
. . .
. . .
$$\overline{WKO27}=AK29\cdot \overline{WK27}$$
$$WKE1=AK29A\cdot WK1$$
. . .
. . .
. . .
$$WKE27=AK29A\cdot WK27$$
$$\overline{WKE1}=AK29A\cdot \overline{WK1}$$
. . .
. . .
. . .
$$\overline{WKE27}=AK29A\cdot \overline{WK27}$$

The Boolean expressions readily show that a one or a zero can be written on either segment of the drum. For writing a one on the odd segment the WKO output is activated with a −8 volt level. For writing a zero on the odd segment of the drum the $\overline{WKO}$ output carries a −8 volt level. In the same manner the $\overline{WKE}$ and WKE outputs are utilized for writing on the even segment of the drum.

With the write keys in the center "off" position the four outputs from the write keys are disconnected, i.e. all write circuits disabled.

8.3.3 *Pushbutton controls:*

8.3.3.1 *Console set.*—The information keyed in the access keys (8.3.2.1) above is set into the console register by means of the console set button PBS. It should be noted here that the console register flip-flops must all be placed in the zero state (see 8.3.3.2 below) prior to engaging PBS. See Section 8.4.2 for details.

8.3.3.2 *Console reset.*—Before setting of the console register can take place (8.3.3.1 above) the console register must be reset into the all zero state. This resetting operation is performed by engaging the console reset button PBR. (See Section 8.3.2.)

8.3.3.3 *Call for service signal.*—After the keying operations (8.3.2 above) have been performed and the console register properly addressed (8.3.3.1 and 8.3.3.2 above), the console is ready to request service from the allotter. The call for service signal is originated at the console panel by engaging the pushbutton PBG. The manner in which the console call for service gains access to the translator will be covered in Section 8.5 below.

8.3.3.4 *System reset.*—The provision for returning the translator to the IDLE state is accomplished by the use of pushbutton switch, PBC FIG. 15. Activating PBC produces a —8 volt signal which is fed directly to the one output of the I flip-flop in the control circuit. This facility is extensively used in system testing.

8.3.4 *Lamp display:*

8.3.4.1 *General.*—The console panel contains 44 subminiature indicator triodes (L1 to L4 and L43). L1 to L41 are used to display the contents of the console register, and the indication of the IDLE state of the translator.

8.3.4.2 *Circuit description.*—Each indicator triode is grid controlled from the zero output of the flip-flop (with the exception of the I flip-flop) it is to display. The plate of the tube is tied to a +48 volt power supply. The directly heated cathode is fed by a 1.0 volt filament supply, F1. The flip-flop zero outputs are fed through isolator resistors to the grid inputs (L1 to L41). The grid input has a 470K resistor in series with the grid. A ground level at the grid input causes the tube to light while a —8 volt input turns the tube off. Because the zero output is fed to the grid, the lamp being on signifies the flip-flop is set. In the case of the I flip-flop, the lamp being on signifies the reset condition.

8.3.4.3 *Use of lamps for DNT or WRITE operations.*—The information set in the console register from the access keys for DNT or WRITE operations discussed in 8.3.2.1 and 8.3.3.1 can be checked by observing the lamp display. In this application the lamps assume the digit identity shown by access key designation strips for DNT.

The lamps are physically placed in a one to one correspondence to the access keys and the indications of the lamps are checked against the key positions. This operation is simply used as a check, prior to seeking the service of the translator.

The information returned to the console register after a DNT is also checked by observing the lamp display. The lamps are read in accordance with the lamp designation strip.

For the return of information from the translator as a result of a WRITE operation, the above lamp representation is also used. In addition the information that has been written (keyed in the write keys as discussed in 8.3.2.2 above) is checked against the positioning of the write keys. In this application the write key digits are physically placed in a one to one correspondence to the indicator lamps. The P, U, T, H, D, and C digits and 3 bits of the S digit are checked against the write keys, since these are the digits which were written on the drum.

8.3.4.4 *Use of lamps for an LNT operation.*—The lamps are used to check the keying and setting of information into the console register (described in 8.3.2.1 and 8.3.2.2 above) prior to requesting the services of the translator. In this application the lamps convey the digit identity shown by the access key designation strip.

The information returned to the console register as a result of a LNT is also checked by observing the lamp display. The lamps are read in accordance with the lamp designation strip.

8.3.5 *Transfer keys.*—The transfer keys consist of 3 single pole double throw toggle switches which provide a 0 volt level in the on position and a —8 volt level in the off position. These switches are labeled $\overline{TSE}$, $\overline{TSO}$, and $\overline{TSCE}$ on the drawing FIG. 4. These signals are fed to the allotter where they are used as explained in Chapter 7.

8.4 *Console register circuit:*

8.4.1 *General.*—The console register is a 41 stage shift register with provisions for parallel input. It is used to convey the binary information keyed in the access keys (described in 8.3.2.1 above), and to communicate with the translator access register in shift register fashion. The console request for service signal is also produced in the console register.

8.4.2 *Parallel input provision.*—PBS is a pushbutton switch which when activated places —8 volts to the D.-C. input of gated pulse amplifier "7" in FIGURE 8 of the console register circuit. The corresponding A.-C. input to the gated pulse amplifier is fed by the drum index pulses DIP. Therefore, during the time that the PBS pushbutton switch is activated a burst of pulses will appear at the output of the gated pulse amplifier "7." These pulses are fed to the A.-C. sets of the console register flip-flops (R1 to R41), whose corresponding D.-C. sets are fed by AK1 to AK41 respectively. In this application each access key manually set to the one state presents —8 volts to the corresponding console register flip-flop D.-C. set, and each key set to the zero state presents ground to its corresponding D.-C. set inputs. The set pulses produced at the A.-C. inputs set the flip-flops whose D.-C. sets are activated with —8 volts, and do not affect those whose D.-C. sets are fed by a ground level.

PBR is a pushbutton switch which when activated produces a —8 volt signal which is fed to the D.-C. input of gated pulse amplifier "8" in FIGURE 8 of the console register circuit. The corresponding A.-C. input to the gated pulse amplifier is fed by DIP. Engaging PBR allows a burst of pulses DIP to appear at the output of the gated pulse amplifier "8." These reset pulses are fed to the A.-C. reset inputs of all the console register flip-flops (R1 to R41), whose corresponding D.-C. reset inputs are tied to —8 volts. In this manner the entire console register is forced to the all zero condition.

8.4.3 *Call for service.*—PBG is a pushbutton switch, which when activated presents a ground level at the F terminal of pulse integrator circuit of the console register. The integrator circuit produces a voltage pulse at this point which is fed to the A.-C. set of flip-flop CEF, whose corresponding D.-C. set is tied to a —8 volts. In this manner flip-flop CEF is set to the one state. $\overline{CEF}$ is fed to the translator allotter circuit. $\overline{CEF}$ constitutes the console call for service signal. CEF is reset according to the following control logic.

$$\text{Reset } CO\text{–}CEF = NA\text{–}\overline{PA}\cdot NA\text{–}\overline{PB}\cdot NA\text{–}LO\cdot DIP$$

Allotter Position 21 (Console position)

8.4.4 *Serial transmission provision:*

8.4.4.1 *RECEIVE state.*— Flip-flops R1 to R41 are connected in shift register fashion by utilizing the D.-C. and A.-C. set and reset inputs. The zero output of the last stage of the console register, $\overline{CO\text{–}R41}$, is fed to the input of gate "10" as shown in FIGURE 4, and is used in producing output DINH–21. When translator is serving the console in the RECEIVE state, DINH–21 conveys the state of the last flip-flop of the console register.

$$DINH\text{–}21 = NA\text{–}\overline{PA}\cdot NA\text{–}\overline{PB}\cdot CC\text{–}R\cdot CO\text{–}R1$$

Position 21

DINH–21 is fed to the translator receiver circuit through an isolation diode not shown connected to the common point DON. DON is fed to the translator access register, and conveys the logic level from the last stage of the console register.

The A.-C. sets and resets of R1 to R41 FIG. 8 are tied together and are fed by SSFT. Gated pulse amplifiers are used to distribute the load on SSFT as shown in the drawing. SSFT is governed by logic in the translator sender circuit, which is covered in part 8.8 below.

DINH–21 and the occurrence of SSFT pulses enable the information in the console register to be serially shifted to the translator access register, during the translator RECEIVE state. When the contents of the console register has been shifted out, the transmission will cease, i.e. the DINH-21 signal will become zero by the removal of the receive signal R (see logic equation for DINH-21 above), and the SSFT pulses will cease as explained in part 8.8 below.

8.4.4.2 *SEND state.*—After a MONITOR or WRITE operation has been performed, the contents of the translator access register is fed in serial fashion to the console register. In this application the last stage of the translator access register, R42 and $\overline{R42}$, is directly coupled to the input stage of the console register, R1, as shown in the drawing. Once again the SSFT pulses are used to shift the information into the console register. Once the transmission has been completed the SSFT pulses will cease. The logic control of SSFT during the SEND state is also covered in Section 8.8 below.

8.5 *Translator allotter.*—The manner in which the local console call for service signal is acknowledged by the allotter is identical to the manner in which the register sender group call for service signals are acknowledged as described in Chapter 7. The console call for service signal is $\overline{CEF}$ shown as an input to allotter position gate AP21, whose other inputs are the two scanner position leads (S9 and $\overline{S10}$) assigned to the console and the console transfer lead $\overline{TSCE}$ as shown in FIGURE 4.

8.6 *Translator access register.*—The translator access register serves the same function during a local console operation as it does during the serving of a register sender group as described in Chapter 7.

8.7 *Translator receiver circuit.*—The diphase portions of the receiver circuit (demodulator and receiver synchronizer) are completely bypassed when the translator is serving the local console in the RECEIVE state. The DINH–21 signal from the console register (8.4.4 above) is commoned with the DMT outputs of the demodulators and is fed out as the DON signal. The shift pulses SSFT from the sender circuit are fed to the common point made up of the receiver synchronizer outputs and leaves the receiver carrying the SFT notation. DON is fed to the translator access register, along with SFT. When the RECEIVE operation is completed DON becomes zero (8.4.4.1 above) and the SFT pulses will stop due to the control of the sender as described in 8.8 below.

8.8 *Translator sender circuit*:

8.8.1 *General.*—With the allotter in the console position (allotter position 21, see Chapter 7) the diphase sender modulator is bypassed by placing ground at the MD1 output and a —8 volt level at the MC2 input of the modulator.

The sender synchronizer is used to produce shift pulses during both the RECEIVE and SEND states while serving the local console. Once again (as discussed in Chapter 7) the SE flip-flop is used to control the sender synchronizer, by feeding the zero output, $\overline{SE}$, to the enable input, SSH, of the sender synchronizer. The logic control of the SE flip-flop is shown in FIGURE 16, and is described below in 8.8.2.

8.8.2 *Logic considerations*:

8.8.2.1 *Receiving locally*:

Set $TS\text{–}SE=CO\text{–}\overline{PA}\cdot CO\text{–}\overline{PB}\cdot CC\text{–}R\cdot SST$
Reset $TS\text{–}SE=CC\text{–}P\cdot DIP$ Where:

CO–PA and CO–PB are allotter position signals, which are fed from the console register after being buffered.

$\overline{R}$ and $\overline{P}$ are fed from the control circuit.

8.8.2.2 *Sending locally*:

Set $TS\text{–}SE=CC\text{–}S\cdot SST$
Reset $TS\text{–}SE=(CC\text{–}PA)\cdot ADIP$ Where:

CC–S and CC–PA are fed from the control circuit (refer to Chapter 9).

CHAPTER 9 THE CONTROL

*Summary*

The features of the translator which are described in this chapter will be referred to under the general term the control and may include part of either the control circuit (CC) or the process coincidence auxiliary circuitry (AP). The purpose of the control is to sequence the translator through its various phases of operation.

When the translator is not busy, the allotter scans the call lines until one of them is found to be carrying a call signal from a register-sender group (or the console) requesting service. The allotter then locks in on this call signal, and the translator begins to receive the information to be translated along with certain instruction digits into the translator access register. After all of this information is received, the translator begins processing it. The translated information is transferred back to the translator access register and returned to the register-sender group or the console as the case may be. The translator then returns to the not busy state.

9.1 *General:*

9.1.1 *States of operation.*—The translator will be either idle, receiving, processing, or sending. The control thus dictates which of the four states (IDLE, RECEIVE, PROCESS, or SEND) the translator is operating in, as indicated by one of four flip-flops I, R, P, and S of FIG. 15.

The translator when not performing a translation is in the IDLE state. When the allotter FIG. 4 locks in on a call signal from a register-sender group or from the console, the control goes to the RECEIVE state. This allows the translator access register (NT) to begin receiving the incoming information from the register-sender group or the console. When all of the incoming information has been received, the control changes to the PROCESS state. The received information is processed (translated) and returned to the translator access register. The control next changes to the SEND state and the translator begins to shift out the translated information. When all of the information has been sent, the control returns to the IDLE state.

9.1.2 *Modes of operation.*—The translator can process three different types (modes) of operation. These three different modes in which the control operates are a directory number translation mode (DNT), a line number translation mode (LNT), or a writing mode (WR). The mode of operation is determined by the value of the instruction digit X in the incoming information. The three modes of operation are dictated by the three flip-flops DN, LN, or WR.

In a multidrum office, the register-sender groups have no indication in which of the translators a given line number is located. Thus, a line number translation on a given translator may or may not be successful. The translator sends information back to the register-sender group in either case, indicating by the value of the sender instruction digit (I) whether the translation is successful. The control must, therefore, be able to indicate an unsuccessful translation in the line number translation mode.

After a writing operation has taken place, it is desirable to check the line number written. When the control is in the writing mode, the writing operation is timed in the control giving the writing transient sufficient time to die down. The control then changes from a writing mode to a directory number translation mode, and a translation is performed on the received directory number still stored in the translator access register.

9.1.3 *Segment control.*—The line information which is written on the drum surface is arranged so as to be on one of two segments of the drum (see Chapter 5). The switching information corresponding to the even thousands digit addresses is located on one segment, and that corresponding to odd thousands digit addresses is located on the other. During a directory number translation, the control analyzes the incoming information in the translator access register to determine upon which segment the line number is located. During a line number translation, the control determines on which side of the drum the coincident line number was located. This information is returned to the register-sender group as part of the thousands digit address information.

9.2 *IDLE* state.—The IDLE state of the control is indicated by a flip-flop (I) being true. When the allotter locks in on a register-sender group or the console call signal (NA–$\overline{LO}$ becomes zero) and when the control is not receiving, not processing, and not sending, then the control is set not IDLE.

$$\text{Reset } CC\text{–}I=(CC\text{–}\overline{R}\cdot CC\text{–}\overline{P}\cdot CC\text{–}\overline{S}\cdot NA\text{–}LO)\cdot DIP \quad (1)$$

The control stays not IDLE (busy) until the translation is completed or trouble is encountered. The control becomes IDLE when the call signal in the allotter is released (NA–$\overline{FL}$ becomes true) and end of send (NT–ES) becomes true, unless the console is asking for the translation in which case the control waits until a prefix bit is shifted into the last flip-flop of the console register of FIG. 8 (CO–Y true); or it becomes IDLE when a time out is called and the call signal has been removed. The I flip-flop is set in any case if the maximum time out TO–STO is called. IDLE is not set with a time out during a line number translation TO–$\overline{LN}$. This TO–LN indicates an unsuccessful line translation; such an indication is coded into the sender instruction digit I and is sent back to the register-sender (or console).

$$\text{Set } I=[NA\text{–}\overline{FL}\cdot(NT\text{–}ES+TO\text{–}R+TO\text{–}DN+TO\text{–}WR+TO\text{–}P+TO\text{–}S)\cdot(CC\text{–}\overline{S}+CO\text{–}PA+CO\text{–}PB+CO\text{–}Y)+TO\text{–}STO]\cdot ADIP \quad (2)$$

A means of manually setting the system idle by holding the 1 output of flip-flop I to −8 volts by means of a system reset pushbutton PBC is also provided.

9.3 *RECEIVE state*.—The control is set to RECEIVE (R) when the allotter acknowledges a call signal (NA–$\overline{LO}$ becomes zero) and when the control is not receiving, not processing, and not sending. The same signal used to reset the I flip-flop is used to set R (Equation 1, part 9.2).

$$\text{Reset } CC\text{–}I=\text{Set } CC\text{–}R \quad (3)$$

The control stays in the RECEIVE state until the prefix bit arrives in the last flip-flop of the translator access register (NT–$\overline{R41}$ becomes zero) indicating that the incoming information has been received. Because of the non-synchronous nature between the shifting pulses used to receive the incoming information and the drum pulses which operate the control circuit, flip-flop Z is used as a time buffer between "end of receive" and reset R.

$$\text{Set } CC\text{–}Z=(NT\text{–}R41\cdot CC\text{–}\overline{I}\cdot CC\text{–}\overline{P}\cdot CC\text{–}\overline{S})\cdot DIP \quad (4)$$

$$\text{Reset } CC\text{–}Z=CC\text{–}Z\cdot DIP \quad (5)$$

$$\text{Reset } CC\text{–}R=CC\text{–}Z\cdot ADIP \quad (6)$$

9.4 *PROCESS state*.—The control is set to PROCESS (P) when the translator has finished receiving the incoming information into the translator access register. The same signal used to reset R is used to set P (Equation 6, part 9.3).

$$\text{Reset } CC\text{–}R=\text{Set-}CC\text{–}P \quad (7)$$

Figure 10:
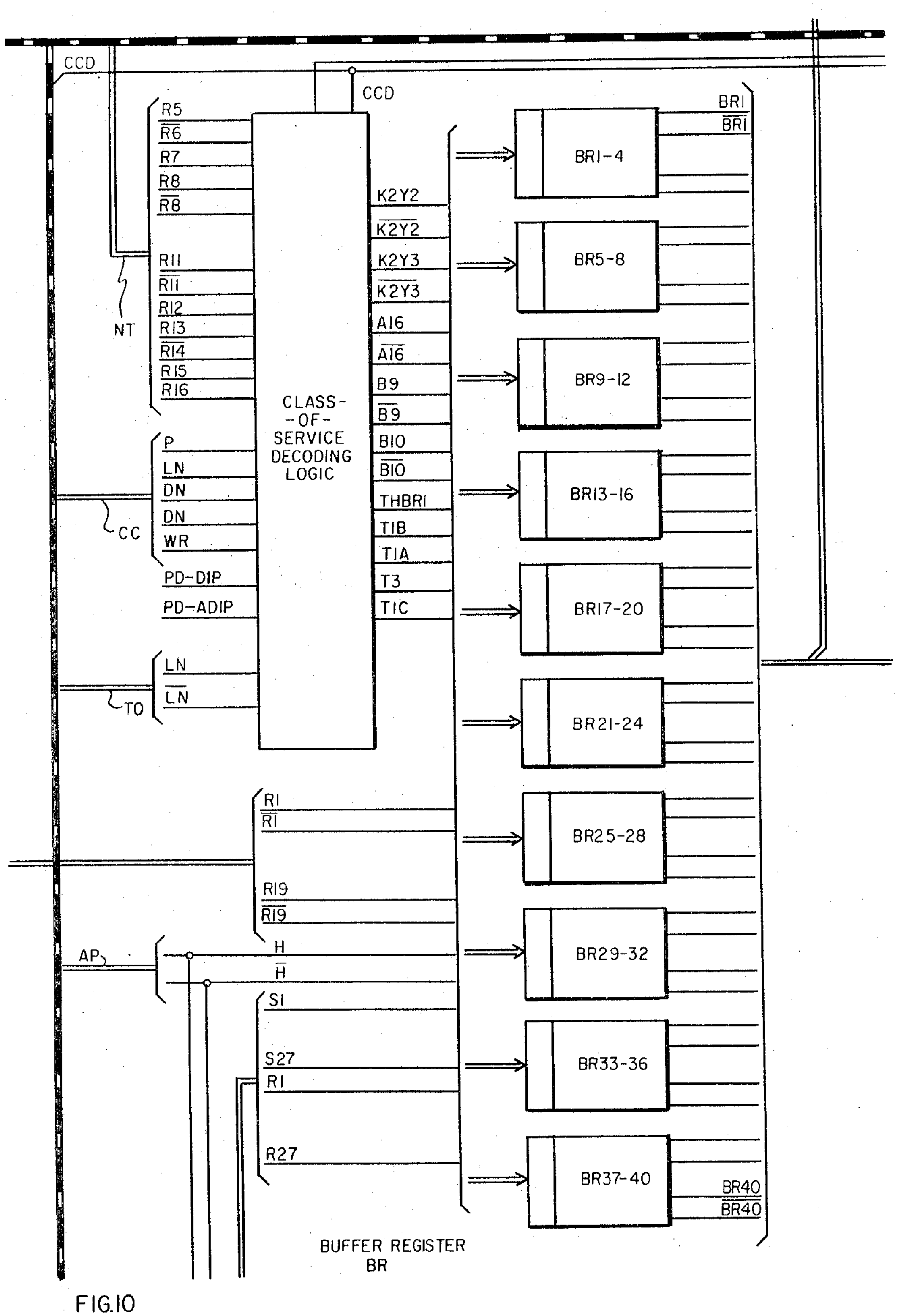

When the control is in the PROCESS state, it must follow one of three modes of operation. The control indicates either a directory number translation, a line number translation, or a writing operation depending on the value of the instruction digit X in the translator access register being 4, 2, or 5, respectively. If this digit X has any other value, the translator stays in the PROCESS state until trouble is indicated by the time out circuit. The processing is completed when the translated information is transferred from the buffer register FIG. 10 to the translator access register FIGS. 6 and 7 (AP–TR becomes true).

$$\text{Reset } CC\text{–}P=AP\text{–}TR\cdot ADIP \quad (8)$$

9.4.1 *Directory number translation*.—When the X digit has the value 4 and the control is in PROCESS, the control indicates a directory number translation mode (DN true).

$$\text{Set } CC\text{–}DN=CC\text{–}P\cdot NT\text{–}\overline{R1}\cdot NT\text{–}\overline{R2}\cdot NT\text{–}R3\cdot NT\text{–}\overline{R4}\cdot DIP \quad (9)$$

The DNT is also performed following a writing operation. The directory number which is used to determine the address location of the line number to be written is held in the translator access register after the writing operation. A directory number translation is then performed on this number. The translated number is, thus, the line number just written. Time is allowed following the writing operation to give the writing transients sufficient time to die down before DN is set (see Section 9.4.4).

$$\text{Set } CC\text{–}DN=AP\text{–}WTD2\cdot ADIP \quad (10)$$

When DN is set, the translator begins the translation using the P and DN signals for commands. Before the translated information is transferred into the translator access register, the register is reset, thus destroying the X digit information. When the translated information is transferred to the translator access register, a new digit fills the position of the X digit, called the I digit. This information cannot accidentally set WR, DN, or LN because P is reset at the same time that the transfer occurs. The DN flip-flop is then reset when the control is IDLE.

$$\text{Reset } CC\text{–}DN=CC\text{–}I\cdot ADIP \quad (11)$$

9.4.2 *Line number translation*.—When the X digit in the translator access register has the value of 2 and when the control is in PROCESS, the control is set to a line number translation mode. The translator then begins its processing using LN and P as commands. After the translation has been performed and the translated information set out, the control returns to IDLE. LN is reset with the IDLE state.

$$\text{Set } CC\text{–}LN=CC\text{–}P\cdot(NT\text{–}\overline{R1}\cdot NA\text{–}R2\cdot NT\text{–}\overline{R3}\cdot NT\text{–}\overline{R4})\cdot ADIP \quad (12)$$

$$\text{Reset } CC\text{–}LN=CC\text{–}I\cdot ADIP \quad (13)$$

9.4.3. *Unsuccessful line number translation*.—If the line number to be translated is not located on the drum of a given translator, the translator will time out (TO–LN) with the control in the line number translation mode while looking for coincidence. The signal TO–LN causes the value of the I digit in the buffer register to change from 12 to 13. When the translator is in a line number translation mode, is in processing, has called time out in this mode, and a flip-flop ULT FIG. 5 has not been set, a signal (set ULT) will be produced. This signal is used to set ULT which in turn inhibts the signal until ULT is reset with IDLE.

$$\text{Set } AP\text{–}ULT=TO\text{–}LN\cdot CC\text{–}P\cdot NC\text{–}\overline{UC}\cdot AP\text{–}\overline{ULT}\cdot DIP \quad (14)$$

$$\text{Reset } AP\text{–}ULT=CC\text{–}I\cdot ADIP \quad (15)$$

The signal (set ULT) then initiates the timing commands which cause the translator access register to be cleared, cause an unrelated directory number to be read into the buffer register, and cause the translated information to be transferred to the translator access register (see Chapter 10). The information (I=13 and the rest meaningless) is then set out and the translator returned to IDLE.

9.4.4 *Writing operation*.—When the instruction digit (X) has the value 5, when the call signal which the translator has acknowledged is that of the console, and when the control is in PROCESS and not in DN, then flip-flop WR is set.

$$\text{Set } CC\text{–}WR = NT\text{–}R1 \cdot NT\text{–}\overline{R2} \cdot NT\text{–}R3 \cdot NT\text{–}\overline{R4} \cdot CC\text{–}P \cdot CC\text{–}\overline{DN} \cdot C0\text{–}\overline{PA} \cdot C0\text{–}\overline{PB} \cdot DIP \quad (16)$$

Using the WR and P flip-flops as commands, the translator finds coincidence and writes on the drum (see Chapter 5). The writing operation is timed giving transients sufficient time to die down. When the timing has been completed (1–2 revolutions of the drum), WTD2 becomes true thus setting DN and resetting WR (Equation 10, part 9.4.1).

$$\text{Set } CC\text{–}DN = \text{Reset } CC\text{–}WR \quad (17)$$

It (WR) can also be reset by IDLE.

$$\text{Reset } CC\text{–}WR = CC\text{–}I \cdot ADIP \quad (18)$$

The timing of the writing transients is accomplished in the counting chain WTD1, WTD2, and WTD3. The timing is initiated in flip-flop WTD1 when the write flip-flop WI is set (see Chapter 10).

$$\text{Set } AP\text{–}WTD1 = AP\text{–}WI \cdot ADIP \quad (19)$$

WTD2 and WTD3 are then set in turn by drum reset pulses (DRP).

$$\text{Set } AP\text{–}WTD2 = AP\text{–}WTD1 \cdot DRP \quad (20)$$

$$\text{Set } AP\text{–}WTD3 = AP\text{–}WTD2 \cdot DRP \quad (21)$$

WTD3 produces a pulse (WDRP) when it is set.

$$WDRP = AP\text{–}WTD3 \cdot DIP \quad (22)$$

WTD1, WTD2, and WTD3 are then reset by WDRP (or when in the IDLE state).

$$\text{Reset } AP\text{–}WTD1 = \text{Reset } AP\text{–}WTD2 = \text{Reset } AP\text{–}WTD3 = WDRP + CC\text{–}I \cdot ADIP \quad (23)$$

WTD2 is then used to change the control from the writing mode to the directory number translation mode, and WDRP is used to allow the coincidence circuit to look for coincidence again (see Chapter 10). The translator now performs a directory number translation as described under part 9.5.1.

9.5 *SEND state.*—The control is set to the SEND state when the translated information is transferred to the translator access register (Equation 8, part 9.4).

$$\text{Set } CC\text{–}S = \text{Reset } CC\text{–}P \quad (24)$$

The control stays in the SEND state until all of the translated information is shifted out of the translator access register or until trouble has been encountered. The reset of S is similar to the set of I (Equation 2, part 9.2) with the exception that S is always reset when the system is returned to IDLE.

$$\text{Reset } CC\text{–}S = (\text{Set } CC\text{–}I) + CC\text{–}I \cdot ADIP \quad (25)$$

The above equation is also used as a general reset for R and P.

Figure 5:
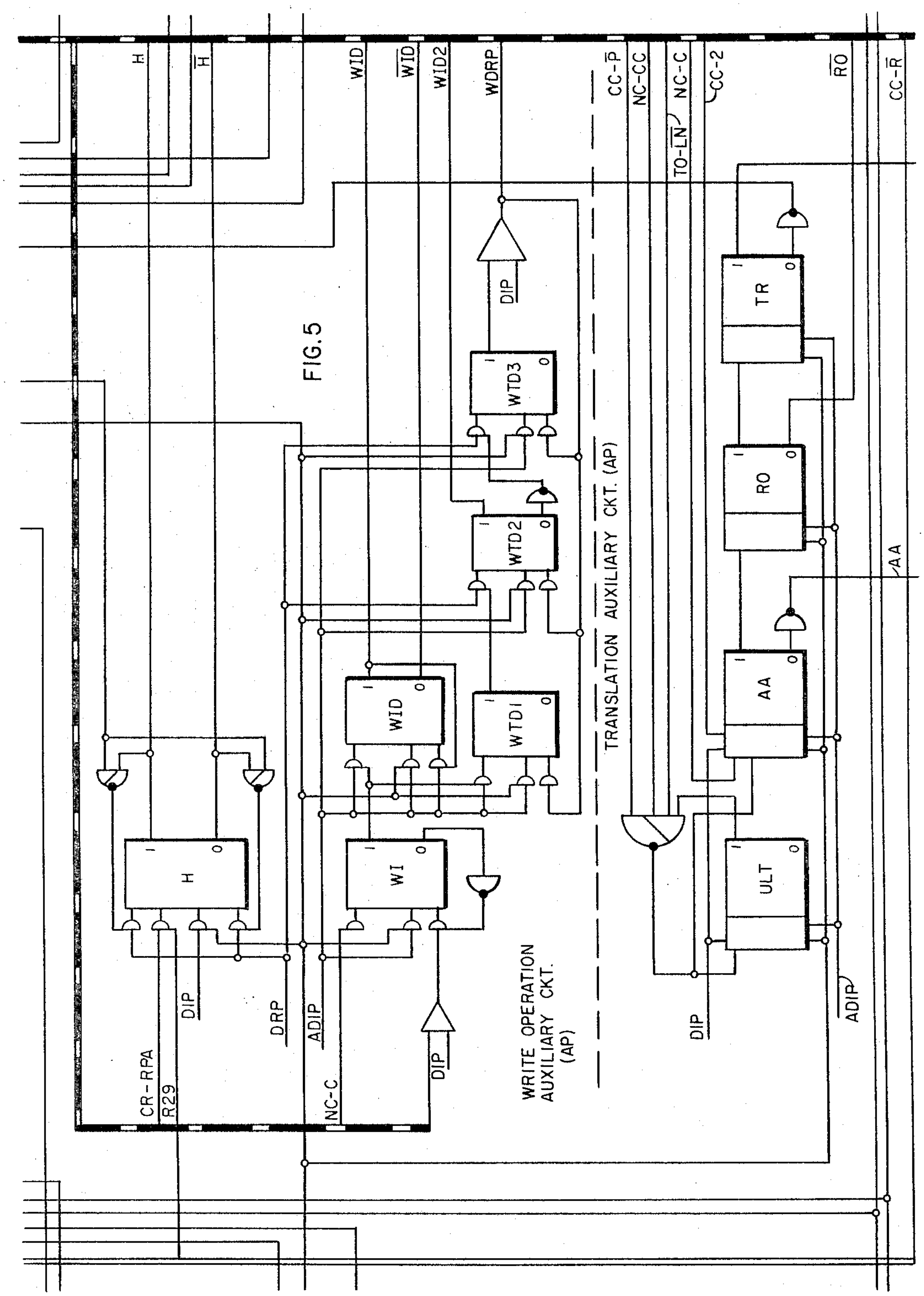

9.6 *H flip-flop.*—During a directory number translation, the control analyzes the incoming information in the translator access register to determine on which segment the line number is located. During a line number translation the control determines on which segment of the drum the coincident line number was located. In either case, a flip-flop H FIG. 5 is set or reset to indicate the segment of the drum involved.

9.6.1 *Directory number translation.*—During a directory number translation, the thousands digit, which determines the segment to be selected, is located in flip-flops R29 through R32 of the translator access register. The first bit (NT–R29) being a one or zero will determine the thosuands digit to be odd or even, respectively. The H flip-flop is normally reset during the IDLE state of the translator.

$$\text{Reset } AP\text{–}H = CC\text{–}I \cdot DIP \quad (26)$$

If NT–R29 is a one, the H flip-flop is set to one, and if NT–R29 is a zero, then the H flip-flop is left in the zero state. H being set to one therefore indicates that the number is located on the odd segment of the drum while H being zero indicates the even segment. The A.-C. set (RPA) is derived in the counter access register and provides pulses during DN or WR.

$$\text{Set } H = NT\text{–}R29 \cdot CR\text{–}RPA \quad (27)$$

$$CR\text{–}RPA = (CC\text{–}WR + CC\text{–}DN) \cdot ADIP \quad (28)$$

The H and $\overline{H}$ signals are sent to the even and odd segment read amplifiers to enable the information from the selected segment to be read out. After coincidence has been detected, the translated line number will be read from the drum and transferred into the translator access register. This transfer may change the value of NT–R29 to a one thus changing the state of the H flip-flop. This is of no consequence, however, once the read out has occurred.

9.6.2 *Line number translation.*—During a line number translation, the state of the H flip-flop must be changed once each drum revolution. In this manner, first the even segment read amplifiers are enabled and then the odd. Thus, first one segment of the drum is read into the buffer register and then the other until the coincident line number is found. The H flip-flop is set and reset with drum reset pulses (DRP).

$$\text{Set } AP\text{–}H = CC\text{–}LN \cdot AP\text{–}\overline{H} \cdot DRP \quad (29)$$

$$\text{Reset } AP\text{–}H = CC\text{–}LN \cdot AP\text{–}H \cdot DRP \quad (30)$$

CHAPTER 10—THE TRANSLATOR IN THE PROCESS STATE

*Summary*

After the incoming information has been received in the translator access register, the control goes into the PROCESS state and indicates one of three modes of operation dependent on the received instruction digit. The received information is then processed.

During a directory number translation, the information written in one of the address locations on the drum is read out. The information written on the drum consists of 8192 words (switching instructions) called line numbers, each of which has a corresponding address location on the drum (directory number). The address locations are sequentially checked against the received directory number in the translator access register until parity is determined. A coincidence signal is produced which allows the corresponding line number to be read from the drum.

During a write operation, parity is determined as in a directory number translation. The coincidence signal produced causes a line number to be written on the drum at the proper time and in the address location corresponding to the received directory number.

During a line number translation, the switching instructions are read consecutively from the drum and checked against the received line number until parity is determined. A coincidence signal is produced which allows the corresponding directory number to be obtained.

After the information has been processed (translated), it is returned to the translator access register ready to be set out.

This chapter deals with the translator during processing. The intervals considered in the processing state are:

(1) Before coincidence.
(2) Finding coincidence.
(3) After coincidence.

10.1 *General:*

10.1.1 *Before coincidence.*—After the information to be translated has been received in the translator access register, it is ready to be processed. The information received consists of a line or a directory number to be used for parity checking, coded class of service information which is set to the buffer register where it is recorded and stored temporarily until it can be transferred back to the translator access register with the rest of the translated information, and an instruction digit which indicates whether a line number translation LNT, a directory numebr translation DNT, or a writing operation WR is to be performed.

The buffer register accepts line number information which is read from the drum, directory number information from the counter access register, and class of service information from the translator access register through a decoding matrix. Office code and sender instruction digits are also loaded into the buffer register.

10.1.2 *Finding coincidence.*—During a directory number translation, the directory numbers are sequentially fed from the drum counter early through the counter access register and into the buffer register (see Chapter 4 for details of information transfer). This information is then available to the coincidence circuit to check for parity against the directory number stored in the translator access register. At the same time, the class of service information (K, Y, Z digits) is decoded and stored in the buffer register together with the sender instruction digits S and I. The sender instruction digit I is strapped while the bit weighted 8 of the S digit is decoded. The bits weighted 1, 2, and 4 of the S digit are read from the drum after coincidence.

During a line number translation, all of the line numbers are, consecutively, read from one segment of the drum and then from the other into the buffer register until parity with the line number stored in the translator access register has been found. The sender instruction digit I and the office code digits (L, L, N) are also read into the buffer register during this time. The S digit may have any value and is not considered a sender instruction digit. In case coincidence is not found, the I digit will be modified to signify an unsuccessful line number translation.

During a writing operation, the directory numbers are fed from the drum counter early, through the counter access register, and into the buffer register in a manner identical to that for a directory number translation. This information is then available to the coincidence circuit to check for parity with the directory number stored in the translator access register. After the writing has taken place, a directory number translation is automatically performed on the directory number, which is still stored in the translator access register. Therefore, parity will again be checked between the buffer register and the translator access register.

The coincidence circuit is used to check for parity between certain digits of the translator access register and the buffer register. The particular flip-flops used in these registers depend on the mode of operation of the translator. For the directory number translation and the writing operation, the information used for parity checking comes from the same flip-flops in these registers. The operation of the coincidence circuit for these two modes is, therefore, identical.

The binary representation of the numerical value of the thousands digit of the directory numbers appearing in the drum counters differs from the normal binary coded decimal code. The coding for the decimal value 1 is modified from 1000 to 1101 to facilitate the method of information storage on the drum. The even thousands digit information is located on one of two segments of the drum and the odd thousands digit information on the other (see Chapters 4, 5, and 11). The thousands digit binary coded decimal code of the directory number received in the translator access register during a directory number translation or a writing operation is encoded in the above manner in order to have a correct parity check against the drum counter early. This is done by means of a thousands digit coder for directory numbers in the coincidence circuit.

10.1.3 *After coincidence.*—When parity has been determined, a coincidence signal is produced and set to the process coincidence auxiliary circuit. Certain sequential, timing signals are then initiated which allow the translated material to be obtained or a writing operation to occur.

During a directory number translation, these timing signals reset the translator access register to the all zero state, read out the translated line number as well as the bits weighted 1, 2, and 4 of the S digit from the drum and into the translator access register along with the class of service information and sender instruction digits.

For a line number translation, the processing is similar except in this case a directory number is read out of the counter access register and into the buffer register. It is then transferred along with the sender instruction digit and office code digits to the cleared translator access register.

Because the thousands digit for the directory numbers appearing in the drum counters differs from the normal binary coded decimal code, the thousands digit of the translated directory number during a line number translation is passed through a decoder while being transferred from the buffer register to the translator access register. Part of the thousands digit information read into the buffer register (a bit indicating odd or even thousands digit) is determined by the control and indicates which side of the drum was being scanned when coincidence occurred.

When a line number translation is being performed and the line number for successful parity checking is not located on the drum, the translator will time out. The translator indicates that an unsuccessful line number translation has been performed and codes the sender instruction digit I in the buffer register, accordingly. The same timing commands that would take place during a successful translation are then initiated. The unrelated information, which is read from the drum, is ignored by the register-sender group that the translator is serving.

During a writing operation, a signal will be produced which will allow writing to take place at the correct time. The proper selection of write amplifier and information (ones or zeros) is determined by the control and by the console panel keys. Following the writing operation, a directory number translation is automatically performed on the directory number which is still stored in the translator access register.

10.2 *Translator access register before coincidence.*—The type of information received in the translator access register depends on the type of translation (see Chapter 4). The information always consists of ten digits, each of which is represented by four binary bits. The digits are X, K, Y, Z, U, T, H, T*h*, B*l* (Blank), and B*l* in flip-flops NT–R1 through NT–R40 for a directory number translation or a writing operation. The digits are X, K, Y, Z, P, U, T, H, D, and C for a line number translation. These digits are available to the translator during processing until the register is reset after coincidence has been determined.

The X digit is an instruction digit and indicates to the control the type of translation to be performed. The K, Y, and Z digits are class of service digits and are decoded in the buffer register during a directory number translation; they are ignored during a line number translation. The U, T, H, and T*h* digits are the directory number during a directory number translation or a writing operation. The P, U, T, H, D, and C digits are the line number during a line number translation. During a directory number translation or a writing operation, the directory number in flip-flops NT–R17 through NT–R32 is used in the coincidence circuit for the parity check. During a line number translation, the line number in flip-flops NT–R17 through NT–R40 is used in the coincidence circuit for the parity check.

10.3 *Buffer register before coincidence.*—The buffer register accepts line information from the drum and directory information from the counter access register. This information, before coincidence, is used to check for parity against the translator access register. Certain decoded and strapped information is also placed into the buffer register before coincidence. The sender instruction digit I is strapped. During a directory number translation, the sender instruction digit S is partially decoded and partially read from the drum. During a line number translation the S digit may have any value and is not considered a sender instruction digit.

10.3.1 *Directory number translation.*—During the directory number translation, the directory numbers are read in parallel from the drum counter early, through the counter access register (see Chapter 11), and into the buffer register. The digits are U. T, H, and T*h* and are read in parallel into flip-flops BR17 through BR32. The information on the D.-C. sets consists of CR–R1 through CR–R16 and of CR–R1 through CR–R16 on the D.-C. resets. The A.-C. sets and resets are pulsed T3 during processing until parity has been determined.

$$T3=[(CC\text{–}DN+CC\text{–}WR)\cdot NC\text{–}\overline{UCD}+CC\text{–}LN\cdot AP\text{–}RO]\cdot DIP \quad (1)$$

The strapped and decoded digits are also read T1A into the buffer register until coincidence has been determined.

$$T1A=CC\text{–}DN\cdot NC\text{–}\overline{UCD}\cdot CIP \quad (2)$$

One of the sender instruction digits I is strapped into BR1 through BR4 and has the value 7 110 for the directory number translation. The bit weighted 8 of the sender instruction digit S and B and A digits are decoded from the K, Y, and Z digits in the translator access register. They are placed into flip-flops BR8 through BR16, respectively. The decoding is done according to the following Table 10.3.1.

TABLE 10.3.1

| DECODE | | | | TO GIVE | | | | | | | | | |
|---|---|---|---|---|---|---|---|---|---|---|---|---|---|
| K* | Y | Z | B | B1 | B2 | B4 | B8 | S8 | A | A1 | A2 | A4 | A8 |
| 0 | 1 | – | 1 | 1 | 0 | 0 | 0 | 0 | 8 | 0 | 0 | 0 | 1 |
| 0 | 2 | – | 2 | 0 | 1 | 0 | 0 | 0 | 8 | 0 | 0 | 0 | 1 |
| 2 | 1 | – | 3 | 1 | 1 | 0 | 0 | 0 | 8 | 0 | 0 | 0 | 1 |
| 2 | 2 | – | 4 | 0 | 0 | 1 | 0 | 0 | 8 | 0 | 0 | 0 | 1 |
| 2 | 3 | – | 0 | 0 | 1 | 0 | 1 | 1 | 8 | 0 | 0 | 0 | 1 |
| 2 | 4 | 0 | 3 | 1 | 1 | 0 | 0 | 0 | 8 | 0 | 0 | 0 | 1 |
| All others 16 | | | | 0 | 0 | 0 | 0 | 0 | 16 | 0 | 0 | 0 | 0 |

*NOTE.—Values given for K, Y, Z, B, and A are decimal while those for B1, B2, B4, B8, S8, A1, A2, A4, and A8 (suffixes indicate bit weight) are binary.

The D.-C. set and reset commands for BR8 and BR16 are derived in a decoding matrix. The logic equations for these commands are developed from Table 10.3.1 and are (all quantities have the BR– prefix):

*B Digit.*—For B1 in flip-flop BR9 (see note below):[1]

$$\text{Set } BR9=K0\cdot Y1+K2\cdot Y1+K2\cdot Y4\cdot Z0 \quad (3)$$

$$\text{Reset } BR9=\overline{K0\cdot Y1+K2\cdot Y1+K2\cdot Y4\cdot Z0} \quad (4)$$

For B2 in flip-flop BR10:

$$\text{Set } BR10=K0\cdot Y2+K2\cdot Y1+K2\cdot Y4\cdot Z0+K2\cdot Y3 \quad (5)$$

$$\text{Reset } BR10=\overline{K0\cdot Y2+K2\cdot Y1+K2\cdot Y4\cdot Z0+K2\cdot Y3} \quad (6)$$

[1]NOTE: Suffixes K, Y and Z indicate decimal value of digit.

For B4 in flip-flop BR11:

$$\text{Set } BR11=K2\cdot Y2 \quad (7)$$

$$\text{Reset } BR11=\overline{K2\cdot Y2} \quad (8)$$

For B8 in flip-flop BR12:

$$\text{Set } BR12=K2\cdot Y3 \quad (9)$$

$$\text{Reset } BR12=\overline{K2\cdot Y3} \quad (10)$$

*A Digit:*

A1 in flip-flop BR13=0 for DNT
A2 in flip-flop BR12=0 for DNT } Strapped
A4 in flip-flop BR15=0 for DNT For A8 in flip-flop BR16:

$$\text{Set } BR16=K0\cdot Y1+K0\cdot Y2+K2\cdot Y1+K2\cdot Y2+K2\cdot Y3+K2\cdot Y4\cdot Z0 \quad (11)$$

$$\text{Reset } BR16=K0\cdot Y1\overline{+K0\cdot Y2+K2\cdot Y1+K2\cdot Y2+K2\cdot Y3+K2\cdot Y4\cdot Z0} \quad (12)$$

*S Digit.*—S1, S2 and S4 are read from the drum into BR5, BR6, and BR7 respectively.

For S8 in BR8:

$$\text{Set } BR8=K2\cdot Y3 \quad (13)$$

$$\text{Reset } BR8=\overline{K2\cdot Y3} \quad (14)$$

$$K0=NT\text{–}\overline{R5}\cdot NT\text{–}R6\cdot NT\text{–}\overline{R7}\cdot NT\text{–}R8 \quad (15)$$

$$K2=NT\text{–}\overline{R5}\cdot NT\text{–}R6\cdot NT\text{–}\overline{R7}\cdot NT\text{–}\overline{R8} \quad (16)$$

$$Y1=NT\text{–}R9\cdot NT\text{–}\overline{R10}\cdot NT\text{–}\overline{R11}\cdot NT\text{–}\overline{R12} \quad (17)$$

$$Y2=NT\text{–}\overline{R9}\cdot NT\text{–}R10\cdot NT\text{–}\overline{R11}\cdot NT\text{–}\overline{R12} \quad (18)$$

$$Y3=NT\text{–}R9\cdot NT\text{–}R10\cdot NT\text{–}\overline{R11}\cdot NT\text{–}\overline{R12} \quad (19)$$

$$Y4=NT\text{–}\overline{R9}\cdot NT\text{–}\overline{R10}\cdot NT\text{–}R11\cdot NT\text{–}\overline{R12} \quad (20)$$

$$Z0=NT\text{–}\overline{R13}\cdot NT\text{–}R14\cdot NT\text{–}\overline{R15}\cdot NT\text{–}R16 \quad (21)$$

Figure 17:
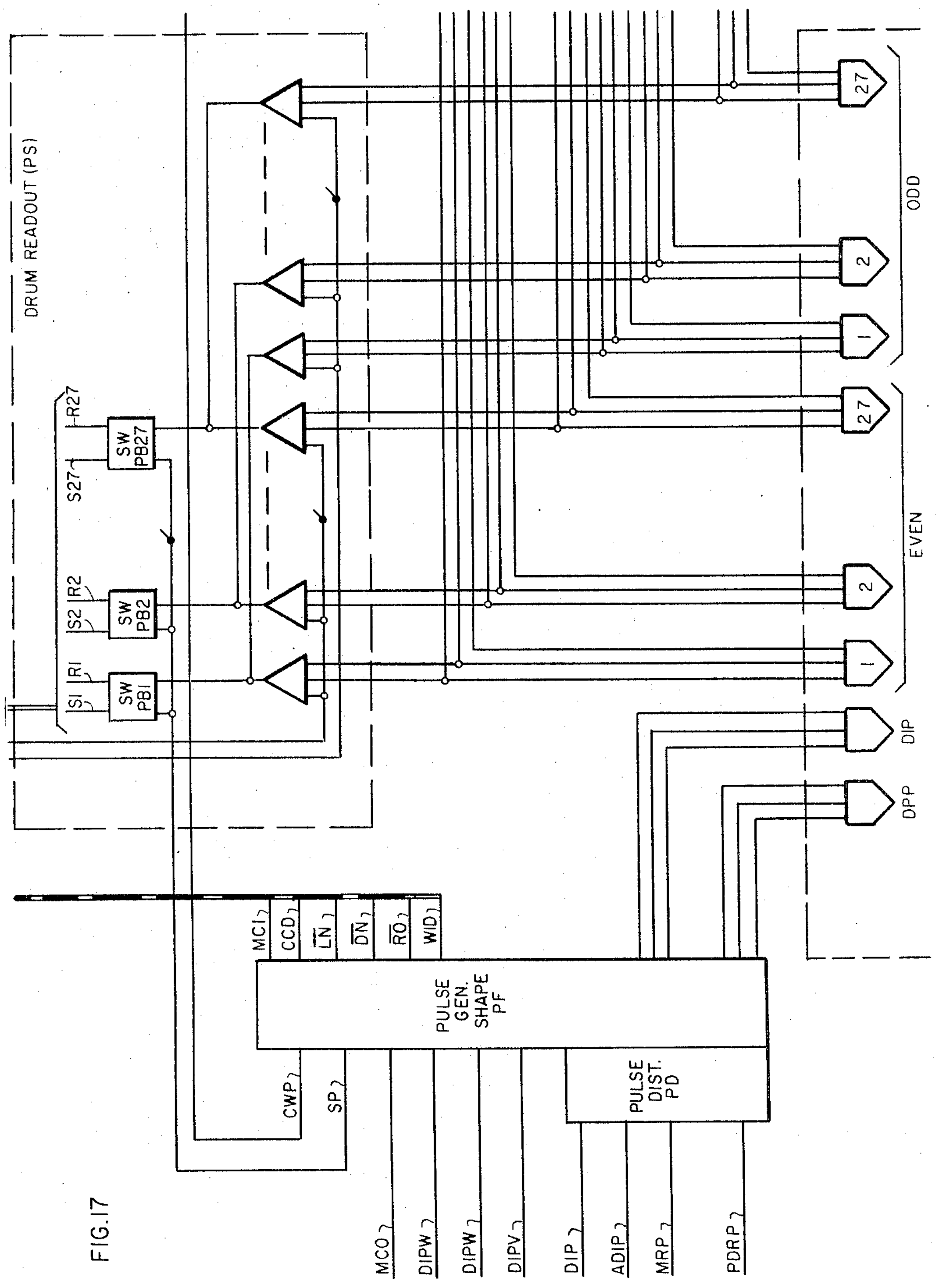

10.3.2 *Line number translation.*—During a line number translation, the line numbers are read (strobed), consecutively, from the drum. The digits P, U, T, H, D, and C feed directly the A.-C. inputs of flip-flops BR17 through BR40, which are tied in complementary fashion (see Chapter 5). The control logic for this readout is developed in the pulse generator circuit FIG. 17.

The strapped digits are I, L, L, and N. The sender instruction digit I has the value 12 (0011) for a line number translation. If the translation is unsuccessful, a time out signal TO–LN becomes true and changes the value of the I digit to 13 (1011). The office code digits N, L and L have the values 7 (1110), 7, and 9 (1001) and are located in flip-flops BR37 through BR40, BR9 through BR12, and BR13 through BR16, respectively. The setting function for the above strapped digits, except N, is:

$$T1B=CC\text{–}LN\cdot TO\text{–}\overline{LN}\cdot NC\text{–}\overline{UCD}\cdot DIP \quad (22)$$

The office code digit N in BR37 through BR40 cannot be read in until after coincidence because the C digit from the drum is being read into these flip-flops before coincidence.

10.3.3 *Writing operation.*—The directory numbers during a writing operation are read into the buffer register in an identical manner to that for the directory number translation (see Equation 1, part 10.3.1). The strapped and decoded information will now be read into the buffer register as in the directory number translation (see Equation 2, part 10.3.1).

The operation of the buffer register during the directory number translation following the writing operation is identical to the normal directory number translation.

Figure 11:
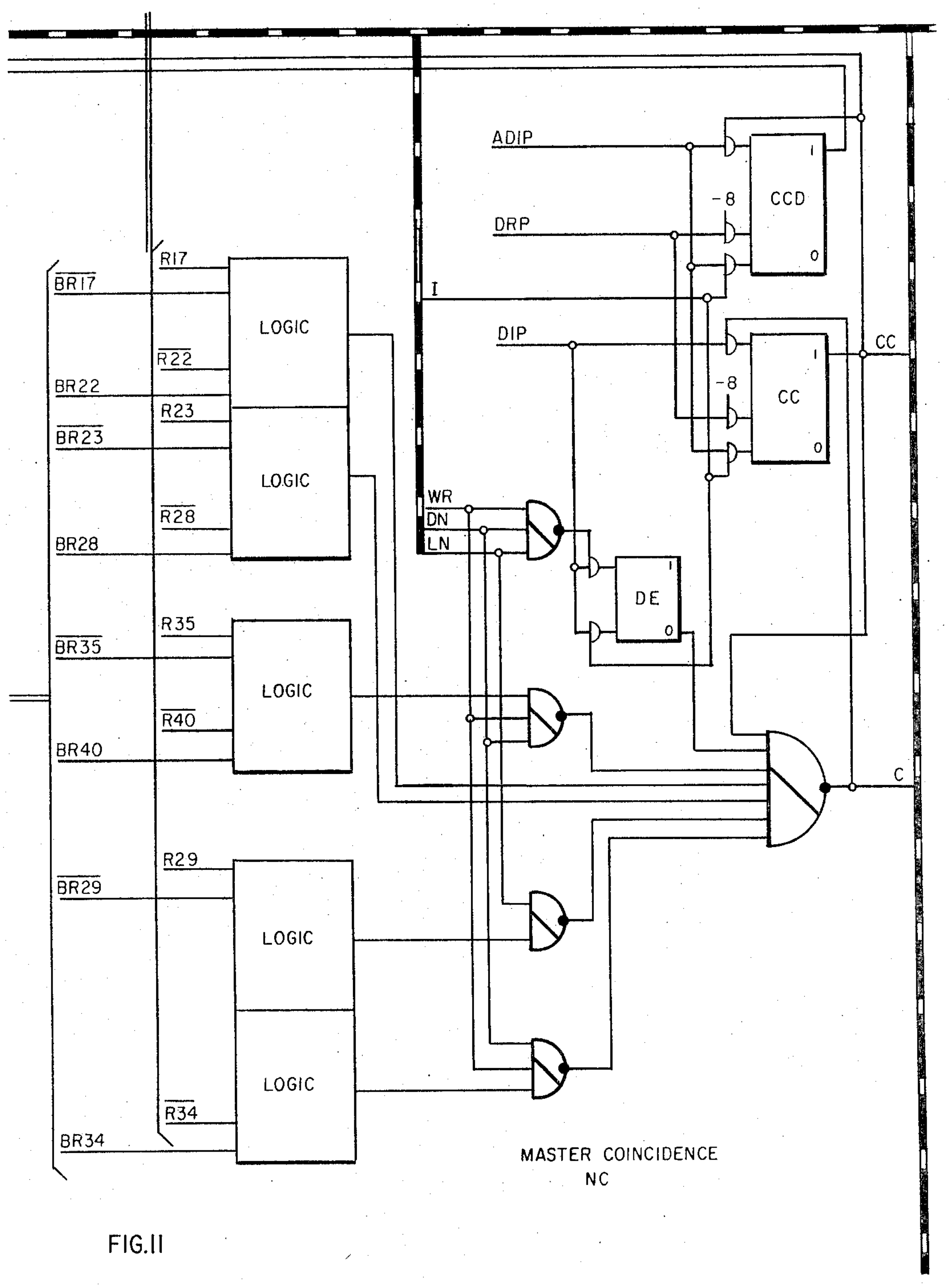
Figure 12:
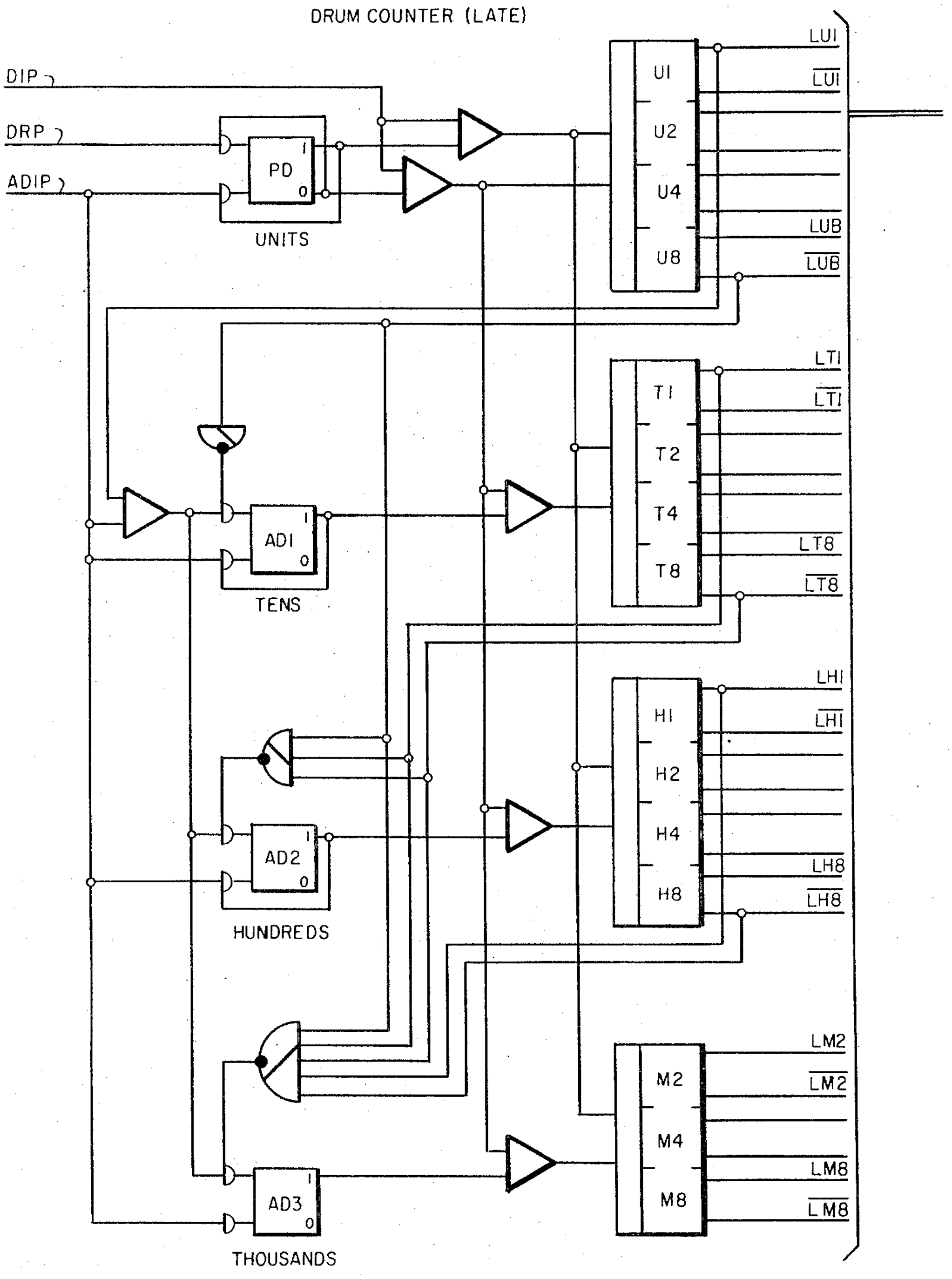
Figure 13:
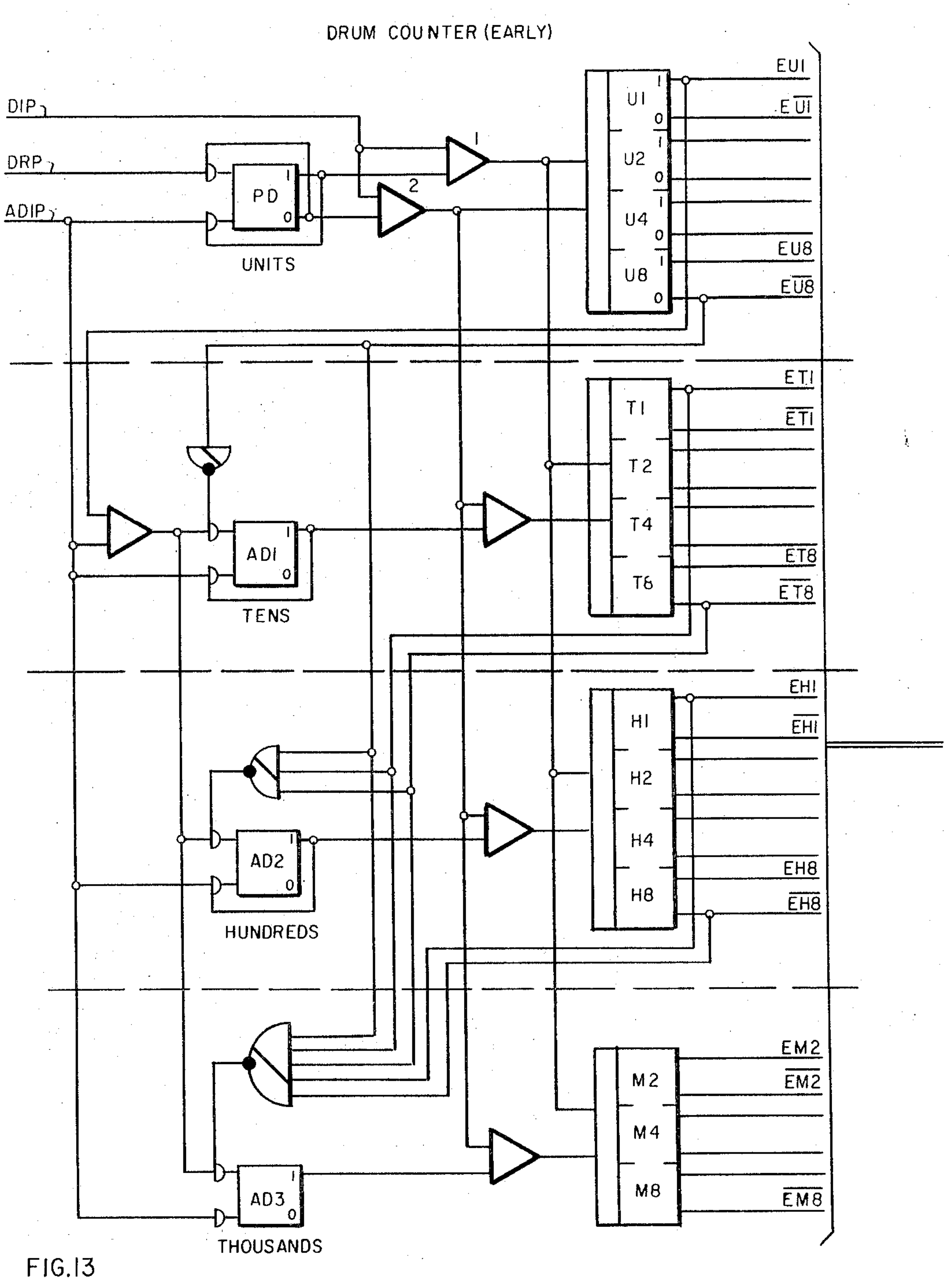

10.4 *Finding coincidence.*—The coincidence circuit is used to check for parity between certain digits of the buffer register and the translator access register. It is capable of operation in any of the three modes. When parity has been detected, a signal C is produced, which sets a flip-flop CC FIG. 11. A second flip-flop CCD is set 4 $\mu$sec. later.

$$\text{Set } NC\text{–}CC = NC\text{–}C \cdot DIP \quad (23)$$

$$\text{Set } NC\text{–}CCD = NC\text{–}CC \cdot ADIP \quad (24)$$

Parity is found between groups of flip-flops. The individual parities are gated together in AND fashion in a final gate. Coincidence is inhibited in this gate by a flip-flop DE until the control indicates that one of the three modes has been selected.

$$\text{Set } NC\text{–}DE = (CC\text{–}LN + CC\text{–}DN + CC\text{–}WR) \cdot DIP \quad (25)$$

The signal CC is also used to inhibit this final gate so that coincidence may not be found more than once.

10.4.1 *Line number translation.*—Parity must be determined between the line numbers being read into the buffer register from the drum and the line number received in the translator access register. The P, U, T, H, D, and C digits in flip-flops BR–BR17 through BR–BR40 must be checked against the same digits in flip-flops NT–R17 through NT–R40. A typical expression for parity between two flip-flops is:

$$\text{Parity} = (NT\text{–}BR17 + BR\text{–}\overline{BR17}) \cdot (NT\text{–}\overline{R17} + BR\text{–}BR17) \quad (26)$$

The expression for parity between all of the flip-flops is:

$$\text{Parity} = (NT\text{–}R17 + BR\text{–}\overline{BR17}) \cdot (NT\text{–}\overline{R17} + BR\text{–}BR17) \cdot (NT\text{–}R18 + BR\text{–}\overline{BR18}) \cdot (NT\text{–}\overline{R18} + BR\text{–}BR18) \cdot\cdot\cdot (NT\text{–}R40 + BR\text{–}\overline{BR40}) \cdot (NT\text{–}\overline{R40} + BR\text{–}BR40) \quad (27)$$

Flip-flops 17 through 32 in both registers are used for the parity check for all modes while 32 through 40 are used only for a line number translation. A special thousands digit encoder for the incoming directory number in the translator access register is employed during a directory number translation or a writing operation. Normal parity for this digit in flip-flops 29 through 32 is only checked for during a line number translation. Thus, parity for flip-flops 29 through 40 must be made conditional.

$$\text{Parity for } LNT = [(NT\text{–}R17 + BR\text{–}\overline{BR17}) \cdot (NT\text{–}\overline{R17} + BR\text{–}BR17) \cdot\cdot\cdot (NT\text{–}R28 + BR\text{–}\overline{BR28}) \cdot (NT\text{–}\overline{R28}) + BR\text{–}BR28)] \cdot [(CC\text{–}WR + CC\text{–}DN + (NT\text{–}R29 + BR\text{–}\overline{BR29}) \cdot (NT\text{–}\overline{R29} + BR\text{–}BR29) \cdot\cdot\cdot (NT\text{–}R40 + BR\text{–}\overline{BR40}) \cdot (NT\text{–}\overline{R40} + BR\text{–}BR40)] \quad (28)$$

The final parity gate also has an input from the thousands digit encoder. The encoder is inhibited during a line number translation, however, and is not considered in determining LN parity (see Equation 29, part 10.4.2).

10.4.2 *Directory number translation.*—Parity must be determined between the directory numbers being read into the buffer register and the received directory number in the translator access register. The U, T, H, and T*h* digits in flip-flops BR17 through BR32 of the buffer register must be compared against U, T, H, and T*h* in flip-flops NT–R17 through NT–R32 of the translator access register.

The directory numbers appearing in the drum counters differ from the normal binary coded decimal code in the thousands digit. The decimal value one is changed to a value of eleven (1000 to 1101). The directory numbers are grouped in such a manner that the switching instructions corresponding to the even thousands digit directory numbers will be located on one segment of the drum and those of the odd thousands digit numbers on the other. The bit weighted 1 of the thousands digit in the translator access register (NT–R29) is used to determine the segment of the drum on which the information corresponding to the directory number address is located. Flip-flops 30 through 32 of both registers are then used for the parity check. Because of the special coding of the thousands digit of the directory number in the buffer register, flip-flops NT–R30 and NT–R32 in the translator access register should both appear to the coincidence circuit as ones when $NT\text{–}R\mathbf{29}=1$, $NT\text{–}R\mathbf{30}=0$, and $NT\text{–}R\mathbf{32}=0$. Parity for flip-flops 30 through 32 is:

$$\text{Parity} = CC\text{–}LN + [(NT\text{–}\overline{R31} \underline{+ BR\text{–}BR31) \cdot (NT\text{–}R31} \underline{+ Br\text{–}\overline{BR31})][BR\text{–}BR32 +} NT\text{–}R32 + (NT\text{–}R29 \cdot NT\text{–}\overline{R30} \cdot NT\text{–}\overline{R31} \cdot NT\text{–}\overline{R32})][BR\text{–}\overline{BR32} + NT\text{–}R32 + (NT\text{–}R29 \cdot \underline{NT\text{–}\overline{R30} \cdot NT\text{–}\overline{R31} \cdot NT\text{–}\overline{R32})][BR\text{–}} BR30 + NT\text{–}R30 + (NT\text{–}R39 \cdot NT\text{–}\overline{R30} \cdot NT\text{–}\overline{R31} \cdot \underline{NT\text{–}\overline{R32}})][BR\text{–}\overline{BR30} + NT\text{–}R30 + (NT\text{–}R39 \cdot NT\text{–}\overline{R31} \cdot NT\text{–}\overline{R32})] \quad (29)$$

It should be noticed that when:

$$NT\text{–}R29 \cdot NT\text{–}\overline{R30} \cdot NT\text{–}\overline{R31} \cdot NT\text{–}R32 = 0 \quad (30)$$

there is no change in code and:

$$\text{Parity} = (NT\text{–}\overline{R31} + BR\text{–}BR31) \cdot (NT\text{–}R31 + BR\text{–}\overline{BR31}) \cdot (NT\text{–}\overline{R32} + BR\text{–}BR32) \cdot (NT\text{–}R32 + BR\text{–}\overline{BR32}) \cdot (NT\text{–}\overline{R30} + BR\text{–}BR30) \cdot (NT\text{–}R30 + BR\text{–}\overline{BR30}) \quad (31)$$

which is the normal expression for parity when:

$$NT\text{–}R29 \cdot NT\text{–}\overline{R30} \cdot NT\text{–}\overline{R31} \cdot NT\text{–}\overline{R32} = 1 \quad (32)$$

then the thousands digit code (1000) in the translator access register appears to the coincidence circuit as (1101). Thus, NT–R30 and NT–R32 are changed to one and the parity equation for the coder is:

$$\text{Parity} = CC\text{–}LN + BR\text{–}\overline{BR31} \cdot BR\text{–}BR32 \cdot BR\text{–}BR30 \quad (33)$$

10.4.3 *Writing operation*:

Coincidence is determined the first time during the writing operation in an identical manner to that for a directory number translation; and thus, the coincidence signal C is produced. Flip-flops DE, CCD, and CC are also set in the same manner. When CC is set, the parity gates are inhibited so that coincidence may be true only once. When a writing operation has taken place, however, the control switches to a directory number translation mode. Since the received directory number is still in the translation access register, it may be translated to find the line number which was just written. Another parity check must then be made. Flip-flops CC and CCD are reset by DRP after the writing operation has been accomplished.

$$\text{Reset } NC\text{–}CC = \text{Reset } NC\text{–}CCD = AP\text{–}WDRP + CC\text{–}I \cdot ADIP \quad (34)$$

Coincidence C is found again, and flip-flops CC and CCD are set. They are not reset again until the control is reset into the IDLE state.

10.5 *Translator process timing*

The timing for the translator in the process state is illustrated in FIGURE 33. The timing for all three modes (DNT, LNT, and WR) is shown for a typical example (address 1059). The auxiliary timing commands are the principal factors in determining the translator timing.

The legends for each line of FIGURE 33 are as follows:

(1) Drum index pulses (DIP).
(2) Auxiliary drum index pulses (ADIP).

DNT:

(3) Control indicating a directory number translation (DNT).
(4) Address locations (directory numbers) counted in the drum counter early (CE).
(5) Directory numbers appearing in the counter access register (CR) during DNT.
(6) Buffer (BR) during DNT.
(7) Coincidence (C) for directory number 1059 during DNT.
(8) CC set for coincidence with directory number 1059 during DNT.
(9) CCD set for coincidence with directory number 1059 during DNT.
(10) AA set for coincidence with directory number 1059 during DNT.
(11) RO set for coincidence with directory number 1059 during DNT.
(12) Information under heads.
(13) TR set for coincidence with directory number 1059 during DNT.
(14) Translator access register (NT) during DNT.

LNT:

(15) Control indicating a line number translation (LNT).
(16) BR during LNT (read in from drum line 12).
(17) Coincidence C for drum information (line number) corresponding to directory number 1059 during (LNT).
(18) CC set for coincidence with line number corresponding to directory number 1059 during (LNT).
(19) CCD set for coincidence with line number corresponding to directory number 1059 during LNT.
(20) AA set for coincidence with the number corresponding to directory number 1059 during LNT.
(21) RO set for coincidence with line number corresponding to directory number 1059 during (LNT).
(22) Directory numbers appearing in CR during LNT.
(23) Directory numbers counted in drum counter late (CL).
(24) TR set for coincidence with line number corresponding to directory number 1059 during LNT.
(25) NT register during LNT.

WR:

(26) Control indicating a writing operation (WR).
(27) Directory numbers appearing in CR during WR (read in from CE–line 4).
(28) ER register during WR.
(29) Coincidence C for directory number 1059 during WR.
(30) CC set for coincidence with directory number 1059 during WR.
(31) CCD set for coincidence with directory number 1059 during WR.
(32) WI set for coincidence with directory number 1059 during WR.
(33) WID set for coincidence with directory number 1059 during WR.

10.5.1 *Auxiliary timing commands.*—When coincidence has been determined, certain sequential timing commands are produced which allow the translated information to be obtained or a writing to occur. These signals are also initiated when the control indicates that a line number translation has been unsuccessful.

10.5.1.1 *Directory number translation.*—During a directory number translation, the timing signals produced are initiated by the coincidence signal C. The first timing signal AA FIG. 5 allows the translator access register to be reset. This destroys the received information in that register. The signal occurs 16 μseconds after the coincident address is first counted in the drum counter early. This signal lasts for 8 μsec.

$$\text{Set } AP\text{–}AA = NC\text{–}C \cdot (CC\text{–}LN + CC\text{–}DN) \cdot DIP \quad (35)$$
$$\text{Reset } AP\text{–}AA = AP\text{–}AA \cdot DIP \quad (36)$$

The next timing command R0 is initiated by AA, 4 μseconds after AA becomes true. This signal $\overline{R0}$ is 8 μseconds long and allows the translated line number to be read from the drum and into the buffer register. The read out signal $\overline{R0}$ is sent to the pulse generator circuit where the strobe gating is performed.

$$\text{Set } AP\text{–}RO = AP\text{–}AA \cdot ADIP \quad (37)$$
$$\text{Reset } AP\text{–}RO = AP\text{–}RO \cdot ADIP \quad (38)$$

A third timing command TR is initiated by R0, 8 μseconds after RO becomes true. This signal lasts for 8 μseconds.

$$\text{Set } AP\text{–}TR = AP\text{–}RO \cdot ADIP \quad (39)$$
$$\text{Reset } AP\text{–}TR = AP\text{–}TR \cdot ADIP \quad (40)$$

TR is sent to the translator access register where it causes the translated line number, together with the class of service information and sender instruction digits, to be transferred from the buffer register to the translator access register. The translated information is then ready to be sent out.

10.5.1.2 *Successful line number translation.*—When the control indicates a line number translation (LN true) and when coincidence C is detected, then the timing commands AA, RO, and TR are initiated in the same sequence as in a directory number translation (see Equation 35, part 10.5.1).

The timing signal AA is used to reset the translator access register. The RO signal is then sent to the buffer register and allows the translated directory number to be read in from the counter access register. The TR signal then becomes true and causes the transfer of the translated directory number, along with the sender instruction digit and office code digits, into the translator access register.

10.5.1.3 *Unsuccessful line number translation.*—The line number, on which the line number translation is being performed, may not have been written on the drum. In the case, the translator sends back a digit to the register-sender group indicating an unsuccessful line number translation. A signal from the control (see Chapter 9) indicates the unsuccessful translation. This signal sets AA and thus, initiates the normal sequence AA, RO, and TR. The logic for this signal and for setting AA is:

$$\text{Set } AP\text{–}AA = (AP\text{–}\overline{ULT} \cdot CC\text{–}P \cdot NC\text{–}\overline{UC} \cdot TO\text{–}LN) \cdot DIP \quad (41)$$

The normal sequencing is performed with the exception that an unrelated directory number is read into the buffer register. The value of the sender instruction digit I instructs the register-sender group to ignore this translation.

10.5.1.4 *Writing operation.*—When coincidence is found during a writing operation, a signal WI is produced. This signal lasts for 8 μseconds and causes a second signal signal WID to be produced 4 μseconds later.

$$\text{Set } AP\text{–}WI = CC\text{–}WR \cdot NC\text{–}C \cdot DIP \quad (42)$$
$$\text{Reset } AP\text{–}WI = AP\text{–}WI \cdot CC\text{–}WR \cdot DIP \quad (43)$$
$$\text{Set } AP\text{–}WID = AP\text{–}WI \cdot ADIP \quad (44)$$
$$\text{Reset } AP\text{–}WID = AP\text{–}WID \cdot ADIP \quad (45)$$

The second signal WID is sent to the pulse generator circuit where a writing pulse is produced and distributed to all writing amplifiers. The WI signal allows the control to start timing the writing operation. After the writing operation has been completed, the translator performs a directory number translation on the directory number still in the translator access register. Coincidence is found again; and the AA, RO, TR sequence is initiated in a manner identical to the normal directory number translation.

10.5.2 *Overall Timing* (*FIGURE 33*).—From the timing diagram for the translator in the processing state, it can be seen that for a directory number translation, there is a delay of three time slots (24 μseconds) from the time the coincident address (1059 in this example) is counted in the drum counter early to the time the line information is read from the drum and into the buffer register; compare line 4 with line 11. This references the drum counter early (line 4) as being anticipated by 24 μseconds with respect to the line information under the heads (line 12).

From the timing diagram it can be seen that for a line number translation, there is a delay of two time slots (16 μseconds) from the time the coincident line number is read from the drum to the time the translated directory number is read into the buffer register; compare line 16 to line 21. But since, there is a delay of one time slot from the time the translated directory number is counted until it is read into the buffer register (compare line 23 to line 16), the drum counter late is delayed only one time slot with respect to the address location of the line information on the drum (compare line 23 to line 12).

Since the drum counter early is anticipated by three time slots with respect to the information under the heads and the drum counter late is delayed by one slot, the total difference between the two counters is four time slots (32 μseconds); compare line 4 with line 23.

From the timing diagram, it can be seen that for the writing operation, the pulse used to write the line number onto the drum occurs three time slots (24 μseconds) after the pulse used to count the coincident directory number in the drum counter early; compare line 33 to line 4. Since this is the same delay found in the directory number translation, the information will be written in the correct location; compare line 33 to line 12.

10.6 *Buffer register after coincidence.*—The buffer register after coincidence accepts the translated directory number from the counter access register or the translated line number from the drum. Certain strapped digits are also read in after coincidence. This information, along with the strapped and decoded digits read in before coincidence, is then available to be transferred to the translator access register.

10.6.1 *Directory number translation.*—During a directory number translation, the translated line number is read from the drum during RO. The logic for the strobing is shown in the pulse generator circuit (Chapter 6). The digits P, U, T, H, D, and C are read into flip-flops BR17 through BR40. The information consists of A.-C. set and reset pulses produced by the playback switches SWPB1–SWPB27 with the flip-flops tied in complementary fashion. The first three bits of the sender instruction digit (S) are also read from the drum at this time into BR5, BR6 and BR7. The bit of the S digit weighted 8 (in BR8) is obtained from a decoding matrix before coincidence as well as the I, B, and A digits in BR1 through BR4, BR9 through BR12, and BR13 through BR16, respectively (see 10.3.1). The digits in the buffer register are now I, S, B, A, P, U, T, H, D, and C in flip-flops BR1 through BR40 respectively. These digits are now available to be transferred to the translator access register and set out.

10.6.2 *Line number translation.*—During a line number translation, the translated directory number is read from the counter access register. The digits are U, T, H, and Th and are read into flip-flops BR21 through BR36. The information on the D.-C. sets consists of CR–R5 through CR–R19 and CR–$\overline{\text{R5}}$ through CR–$\overline{\text{R19}}$ on the D.-C. resets. The first bit of the thousands digit (flip-flop BR33) has H and $\overline{\text{H}}$ from the control on its D.-C. set and reset. Since the state of the H flip-flop FIG. 5 indicates the segment of the drum on which the coincident line number is located and since the even thousands digit addresses are located on one side of the drum and the odd thousand addresses on the other, this bit of information makes the thousands digit of the translated number odd or even according to where the coincident number is located. The A.-C. sets and resets of BR21 through BR36 are pulsed during RO (see Equation 1, part 10.3.1).

One of the office code digits N is pulses (T1C) into BR37 through BR40 during RO. The digit has the value 7.

$$BR\text{–}T1C = CC\text{–}LN \cdot AP\text{–}RO \cdot DIP \quad (46)$$

The digits I, S, A, A, and B1 are read into flip-flops BR1 through BR20 before coincidence (see 4.2). The digits in the buffer register are now I, S, A, A, B1, U, T, H, Th, and N and are located in BR1 through BR40, respectively. These digits are now available to be transferred to the translator access register and sent out.

10.6.3 *Writing operation.*—No information is read into the buffer register after coincidence in a writing operation. The operation of the buffer register, after coincidence during the directory number translation which follows writing, is identical to the directory number translation described above.

10.7 *Translator access register after coincidence.*—After coincidence has been determined, the timing signal AA becomes true. This signal is used to reset the transistor access register to the all zero state. NT–R41 is used as the prefix bit in the sending operation and is not reset.

$$\text{Reset } NT\text{–}R1 \text{ through } NT\text{–}R40 = (AP\text{–}AA + CC\text{–}I) \cdot ADIP \quad (47)$$

The information in the buffer register is then applied to the D.-C. sets, and the ones in the buffer register are transferred TSA into the translator access register with the timing signal TR.

$$NT\text{–}TSA = AP\text{–}TR \cdot DIP \quad (48)$$

Because the thousands digit code for directory numbers differs from the normal binary coded decimal code, the translated directory number during a line number translation must be changed back to the binary coded decimal code before it can be sent out of the translator. When the thousands digit has the value eleven (1101), it must be changed to the value one (1000). The value of the digit must remain unaltered at all other times. Since the thousands digit is transferred into NT–R25 through NT–R28, the second and fourth bits of the thousands digit in the buffer register must be put through a decoder (TDE34 and TDE36) before being applied to the D.-C. sets of NT–R26 and NT–R28.

$$NT\text{–}TDE34 = BR\text{–}BR34 \cdot \overline{(BR\text{–}BR33 \cdot BR\text{–}BR34 \cdot BR\text{–}\overline{BR35} \cdot BR\text{–}BR36 \cdot \overline{CC\text{–}LN})} \quad (49)$$

$$NT\text{–}TDE36 = BR\text{–}BR36 \cdot \overline{(BR\text{–}BR33 \cdot BR\text{–}BR34 \cdot BR\text{–}\overline{BR35} \cdot BR\text{–}BR36 \cdot \overline{CC\text{–}LN}} \quad (50)$$

It should be noticed that when:

$$BR\text{–}BR33 \cdot BR\text{–}BR34 \cdot BR\text{–}\overline{BR35} \cdot BR\text{–}BR36 \cdot CC\text{–}LN = 0 \quad (51)$$

there is no change in code and:

$$NT\text{–}TDE34 = BR\text{–}BR34 \quad (52)$$

$$NT\text{–}TDE36 = BR\text{–}BR36 \quad (53)$$

When:

$$BR\text{–}BR33 \cdot BR\text{–}BR34 \cdot BR\text{–}\overline{BR35} \cdot BR\text{–}BR36 \cdot CC\text{–}LN = 1 \quad (54)$$

then, the thousands digit code (1101) in the buffer register is changed to (1000) when it is transferred to the translator access register. Thus, BR34 and BR36 appear to the translator access register as zeros.

$$NT\text{-}TDE34 = NT\text{-}TDE36 = 0 \qquad (55)$$

The digits in NT-R1 through NT-R40 are I, S, P, U, T, H, D, C, B, and A for a directory number translation and I, S, B1, U, T, H, Th, N, A, and A during a line number translation.

CHAPTER 11 DRUM ADDRESS CIRCUITRY

*Summary*

This chapter describes the manner in which the word locations on the drum are identified and how the identification (address) is utilized in performing directory and line number translations. Two counters are employed for this function, the drum counter early is used in providing the address for determining coincidence during a directory number translation DNT, while the drum counter late provides the readout as a result of a line number translation LNT.

11.1 *Introduction.*—The layout of information on the drum is such that the 8192 words stored on the drum are divided equally between two segments of the drum (see Chapter 5). Each of the 4096 word locations is represented by a binary bit (one) written on the master clock track. The readout from this track produces a continuous pulse train (2 μsec. pulses every 8.1 μsec.) which is used as the system clock (see Chapter 6). The system clock is used to step the drum counter early. The drum counter early is a binary coded decimal counter which counts the number of clock pulses (4096 word positions around the periphery of the drum). The counter is kept in synchronism with the drum by utilizing the drum reset pulse DRP (a 2 μsec. pulse occurring once per revolution of the drum) which resets the counter to the all zero condition once per drum revolution.

The drum counter early employs a special thousands digit which enables it to simultaneously display the even numbered thousands digits on one segment of the drum and the odd numbered thousands digits on the other drum segment. The output of the drum counter early, being capable of displaying each word position stored on the drum, is interpreted as the directory number address of the subscribers served by the Translator. The output is eventually fed to the buffer register where it is used by the coincidence circuit for a parity check in determining DNT coincidence. Once a condition of parity has been found (DNT coincidence established), the drum counter early has fulfilled its function in providing a directory number address during the processing of a DNT.

The timing delays encountered in the sequential logic employed in providing readout during a LNT are such that a count which is delayed by four steps with respect to the drum counter early is required (see Chapter 10). This requirement is supplied by the drum counter late. The drum counter late is similar to the drum counter early, except that its reset state is four steps behind that of the drum counter early keeping the drum counter late always four steps behind the drum counter early.

The output of the drum counter late is eventually fed to the translator access register where it represents the directory number of the calling party, and fed back to the register sender group, as a result of a successful LNT. The drum counter late, therefore, is used as the readout as a result of LNT coincidence.

The information carried by the two drum counters (drum counter early and drum counter late) must be capable of being fed into the buffer register in parallel form. Because of input commitments from the drum readout circuitry, the buffer register is capable of being accessed from only one additional source (see also Chapter 4). The counter access register provides the buffer register with a single input from a dual source consisting of the drum counter early and the drum counter late.

11.2 *Sequence of operations:*

11.2.1—For a directory number translation DNT or a write operation WR.

11.2.1.1—The index pulses are fed to both drum counters.

11.2.1.2—The control circuit is placed in the DN (or WR) mode.

11.2.1.3—The output from the drum counter early is fed into the counter access register in parallel form.

11.2.1.4—The output of the counter access register is fed to the buffer register in parallel fashion.

11.2.1.5—The count appearing in the buffer register is presented to the coincidence circuit where it is checked for parity against the directory number in the translator access register.

11.2.1.6—Once DNT coincidence has been established, the transfer of information from the counter access register to the buffer register is stopped.

11.2.2—For a line number translation LNT.

11.2.2.1—Same as in 11.2.1.1.

11.2.2.2—The control circuit is placed in the LN mode.

11.2.2.3—The output from the drum counter late is fed into the counter access register in parallel form.

11.2.2.4—After LNT coincidence has been determined, the output of the counter access register is fed into the buffer register in parallel form.

11.2.2.5—The count is fed out of the buffer register and into the translator access register in parallel form.

11.2.2.6—The count in the translator access register becomes part of the successful translation which is set back to the register sender group.

11.3 *Drum counter early:*

11.3.1 *General.*—The drum counter early is a counter of 5,000 consisting of four decades. The units, tens, and hundreds decades each employ four flip-flops coded in binary coded decimal form utilizing 10 to represent zero thus eliminating the all zero code (see Chapter 4). The thousands decade consists of a three flip-flop count of five utilizing the 2, 4, and 8 weighted bits of the code. The thousands digit is defined by these three bits and the state of the H flip-flop in the process coincidence auxiliary circuit. The H flip-flop provides the lease significance bit 1, thus completing the binary coded decimal number.

The counter contains its own pulse distributor, and advance circuit. The counter is driven in synchronism with the drum by the drum index pulse DIP and the drum reset pulse DRP inputs. The counter is also equipped with an alarm circuit which checks the state of the counter once per revolution (33 msec.) of the drum.

The output of the counter is fed to the counter access register which presents its output to the buffer register for subsequent use in producing DNT coincidence. The thousands decade presents three of the four bits necessary to yield a binary coded decimal number. The number is completely identified by interpretation of the H flip-flop in the process coincidence auxiliary circuit which represents the least significant bit, weighted 1. H being true 1 signifies an odd valued thousands decade, while a 0 value for H signifies an even valued thousands decade. In this manner, the special thousands decade represents a count which displays both segments (odd and even) of the drum, and the H flip-flop is used to enable the readout from the correct segment after coincidence has been found.

11.3.2 *Circuit description:*

11.3.2.1 *Units, tens, and hundreds decades.*—The units decade is represented by a four stage binary counter utilizing the 1-2-4-8 weighted code. The code is shown in Table 4.1 for the units, tens and hundreds counters, and in Table 11.1 for the thousands counter. The circuit consists primarily of four flip-flops (U1, U2, U4, and U8), and the logic circuitry for the proper logic commands to the D.-C. sets and resets of the flip-flops, while the corresponding A.-C. sets and resets of the flip-flops are tied together and fed by the counter index pulse CIP.

TABLE 11.1

| Stage | Thousands | | | | |
|---|---|---|---|---|---|
| | H | M2 | M4 | M8 | # |
| I | 0 | 1 | 0 | 1 | 0 |
| | 1 | 1 | 0 | 1 | 1 |
| II | 0 | 1 | 0 | 0 | 2 |
| | 1 | 1 | 0 | 0 | 3 |
| III | 0 | 0 | 1 | 0 | 4 |
| | 1 | 0 | 1 | 0 | 5 |
| IV | 0 | 1 | 1 | 0 | 6 |
| | 1 | 1 | 1 | 0 | 7 |
| V | 0 | 0 | 0 | 1 | 8 |
| | 1 | 0 | 0 | 1 | 9 |

A second set of A.-C. sets and resets are tied together and fed by the counter reset pulse CRP. In this manner, CRP is used to force the counter into the reset state, i.e. $U1=0$, $U2=1$, $U4=0$, and $U8=1$.

The tens decade consists of four flip-flops (T1, T2, T4, and T8) with associated logic. The hundreds decade also consists of four flip-flops (H1, H2, H4, and H8) and their associated logic. The tens and hundreds decades are identical to the units decade as far as the logic presented to the D.-C. controls of the binary coded decimal weighted flip-flops. The tens decade is stepped with the tens counter index pulse TCIP, and the hundreds decade is stepped with the hundreds counter index pulse HCIP. TCIP and HCIP are produced by the advance circuit (see 11.3.2.4). Both the tens and hundreds decades are reset by CRP in the same manner as described earlier for the units decade. The code employed for the tens and hundreds decades is also shown in Table 4.1.

11.3.2.2 *Thousands decade.*—The thousands decade is a three stage count of five employing a special code. The code is shown in Table 11.1. The circuit consists of three flip-flops (M2, M4, and M8) and the necessary logic for the D.-C. sets and resets of the flip-flops. The corresponding A.-C. sets and resets are tied together and fed by the thousands counter index pulse MCIP.

The other A.-C. inputs are connected together and fed by CRP. The CRP pulse is thereby used to return the thousands decade the reset state, i.e. $M2=1$, $M4=0$, and $M8=1$.

11.3.2.3 *Pulse distributor.*—The pulse distributor consists of flip-flop PD and gated pulse amplifiers #U1 and #U2. The PD flip-flop is connected in complementary fashion using the D.-C. inputs. The corresponding A.-C. set is fed by the drum reset pulse DRP, while the A.-C. reset is fed by the auxiliahy drum index pulse ADIP. The PD flip-flop 1 output is fed to gated pulse amplifier one and the 0 output is fed to gated pulse amplifier two. The A.-C. inputs to both gated pulse amplifiers are connected together and fed by DIP.

The configuration is used to produce the units decade counter index pulse CIP and the counter reset pulse, CRP. The circuit blanks out one of the DIP pulses in producing the CIP pulse train. The blanked out DIP pulse becomes the CRP pulse. In this manner, CIP consists of a number of pulses equal to the number of word locations around the periphery of the drum minus one, while CRP consists of only one pulse for each revolution of the drum. The CIP pulses are fed to the units decade flip-flops A.-C. sets and resets while the CRP pulses are fed to the other A.-C. inputs of all decade flip-flops whose corresponding D.-C. sets and resets are tied to −8 volts.

11.3.2.4 *Advance circuit:*

11.3.2.4.1 *Tens decade advance.*—The tens decade counter requires a stepping pulse period of 81 μsec., since it is stepped once for every 10 steps of the units decade (which is stepped at 8.1 μsec. by CIP. The advance pulse for the tens decade is provided by the use of flip-flop AD1, NOR gate #T1, and gated pulse amplifiers #T2 and #T11. The output of NOR gate #T1, whose input is the 0 output of flip-flop U8 is connected to the D.-C. set of AD1. The corresponding A.-C. set is fed by ADP which is the output of gated pulse amplifier #T11, whose inputs consist of the ADIP and the 1 output of flip-flop U1. This arrangement sets AD1 whenever the units decade appears in the binary coded decimal=9 state. The 1 output of AD1 is fed to the D.C. input of gated pulse amplifier #T2, which has its A.-C. input fed by CIP. The output of gated pulse amplifier #T2 becomes the tens counter advance pulse TCIP. The 1 output of AD1 is fed to the D.-C. reset whose corresponding A.-C. reset is fed by ADIP. In this manner, AD1 provides a signal for one time slot, which corresponds to the binary coded decimal=9, delayed by 4 μsec. The time relationship of the signals utilized in producing TCIP is shown in FIGURE 35.

11.3.2.4.2 *Hundreds decade advance.*—The hundreds decade requires a stepping pulse period of 810 μseconds. It is stepped once every 100 counts of the units decade and every 10 counts of the tens decade. The hundreds advance pulse HCIP is provided by the use of flip-flop AD2, diode coupled NOR gate #H1, and gated pulse amplifier #H2. Whenever a binary coded decimal=9 appears in the units decade as well as the tens decade, NOR gate #H1 fed to the D.-C. set of AD2 and ADP fed to the corresponding A.-C. set are used to set flip-flop AD2. The 1 output of AD2 is gated with the counter index pulse in gated pulse amplifier #H2. The output of gated pulse amplifier #H2 becomes the hundreds counter index pulse HCIP. The 1 output of AD2 is fed to its D.-C. reset, whose corresponding A.-C. reset if fed by ADIP. In this manner AD2 provides a signal for one time slot, which corresponds to the function binary coded decimal=9 for the units and binary coded decimal=9 for the tens decades delayed by four μsec. The time relationship of the signals used to produce HCIP is shown in FIGURE 36.

11.3.2.4.3 *Thousands decade advance.*—The thousands decade requires a stepping pulse every 8.1 msec. It is stepped once for every 1000 counts of the units decade, 100 counts of the tens decade, and 10 counts of the hundreds decade. The advance pulse for the thousands decade is provided by the use of flip-flop AD3, NOR gate #1, and gated pulse amplifier #2. When the binary coded decimal BCD=9 appears in the units, tens, and hundreds decades, flip-flop AD3 is set by the output of NOR gate #1 being fed to the D.-C. set, and ADP being fed to the A.-C. set. The 1 output of AD3 is fed back to its D.-C. reset, whose corresponding A.-C. reset is fed by ADIP. In this manner, the AD3 flip-flop produces a signal for one time slot, which corresponds to the binary coded decimal=9 for the units, binary coded decimal=9 for the tens, and binary coded decimal=9 for the hundreds decades delayed by four μsec. The time relationship of the signals used to produce MCIP is shown in FIGURE 37.

11.3.3 *Design considerations:*

11.3.3.1 *Units, tens, and hundreds decades.*—The following table shows the code which is employed for the units, tens, and hundreds decades. The weights assigned to each of the four flip-flops are shown at the top of the table. For a complete correspondence to the flip-flop notation used in the drawing the following prefix letters should be added, U for the units decade, T for the tens decade, and H for the hundreds decade. The code deviates from the binary coded decimal code in the representation for a numerical zero. Instead of employing the all zero reset code, the value for 10 is used to represent the decade value of zero.

CODE TABLE

| Decade Value | 1 - 2 - 4 - 8 |
|---|---|
| 10 | 0 1 0 1 |
| 1 | 1 0 0 0 |
| 2 | 0 1 0 0 |
| 3 | 1 1 0 0 |
| 4 | 0 0 1 0 |
| 5 | 1 0 1 0 |
| 6 | 0 1 1 0 |
| 7 | 1 1 1 0 |
| 8 | 0 0 0 1 |
| 9 | 1 0 0 1 |

REDUNDANT STATES

| Decade Value | 1 - 2 - 4 - 8 |
|---|---|
| 0 | 0 0 0 0 |
| 11 | 1 1 0 1 |
| 12 | 0 0 1 1 |
| 13 | 1 0 1 1 |
| 14 | 0 1 1 1 |
| 15 | 1 1 1 1 |

The following set and reset commands were derived to yield the above code by the use of Karnaugh maps, employing the redundant states for simplification. The symbology shown uses the designations for the units decade, but the same equations apply for the tens and hundreds decades by substituting U with T respectively. (All quantities are prefixed by CE–).

Set $U1=\overline{U1}$
Reset $U1=U1$
Set $U2=U1\cdot\overline{U2}$
Reset $U2=U1\cdot U2+U2\cdot U8=U2(U1+U8)$
Set $U4=U1\cdot U2\cdot\overline{U4}$
Reset $U4=U1\cdot U2\cdot U4$
Set $U8=U1\cdot U2\cdot U4$
Reset $U8=U2\cdot U8$ These Boolean equations are fulfilled at the inputs to the flip-flops in each of the three decades mentioned (units, tens, and hundreds). The loading requirements resulted in unique buffering provisions in each of the decades, however, keeping the logic undisturbed.

11.3.3.2 *Thousands decade*.—The thousands decade is a three flip-flop count of five which incorporates a special code as described in 11.3.1 above. As was explained earlier, the 8192 storage locations are broken down into even thousands on one segment and odd thousands on the other segment. The reason for this is apparent from the following table:

| Decade Value | BCD (1-2-4-8) | Counter State |
|---|---|---|
| 0 | 0000 | Not used |
| 1 | 1000 | |
| 2 | 0100 | II |
| 3 | 1100 | |
| 4 | 0010 | III |
| 5 | 1010 | |
| 6 | 0110 | IV |
| 7 | 1110 | |
| 8 | 0001 | V |
| 9 | 1001 | |
| 10 | 0101 | I |
| 11 | 1101 | |

As can be seen, the grouping of II, III, IV, and V have all bits common except for the lease signficant bit. This leads to the natural division of odd and even digit values, i.e. least significant bit present signifies an odd number, while the absence of the least significant bit signifies an even number.

Since, however, the reset code 0000 is not used to represent zero, the question arises of matching the decade values for one and zero. This is done by the grouping of decade values ten and eleven shown by state I.

Disregarding the least significant bit, the following counter states can be employed (in this application, the prefix M signifies the thousands decade, and the suffix the decimal weight carried).

| Counter State | Flip-Flop Coding | | | Decade Value |
|---|---|---|---|---|
| | M2 | M4 | M8 | |
| I | 1 | 0 | 1 | 0, 1 |
| II | 1 | 0 | 0 | 2, 3 |
| III | 0 | 1 | 0 | 4, 5 |
| IV | 1 | 1 | 0 | 6, 7 |
| V | 0 | 0 | 1 | 8, 9 |
| Redundant States | | | | |
| | 0 | 1 | 1 | |
| | 1 | 1 | 1 | |
| | 0 | 0 | 0 | |

The following set and reset commands were derived to yield the coding shown above, employing Karnaugh maps using the redundant states for simplification. (All quantities carry the prefix CE–.)

Set $M2=\overline{M2}$
Reset $M2=M2\cdot\overline{M8}$
Set $M4=M2\cdot\overline{M4}\cdot\overline{M8}$
Reset $M4=M2\cdot M4$
Set $M8=M2\cdot M4$
Reset $M8=M2\cdot M8$ The thousands digit code employed requires a decoding matrix in the coincidence circuit to change the input thousands digit one (1000) from the translator access register to the thousands digit eleven of the drum counter early. The design of the decoder is covered in Chapter 10.

The count represented by the thousands decade of the drum counter early is completed by interpretation of the H flip-flop in the process coincidence auxiliary circuit. The H flip-flop represents the least significant bit, and is used to direct readout from the proper segment, i.e. odd or even.

11.3.3.3 *Pulse distributor*.—The pulse distributor is used to produce the basic stepping pulse of the drum counter early CIP and the counter reset pulse CRP. The logic involved is as follows: refer to 11.3.2.3 above as well as FIGURE 34.

$CIP=CE\text{–}\overline{PD}\cdot DIP$
$CRP=CE\text{–}PD\cdot DIP$ where

Set $CE\text{–}PD=CE\text{–}\overline{PD}\cdot DRP$
Reset $CE\text{–}PD=CE\text{–}PD\cdot ADIP$ 11.3.3.4 *Advance circuit:*

11.3.3.4.1 *Tens decade advance*.—Referring to 11.3.2.-4.1 above, the following logic is used in producing TCIP. Timing considerations are shown in FIGURE 35.

$TCIP=CIP\cdot CE\text{–}AD1$ where

Set $CE\text{–}AD1=CE\text{–}U8\cdot ADP$
$CE\text{–}ADP=CE\text{–}U1\cdot ADIP$
Reset $CE\text{–}AD1=CE\text{–}AD1\cdot ADIP$ The decoding of binary coded decimal=9 for the units decade requires that the U1 and U8 flip-flops be set to the one state. As can be seen in FIGURE 35, U8 is in the one state one time slot binary coded decimal=8 ahead of the binary coded decimal=9 time slot. However, the U1 flip-flop is in the zero state just prior to the binary coded decimal=9 time slot. Since the AD1 flip-flop must be set 4 microseconds after the binary coded decimal=9 state with ADIP, the use of the flip-flop U1 through one gate as part of a D.-C. set command to AD1 leads to timing problems; however, U8 is present for approximately 12 microseconds before the AD1 flip-flop is set, and the gate delay can be tolerated. To eliminate the timing difficulty in gating the U1 flip-flop, U1 is gated directly with ADIP through a gated pulse amplifier. The output of the gated pulse amplifier, ADP, becomes the A.-C. set command for AD1. ADP is the A.-C. set pulse input to AD2 and AD3 as well, which is explained in 11.3.3.4.2 and 11.3.3.4.3.

11.3.3.4.2 *Hundreds decade advance.*—Referring to 11.3.2.4.2 above, the following logic is used to produce HCIP. Timing considerations are shown in FIGURE 36.

$$HCIP=CE\text{–}AD2\cdot CIP$$

where

Set $CE\text{–}AD2=CE\text{–}T8\cdot CE\text{–}T1\cdot CE\text{–}U8\cdot ADP$
Reset $CE\text{–}AD2=CE\text{–}AD2\cdot ADIP$ 11.3.3.4.3 *Thousands decade advance.*—Referring to 11.3.2.4.3 above, the following logic is used in producing MCIP. Timing considerations are shown in FIGURE 37.

$MCIP=CIP\cdot CE\text{–}AD3$
Set $CE\text{–}AD3=CE\text{–}H8\cdot CE\text{–}H1\cdot CE\text{–}T8\cdot CE\text{–}T1\cdot CE\text{–}U8\cdot ADP$
Reset $CE\text{–}AD3=CE\text{–}AD3\cdot ADIP$ 11.4 *Drum counter late*:

11.4.1 *General.*—For proper readout of the calling party's directory number during a line number translation, a count which is delayed by four steps from the state of the drum counter early is required (see Chapter 10). This delay count is provided by the drum counter late. The drum counter late is essentially identical to the drum counter early except for the strapped reset state and strapped logic for the alarm circuit. When the drum counter early is reset to the I,000 state, the drum counter late is simultaneously reset to the V,996 state. In like manner, when the CRP pulse strobes the V,095 state of the drum counter early in the alarm circuit, the same pulse will strobe the V,091 state of the drum counter late in its alarm circuit.

11.4.2 *Circuit description*:

11.4.2.1 *Units, tens, and hundreds decades.*—The circuit principles and design considerations are identical to that of the drum counter early (11.3.2.1 and 11.3.3.1). The units decade flip-flops have their second set of D.-C. inputs strapped to yield the decimal value of six (0110). The tens and hundreds decades are strapped to yield decimal nine (1001).

11.4.2.2 *Thousands decade.*—The circuit principle and design considerations are identical to that of the drum counter early (11.3.2.2 and 11.3.3.2). The only difference lies in the reset state. The thousands decade of drum counter late has its flip-flop second set of inputs strapped to yield the V state (001).

11.4.2.3 *Pulse distributor.*—The circuit principle and design is identical to that of the drum counter early (11.3.2.3).

11.5 *Counter access register*:

11.5.1 *General.*—The counter access register is an intermediary between the two drum counters and the buffer register. Both the drum counter early and the drum counter late must be capable of being fed in parallel to the buffer register. Because the outputs of the drum access circuitry are fed into the first set of inputs of the buffer register flip-flops, only the second set of inputs is available as the other source of input. The counter access register provides the buffer register with such a source of input from either of the two counters. The counter access register contains the necessary flip-flops and logic pulse gating for feeding in either of the drum counters depending on the type of translation being performed.

11.5.2 *Circuit description*:

11.5.2.1 *D.-C. strapped functions.*—The counter access register consists of 19 flip-flops (R1 to R19). The first set of D.-C. sets of R1 to R16 (except R13) are fed by the 1 outputs of the drum counter early flip-flops (CE–U1, CE–U2, CE–U4, CE–U8 . . . CE–M8). The D.-C. resets are fed in the same manner by the 0 outputs. The first D.-C. sets and resets of R13 and R17 to R19 are left floating.

The second set of D.-C. sets of R1 to R4 are tied to ground, while the corresponding D.-C. resets are tied to −8 volts. The second set of D.-C. sets of R5 and R19 are fed by the 1 outputs of the drum counter late flip-flops (CL–U1, CL–U2, CL–U4, CL–U8 . . . CL–M8). The corresponding D.-C. resets are fed by the 0 outputs of the drum counter late flip-flops.

The above connections provide parallel transmission of information from the two counters into one register. Selection of flip-flops is necessary to enable this transmission to be compatible with the information transfer format, described in Chapter 4.

11.5.2.2 *Pulse gating.*—The A.-C. sets and resets of the first set are tied together and fed by RPA; the A.-C. sets and resets of the second set are tied together and fed by RPB. The distributor consists simply of two gated pulse amplifiers. The logic involved is as follows:

$CR\text{–}RPA=(CC\text{–}DN+CC\text{–}WR)\cdot ADIP$
$CR\text{–}RPB=CC\text{–}LN\cdot ADIP$ RPA allows the counter access register to exhibit the count displayed in the drum counter early during the directory number translation (or write operation), while RPB allows the counter access register to exhibit the count shown in the drum counter late during a line number translation. In both cases, the counter state is delayed by 4 μsec. before it becomes an output of the counter access register.

The outputs of the counter access register are fed in parallel to the buffer register. The logic controlling this flow of information is found in the buffer register.

CHAPTER 12 AUXILIARY CIRCUITS

*Summary*

This chapter covers the operation of the time out circuitry which is used to detect the occurrence of system malfunctions and to prevent the system from being held inoperative due to these occurrences. The recording of these malfunctions and the alarm signals from the drum counters is also covered.

12.1 *Introduction.*—The Translator is capable of operating in any one of the three modes in providing service to the 20 register sender groups and local console. These modes of operation are as follows: directory number translation DNT, line number translation LNT, and write WR. These modes of operation are denoted by the DN, LN, and WR flip-flops respectively in the control circuit.

In handling each of these three modes, the translator is operated in three consecutive control states, i.e. the RECEIVE state, the PROCESS state, and the SEND state. These control states are denoted by the R, P, and S flip-flops respectively in the control circuit. In serving a register sender group (or local console) the control circuit is guided through each state successively. Investigation of the time required to fulfill each state, provides the basis for the allocation of a maximum time limit for the completion of each given state. These timing allocations are made in the translator time out circuit FIG.

19. The time out circuit observes the condition of each of the control states at predetermined time intervals and produces an output if a particular state has persisted beyond the maximum time allotted. The time allotted for each state is in terms of the drum revolution period (33 msec.). The time out circuit produces seven outputs (time out signals) which are all fed to a translator trouble recorder circuit.

The translator trouble recorder provides a means for recording any of the time out signals encountered in the time out circuit. The occurrence of the drum counter alarm signals produces a general alarm signal which is displayed on the console panel.

It should be noted here that during the processing of an LNT operation, the generation of a time out signal does not necessarily imply a malfunction. It is interpreted as an indication that the particular line number sought is not present on the particular drum.

Figure 19:
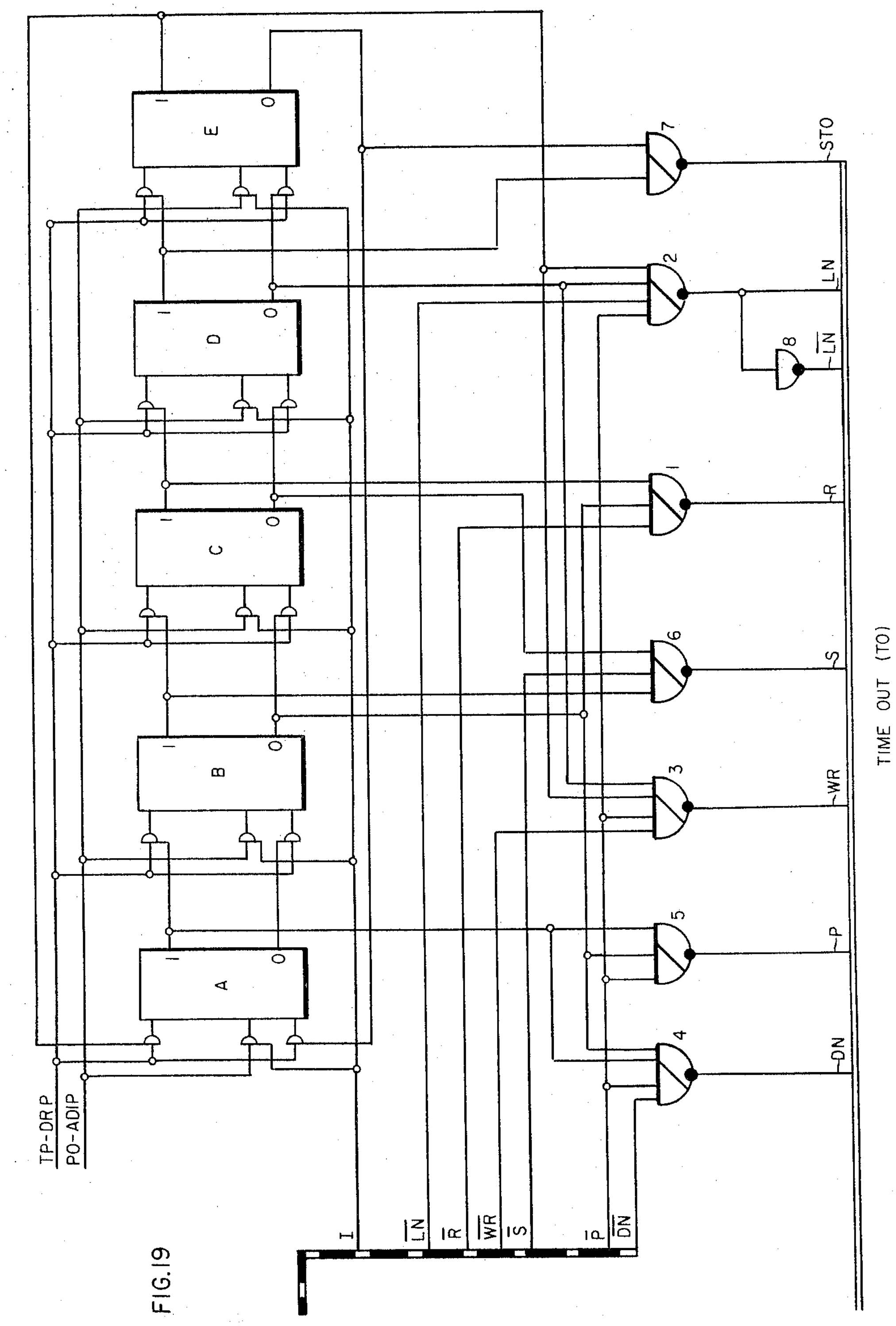

12.2 *Translator time out circuit*:

12.2.1 *Circuit description*.—The time out circuit contains a 5 stage ring counter using flip-flops A, B, C, D, and E as shown in FIGURE 19. Flip-flops A to E are connected in shift register fashion, and the ring is closed by a reversal of feedback from the last stage (flip-flop E) to the first stage (flip-flop A). The code exhibited by such an arrangement is shown in the code table 12.1.

TABLE 12.1

| A | B | C | D | E | Logic Rep. | Pos. |
|---|---|---|---|---|---|---|
| 0 | 0 | 0 | 0 | 0 | $\bar{A}\ \bar{E}$ | I |
| 1 | 0 | 0 | 0 | 0 | $A\ \bar{B}$ | Ref. |
| 1 | 1 | 0 | 0 | 0 | $B\ \bar{C}$ | 1 |
| 1 | 1 | 1 | 0 | 0 | $C\ \bar{D}$ | 2 |
| 1 | 1 | 1 | 1 | 0 | $D\ \bar{E}$ | 3 |
| 1 | 1 | 1 | 1 | 1 | $A\ E$ | 4 |
| 0 | 1 | 1 | 1 | 1 | $\bar{A}\ B$ | 5 |
| 0 | 0 | 1 | 1 | 1 | $\bar{B}\ C$ | 6 |
| 0 | 0 | 0 | 1 | 1 | $\bar{C}\ D$ | 7 |
| 0 | 0 | 0 | 0 | 1 | $\bar{D}\ E$ | 8 |

During the time that the translator is in the IDLE state, the counter is forced into all zero state (POS. I in the code table). This is accomplished by utilizing the flip-flop reset inputs. The A.-C. reset inputs of flip-flops A to E are tied together and fed by the auxiliary drum index pulse ADIP. The corresponding D.-C. reset inputs are tied together and fed by the idle signal I from the control circuit.

During the time that the translator is in the busy state, ($I=0$), the counter is allowed to count DRP pulses. The counter continues counting DRP pulses until the system is returned to IDLE, by completion of a translation or by the registering of a time out signal (see 12.2.2 below).

The code table shows the coding used to represent the number of complete drum revolutions elapsed with respect to the reference position, REF. REF is used as the reference point in determining all of the time out signals (12.2.2 below). Since the idle signal can be removed at any time between the occurrence of any two drum reset pulses, the first DRP after the idle signal is removed is used to set the counter into the reference state, REF. This insures that position 1 occurs at least one complete revolution after the I signal is taken away. Similarly positions 2, 3, 4, 5, 6, 7, and 8 represent at least 2, 3, 4, 5, 6, 7, and 8 complete drum revolutions respectively.

The seven NOR gates (#1–7) and inverter (#8) shown in FIGURE 19 are used to produce the time out signal outputs.

12.2.2 *Time out signals:*

12.2.2.1 *TO–R* (*Time out while in the RECEIVE state*).—The maximum time allotted for the completion of the RECEIVE state is one drum revolution (33 msec.). The considerations in determining this are as follows: Once the control circuit is placed in the RECEIVE state, the translator receiver circuit sends the GO signal to the register sender group. This communication takes about 4 msec. Once the GO signal is received by the register sender group the diphase information is sent to the translator. This communication requires approximately 1 msec. (propagation time $=41$ bit$\times 25$ $\mu$sec. repetition rate). Once the diphase information has been received at the translator, the RECEIVE state is completed. The GO signal delay time and the diphase propagation time amounts to approximately 5 msec. (1 msec. for a console operation since no GO signal is sent). Therefore, in terms of a drum revolution (33 msec.) the RECEIVE state normally will be completed long before the elapsed time of one drum revolution. If the RECEIVE state persists for one complete drum revolution (indicated by the R flip-flop in the control circuit remaining in the one state), the time out signal, TO–R is generated which indicates a malfunction during the RECEIVE state.

The Boolean expression for TO–R is as follows:

$$TO\text{–}R=TO\text{–}B\cdot TO\text{–}\bar{C}\cdot CC\text{–}R$$

where: $B\cdot\bar{C}$ represent position 1 shown in the code table and R is produced from the control circuit.

12.2.2.2 *TO–LN* (*Time out while processing an LNT operation*).—The maximum time allotted for completing the processing of an LNT operation is three drum revolutions. The considerations are as follows: The RECEIVE state is allowed a maximum of one drum revolution as explained in 12.2.2.1 above. In order to arrive at a successful LNT both segments of the drum may have to be scanned (as described in Chapter 10) which requires two complete drum revolutions. Since there is a possibility of the RECEIVE state being completed sometime during the first revolution, an additional two complete revolutions must be allowed. This results in a maximum allottment of 3 drum revolutions (from REF) for the completion of the PROCESS state for an LNT operation. If the control circuit persists in the PROCESS state until the third revolution is registered, the time out signal TO–LN will be produced.

The Boolean expression for TO–LN is as follows:

$$TO\text{–}LN=TO\text{–}D\cdot TO\text{–}\bar{E}\cdot CC\text{–}P\cdot CC\text{–}LN$$

where: $D\cdot\bar{E}$ represents position 3 in the code table. P and LN are produced by the P (PROCESS state) and LN (LNT mode) flip-flops in the control circuit.

12.2.2.3 *TO–WR* (*Time out due to the persistence of the WR model*).—The maximum time allowed for the completion of the WRITE mode is three drum revolutions. The considerations are as follows: The WRITE operation requires that a coincidence takes place (see Chapter 10) which is allowed one complete drum revolution. The WR mode is reset no later than one complete drum revolution after writing has taken place. Since the RECEIVE state (from the local console) may be completed sometime during the first drum revolution, by the time that the third complete drum revolution has been completed the WR signal should not be present. If WR persists until the third drum revolution has been registered, the time out signal TO–WR will be produced.

The Boolean expression for TO–WR is as follows:

$$TO\text{–}WR=TO\text{–}D\cdot TO\text{–}\bar{E}\cdot CC\text{–}WR\cdot CC\text{–}P$$

where: $D\cdot\bar{E}$ represents position 3 in the code table. P and WR are produced by the P (PROCESS state) and the WR (WRITE mode) flip-flops in the control circuit.

12.2.2.4 *TO–DN* (*Time out due to the persistence of the DN mode*).—The maximum time allotted for the completion of the DN mode is five drum revolutions. The considerations are as follows: A DNT operation is performed after all WRITE operations. After writing has occurred (see Chapter 10) the first drum reset pulse DRP changes the control circuit mode of operation from WR to DN. This change can occur at the end of the second drum revolution (position 2 in the code table). One complete drum revolution (till position 3 is registered) is allowed for the settling of writing transients. To successfully achieve DNT coincidence requires a maximum of one drum revolution. This would seemingly imply that the DNT coincidence should occur at the latest when the fourth DRP occurs. However, DNT coincidence cannot occur during the first time slot after the third DRP (position 3), (see Chapter 9) which means that there is a possibility that DNT coincidence can (at the latest possible time) occur one time slot after the fourth DRP (position 4). Therefore, it must be assumed that DNT coincidence must occur before the arrival of the fifth DRP (position 5). After DNT coincidence is established and read out is achieved, the P flip-flop will be reset when the system is returned to the SEND state. If the P flip-flop has not been reset by the time the fifth DRP occurs the time out signal TO–DN will be produced.

The Boolean expression for TO–DN is as follows:

$$TO\text{–}DN=TO\text{–}\overline{A}\cdot TO\text{–}B\cdot CC\text{–}P\cdot CC\text{–}DN$$

where: $\overline{A}\cdot B$ represents position 5 in the code table. P and DN are produced by the P (PROCESS state) and DN (DNT mode) flip-flops in the control circuit.

12.2.2.5 *TO–P (Time out in the PROCESS state)*.—The PROCESS state is allowed to persist for the same maximum time as the DN mode. In this case the worst case length for the occurrence of the PROCESS state is about 1 msec. (sending time) less than that of the DN mode, since DN lasts through the sending state. The time out signal, TO–P will be produced whenever the PROCESS state is present when position 5 (code table) is registered, regardless of the mode of operation (DN, LN, or WR).

The Boolean expression for TO–P is as follows:

$$TO\text{–}P=TO\text{–}\overline{A}\cdot TO\text{–}B\cdot CC\text{–}P$$

where: $\overline{A}\cdot B$ represents position 5 in the code table. P is produced by the P (PROCESS state) flip-flop in the control circuit.

12.2.2.6 *TO–S (Time out in the SEND state)*.—The maximum time allotted for the persistence of the SEND state is one drum revolution in addition to the time allotted for TOP, although the SEND state should be completed by the end of the fifth DRP. If the SEND state persists at the time the sixth DRP occurs, the time out signal TO–S will be produced.

The Boolean expression for TO–S is as follows:

$$TO\text{–}S=TO\text{–}\overline{B}\cdot TO\text{–}C\cdot CC\text{–}S$$

where: $\overline{B}\cdot C$ represent position 6 in the code table. S is derived from the S (SEND state) flip-flop in the control circuit.

12.2.2.7 STO *(General system time out)*.—The time out signals discussed in 12.2.2.1 to 12.2.2.6, with the exception of TO–LN which is not necessarily an indication of a malfunction, are capable of returning the system to the IDLE state providing the FL sginal from the allotter (see Chapter 7) is no longer being held on due to the persistence of the call for service signal from the register sender group (or local console) being served. Therefore, an overall maximum time limit is allowed for the translator to be held up due to the failure to remove the call for service signal. The maximum time allotted before the translator is forced into the IDLE state regardless of the fact that a call for service signal is still present is 8 drum revolutions. If the system has not been returned to the IDLE state before position 8 (code table) is registered, the system time out signal STO will be produced. STO will force the system to the IDLE state thus causing the translator allotter to continue scanning.

The Boolean expression for STO is as follows:

$$TO\text{–}STO=TO\text{–}D\cdot TO\text{–}\overline{E}$$

where: $D\cdot\overline{E}$ represents position 8 as shown in the code table.

12.2.3 *Output functions*.—The time out signals TO–R, TO–WR, TO–DN, TO–P, and TO–S are fed to gate #3 in the control circuit. They are used to return the control state to IDLE, provided that the FL signal from the translator allotter is no longer present as described in Chapter 9. These signals are also fed to the translator trouble recorder (see Section 12.3 below).

The time out signal STO is also fed to the control circuit, where it is used to return the system to the IDLE state irrespective of the fact that the FL signal might be present. STO is also recorded in the translator trouble recorder (see Section 12.3 below).

The time out signal TO–LN is fed to the buffer register along with its complement TO–LN, and is used to set the I digit to the I=13 state (see Chapter 10).

TO–LN is also fed to the process coincidence auxiliary circuit, where it is used to enable read out as a result of an unsuccessful line number translation (see Chapter 10 also).

TO–LN is also recorded in the translator trouble recorded (see Section 12.3 below).

12.3 *Translator trouble recorder*:

12.3.1 *General*.—The translator trouble recorder is used to store the occurrence of any of the time out signals produced in the time out circuit (described in 12.2 above). These stored signals are displayed on the console panel (described in Chapter 8). The occurrence of any one of the alarm signals produces a general alarm signal which is also displayed on the console panel.

What is claimed is:

1. A translator for use in an automatic telephone system including register-senders, and a translator allotter, said translator including: a first plurality of incoming register means operated upon receipt of a plurality of digits to register said digits, a record means having recorded therein a plurality of sets of coded call routing and control data items, readout means adapted to read said recorded data from said record means, first counter means arranged to indicate the address of said readout means in relation to said record means, coincidence detecting means, buffer register means, first counter gating means, process control means, last-digit gating means operated after receipt of the last one of said plurality of digits to pass said last digit to said process control means, first decoding means in said process control means operated upon receipt of said last digit to enable said first counter gating means to pass said first counter count to said buffer register means, circuit means comprising the connections of said buffer register means and said incoming register means to said coincidence means to operate said coincidence means to compare said data from said incoming register and said counter count, coincidence signal means in said coincidence means operated upon parity between said two sets of data to signal said process control means, control means in said process control means operated responsive to said signal to enable said readout means, said readout means thereby operated to transfer said appropriate coded call routing and control data items from said record means to said buffer register, other means thereafter operated to send said coded call routing and control data from said buffer register to said register-sender.

2. Apparatus according to claim 1 in which said record means is a constantly revolving magnetic drum.

3. Apparatus according to claim 2 in which each set of said recorded items are recorded in a plurality of four bit code items in an axial row along the surface of said drum.

4. Apparatus according to claim 3 in which each of said sets of said recorded items is recorded in sequence in a circumferential row, said drum including 5000 of said axial rows in said circumferential row.

5. Apparatus according to claim 4 in which said record means contains 10,000 sets of recorded items in a first and a second circumferential row, the odd thousand numbered sets in said first circumferential row and the even thousand numbered sets in said second circumferential row.

6. A translator for use in an automatic telephone system including register-senders, said translator including: incoming register means operated upon receipt of a plurality of digits to register said digits, a record means having recorded therein a plurality of sets of coded call routing and control data items, readout means adapted to read said recorded data from said record means, first counter means arranged to indicate the address of said readout means in relation to said record means, coincidence detecting means, buffer register means, first counter gating means, buffer register means, a process control means, last-digit gating means operated after receipt of the last one of said plurality of digits to pass said last digit to said process control means, first decoding means in said process control means operated upon receipt of said last digit to enable said first counter gating means to pass said first counter count to said buffer register means, circuit means comprising the connections of said buffer register means and said incoming register means to said coincidence means to operate said coincidence means to compare said data from said incoming register and said counter count, coincidence signal means in said coincidence means operated upon parity between said two sets of data to signal said process control means, control means in said process control means operated responsive to said signal to simultaneously enable said readout means and clear said buffer register and said incoming register of all data, said readout means thereby operated to transfer said appropriate coded call routing and control data items from said record means to said buffer register, transfer means thereafter operated to transfer said coded call routing and control data from said buffer register to said incoming register, an outgoing sender, sender control means in said process control means operated upon completed transfer of data to said incoming register to connect said outgoing sender to said incoming register, said outgoing sender thereafter operated to send said data from said incoming register to said register-sender.

7. A translator for use in an automatic telephone system including register-senders, said translator including: incoming register means, process control means, signal receiving means in said translator for each register-sender, said signal receiving means operated to a mark condition upon a call initiation from said register-sender, allotter means in said translator to sequentially test said signal receiving means for a mark condition, first process means in said process control means responsive to said allotter test and receiving means mark condition to simultaneously return a proceed signal to said register-sender and condition said incoming register means to receive digital data from said register-sender via said signal receiving means, said incoming register means thereafter operated upon receipt of a plurality of digits to register said digits, a record means having recorded therein a plurality of sets of coded call rounting and control data items, readout means adapted to read said recorded data from said record means, first counter means arranged to indicate the address of said readout means in relation to said record means, coincidence detecting means, buffer register means, first counter gating means, last-digit gating means operated after receipt of the last one of said plurality of digits to pass said last digit to said process control means, first decoding means in said process control means operated upon receipt of said last digit to enable said first counter gating means to pass said first counter count to said buffer register means, circuit means comprising the connections of said buffer register means and said incoming register means to said coincidence means to operate said coincidence means to compare said data from said incoming register and said counter count, coincidence signal means in said coincidence means operated upon parity between said two sets of data to signal said process control means, control means in said process control means operated responsive to said signal to enable said readout means, said readout means thereby operated to transfer said appropriate coded call routing and control data items from said record means to said buffer register, other means thereafter operated to send said coded call routing and control data from said buffer register to said register-sender.

8. A translator for use in an automatic telephone system including register-senders, said translator including: incoming register means, process control means, signal receiving means in said translator for each register-sender, said signal receiving means operated to a mark condition upon a call initiation from said register-sender; allotter means in said translator to sequentially test said signal receiving means for a mark condition, first process means in said process control means responsive to said allotter test and receiving means mark condition to simultaneously, return a proceed signal to said register-sender and condition said incoming register means to receive digital data from said register-sender via said signal receiving means, said incoming register means thereafter operated upon receipt of a plurality of digits to register said digits, a record means having recorded therein a plurality of sets of coded call routing and control data items, readout means adapted to read said recorded data from said record means, first counter means arranged to indicate the address of said readout means in relation to said record means, coincidence detecting means, buffer register means, first counter gating means, last-digit gating means operated after receipt of the last one of said plurality of digits to pass said last digit to said process control means, first decoding means in said process control means operated upon receipt and analysis of said last digit as a directory number translation code to enable said first counter gating means to pass said first counter count to said buffer register means, circuits means comprising the connections of said buffer register means and said incoming register means to said coincidence means operated to compare said data from said incoming register and said counter count in said coincidence means, coincidence signal means in said coincidence means operated upon parity between said two sets of data to signal said process control means, control means in said process control means operated responsive to said signal to simultaneously enable said readout means and clear said buffer register and said incoming register of all data, said readout means thereby operated to transfer said appropriate coded call routing and control data items from said record means to said buffer register, transfer means thereafter operated to transfer said coded call routing and control data from said buffer register to said incoming register, an outgoing sender, sender control means in said process control means operated upon completed transfer of data to said incoming register to connect said outgoing sender to said incoming register, said incoming register and said outgoing sender thereafter operated to send said data to said register-sender.

9. Apparatus according to claim 8 in which said record means is a constantly moving endless magnetic band on the surface of which each set of recorded items is recorded in a plurality of four bit code items in a cross row, said band including two adjacent serial rows of 5000 cross rows, said first serial row including the odd thousand numbered sets and the second serial row including the even thousand numbered sets of a 10,000 item set.

10. Apparatus according to claim 8 in which said record means is a constantly revolving magnetic drum on the surface of which each set of recorded items is recorded in an axial row, said drum surface including a first and a second circumferential row of 5000 each said axial rows, said first circumferential row containing the odd thousand numbered sets and said second circumferential row containing the even thousand numbered sets of items.

11. A translator for use in an automatic telephone system including register-senders, said translator including: incoming register means, process control means, signal receiving means in said translator for each register-sender, said signal receiving means operated to a mark condition upon a call initiation from said register-sender, allotter means in said translator to sequentially test said signal receiving means for a mark condition, first process means in said process control means responsive to said allotter test and receiving means mark condition to simultaneously, return a proceed signal to said register-sender and condition said incoming register means to receive digital data from said register-sender via said signal receiving means, said incoming register means thereafter operated upon receipt of a plurality of digits to register said digits, a record means having recorded therein a plurality of sets of coded call routing and control data items, readout means adapted to read said recorded data from said record means, first counter means arranged to indicate the address of said readout means in relation to said record means, coincidence detecting means, buffer register means, first counter gating means, last-digit gating means operated after receipt of the last one of said plurality of digits to pass said last digit to said process control means, second counter means arranged to indicate the directory line number corresponding to the record means data, first decoding means in said process control means operated upon receipt and analysis of said last digit as a line number translation code to enable said readout means, and transfer said second counter means count to a first part of said buffer register means, said readout means thereby operated to continuously transfer said coded call routing and control data items to a second part of said buffer register means, circuit means comprising the connections of said buffer register means and said incoming register means to said coincidence means operated to compare said data from said incoming register with said data from said buffer register means, coincidence sginal means in said coincidence means operated upon parity between said two sets of data to signal said process control means, second control means in said process control means operated responsive to said signal to simultaneously clear said incoming register and said second part of said buffer register means, transfer means thereafter operated to transfer said second counters count as registered in said first part of said buffer register into said incoming register, an outgoing sender, sender control means in said process control means operated upon completed transfer of data to said incoming register to connect said outgoing sender to said incoming register, said incoming register and said outgoing sender thereafter operated to send said data to said register-sender.

12. Apparatus according to claim 11 in which said second counter means is arranged to indicate the directory line number corresponding to the record means data, first decoding means in said process control means operated upon receipt and analysis of said last digit as a line number translation code to enable said readout means, and transfer said second counter means count to a first part of said buffer register means, said readout means thereby operated to continuously transfer said coded call routing and control data items to a second part of said buffer register means, circuit means comprising the connections of said buffer register means and said incoming register means to said coincidence means operated to compare said data from said incoming register with said data from said buffer register means, coincidence signal means in said coincidence means operated upon parity between said two sets of data to signal said process control means, second control means in said process control means operated responsive to said signal to simultaneously clear said incoming register and said second part of said buffer register means, transfer means thereafter operated to transfer said second counters count as registered in said first part of said buffer register into said incoming register.

13. A translator for use in an automatic telephone system including register-senders, and arranged to provide routing information upon receipt of directory numbers or to provide the directory number upon receipt of the equipment number, said translator including; incoming register means, process control means, signal receiving means in said translator for each register-sender, said signal receiving means operated to a mark condition upon a call initiation from said register-sender; allotter means in said translator to sequentially test said signal receiving means for a mark condition, first process means in said process control means responsive to said allotter test and receiving means mark condition to simultaneously, return a proceed signal to said register-sender and condition said incoming register means to receive digital data from said register-sender via said signal receiving means, said incoming register means thereafter operated upon receipt of a plurality of digits to register said digits, a constantly rotating magnetic drum record means having recorded therein a plurality of sets of binary coded decimal call routing and control data items, readout means adapted to read said recorded data from said record means, first counter means arranged to indicate the address of said readout means relative to said record means in a binary coded decimal code count, second counter means arranged to indicate the directory line number corresponding to the record means data in a binary coded decimal code count, coincidence detecting means, buffer register means, first counter gating means, last-digit gating means operated after receipt of the last one of said plurality of digits to pass said last digit to said process control means, first decoding means in said process control means operated upon receipt and analysis of said last digit as a directory number translation code to enable said first counter gating means to pass said first counter count to said buffer register means, and upon analysis of said last digit as a line number translation code to enable said readout means, and transfer said second counter means count to a first part of said buffer register means, said readout means thereby operated to continuously transfer said coded call routing and control data items to a second part of said buffer register means, first circuit means comprising the connections of said buffer register means and said incoming register means to said coincidence means operated to compare said data from said incoming register and said counter count in said coincidence means, second circuit means comprising the connections of said buffer register means and said incoming register means to said coincidence means operated to compare said data from said incoming register with said data from said buffer register means, coincidence signal means in said coincidence means operated upon parity between any of said two sets of data to signal said process control means, first control means in said process control means operated responsive to said signal to simultaneously enable said readout means and clear said buffer register and said incoming register of all data, said readout means thereby operated to transfer said appropriate coded call routing and control data items from said record means to said buffer register, transfer means thereafter operated to transfer said coded call routing and control data from said buffer register to said incoming register, second control means in said process control means operated responsive to said signal to simultaneously clear said incoming register and said second part of said buffer register means, transfer means thereafter operated to transfer said second counters count as registered in said first part of said buffer register into said incoming register, an outgoing sender, sender control means in said process control means operated upon completed transfer of data to said incoming register to connect said outgoing sender to said incoming register, said incoming register and said outgoing sender thereafter operated to send said data to said register-sender.

14. A translator for use in an automatic telephone system including register-senders, and arranged to provide routing information upon receipt of any one of 10,000 directory numbers or to provide the directory number upon receipt of the equipment number, said translator including: incoming register means, process control means, signal receiving means in said translator for each register-sender, said signal receiving means operated to a mark condition upon a call initiation from said register-sender; allotter means in said translator to sequentially test said signal receiving means for a mark condition, first process means in said process control means responsive to said allotter test and receiving means mark condition to simultaneously, return a proceed signal to said register-sender and condition said incoming register means to receive digital data from said register-sender via said signal receiving means, said incoming register means thereafter operated upon receipt of a plurality of digits to register said digits, a constantly rotating magnetic drum record means having recorded therein a plurality of sets of binary coded decimal call routing and control data items, each set of said recorded items recorded in an axial row, said drum surface including a first and a second circumferential row of 5000 of said axial rows, said first circumferential row containing the odd thousand numbered sets and said second circumferential row containing the even thousand numbered sets of recorded items, readout means adapted to read said recorded data from said first circumferential row or from said second circumferential row of said record means, first counter means arranged to indicate the address of said readout means relative to said record means in a binary coded decimal code count, second counter means arranged to indicate the directory line number corresponding to the record means data in a binary coded decimal code count, said first and second counter means arranged to count from 1 to 5000, coincidence detecting means, buffer register means, first counter gating means, last-digit gating means operated after receipt of the last one of said plurality of digits to pass said last digit to said process control means, thousands digit determining means in said process control means, first decoding means in said process control means operated upon receipt and analysis of said last digit as a directory number translation code to enable said first counter gating means to pass said first counter count to said buffer register means and to enable said thousands digit determining means, said thousands digit determining means operated in response to said enabling to test said incoming register thousands digit for even or odd thousands group content, said first decoding means upon analysis of said last digit as a line number translation code operated to enable said readout means, and transfer said second counter means count to a first part of said buffer register means, said readout means thereby operated to continuously transfer said coded call routing and control data items to a second part of said buffer register means, first circuit means comprising the connections of said buffer register means and said incoming register means to said coincidence means operated to compare said data from said incoming register and said counter count in said coincidence means, second circuit means comprising the connections of said buffer register means and said incoming register means to said coincidence means operated to compare said data from said incoming register with said data from said buffer register means, coincidence signal means in said coincidence means operated upon parity between any of said two sets of data to signal said process control means, first control means in said process control means operated responsive to said signal to clear said buffer register and said incoming register of all data and simultaneously enable in cooperation with said thousands digit determining means the correct row of said readout means, said readout means thereby operated to transfer said appropriate coded call routing and control data items from said selected circumferential row of said record means to said buffer register, transfer means thereafter operated to transfer said coded call routing and control data from said buffer register to said incoming register, second control means in said process control means operated responsive to said signal to simultaneously clear said incoming register and said second part of said buffer register means, transfer means thereafter operated to transfer said second counters count as registered in said first part of said buffer register into said incoming register, an outgoing sender, sender control means in said process control means operated upon completed transfer of data to said incoming register to connect said outgoing sender to said incoming register, said incoming register and said outgoing sender thereafter operated to send said data to said register-sender.

15. A translator for use in an automatic telephone system including register-senders, and arranged to provide routing information upon receipt of any one of 10,000 directory numbers or to provide the directory number upon receipt of the equipment number, said translator including: incoming register means, process control means, signal receiving means in said translator for each register-sender, said signal receiving means operated to a mark condition upon a call initiation from said register-sender; allotter means in said translator to sequentially test said signal receiving means for a mark condition, first process means in said process control means responsive to said allotter test and receiving means mark condition to simultaneously, return a proceed signal to said register-sender and condition said incoming register means to receive digital data from said register-sender via said signal receiving means, said incoming register means thereafter operated upon receipt of a plurality of digits to register said digits, a constantly rotating magnetic drum record means having recorded therein a plurality of sets of binary coded decimal call routing and control data items, each set of said recorded items recorded in an axial row, said drum surface including a first and a second circumferential row of 5000 of said axial rows, said first circumferential row containing the odd thousand numbered sets and said second circumferential row containing the even thousand numbered sets of recorded items, readout means adapted to read said recorded data from said first circumferential row or from said second circumferential row of said record means, first counter means arranged to indicate the address of said readout means relative to said record means in a binary coded decimal code count, second counter means arranged to indicate the directory line number corresponding to the record means data in a binary coded decimal code count, said first and second counter means arranged to count from 1 to 5000, coincidence detecting means, buffer register means, first counter gating means, last-digit gating means operated after receipt of the last one of said plurality of digits to pass said last digit to said process control means, thousands digit determining means in said process control means, first decoding means in said process control means operated upon receipt and analysis of said last digit as a directory number translation code to enable said first counter gating means to pass said first counter count to said buffer register means and to enable said thousands digit determining means, said thousands digit determining means operated in response to said enabling to test said incoming register thousands digit for even or odd thousands group content, said first decoding means upon analysis of said last digit as a line number translation code operated to enable said readout means under control of said thousands digit determining means, and transfer said second counter means count to a first part of said buffer register means, said readout means thereby operated to continuously transfer said coded call routing and control data items first from said odd circumferential row then from said even circumferential row of said record means to a second part of said buffer register means, first circuit means comprising the connections of said buffer register means and said incoming register means to said coincidence means operated to compare said data from said incoming register and said counter count in said coincidence means, second circuit means comprising the connections of said buffer register means and said incoming register means to said coincidence means operated to compare said data from said incoming register with said data from said buffer register means, coincidence signal means in said coincidence means operated upon parity between any of said two sets of data to signal said process control means, first control means in said process control means operated responsive to said signal to clear said buffer register and said incoming register of all data and simultaneously enable in cooperation with said thousands digit determining means the correct row of said readout means, said readout means thereby operated to transfer said appropriate coded call routing and control data items from said selected circumferential row of said record means to said buffer register, transfer means thereafter operated to transfer said coded call routing and control data from said buffer register to said incoming register, second control means in said process control means operated responsive to said signal during a line number translation to simultaneously clear said incoming register and said second part of said buffer register means, thousands digit decoding means, said decoding means operated under control of said second counter thousands count and said thousands digit determining means to decode said thousands digit, transfer means thereafter operated to transfer said second counters count as registered in said first part of said buffer register and as decoded by said decoding means into said incoming register, an outgoing sender including a pulsing means, sender control means in said process control means operated upon completed transfer of data to said incoming register to connect said outgoing sender to said incoming register, said incoming register thereafter pulsed by said pulsing means to transfer said registered data to said outgoing sender, said outgoing sender thereby operated to send said data to said register-sender.

16. Apparatus according to claim 15 including a means for verifying said record means output comprising; a plurality of access keys, said access keys manually set to the directory number to be verified, a manually operated service request key, a plurality of lamps corresponding to each bit of a set of data, a manual access register, said access register operated to register the directory number set by said access keys, said allotter means and said first process means operated in response to said service request key operation to enable said sender pulsing means, said manual access register and said first monitor control means in said process control means operated to disable said outgoing sender, said manual access register operated by said pulsing means to transfer said keyed manual access register information to said incoming register, said translator thereafter operated to provide a directory number translation to said access register, and second monitor control means operated thereafter to transfer said access register stored information to said plurality of lamps for visual observation.

17. Apparatus according to claim 15 including a means for verifying said second counter means output comprising; a plurality of access keys, said access keys set to the equipment number to be verified; a manually operated service request key, a plurality of lamps corresponding to each bit of a set of data, a manual access register, said access register operated to register the equipment number set by said access keys, said allotter means and said first process means operated in response to said service request key operation to enable said sender pulsing means, said manual access register and said first monitor control means in said process control means operated to disable said outgoing sender, said manual access register operated by said pulsing means to transfer said keyed manual access register information to said incoming register, said translator thereafter operated to provide a line number translation to said access register, and second monitor control means operated thereafter to transfer said access register stored information to said plurality of lamps for visual observation.

18. Apparatus according to claim 15 including a means for writing onto said record means comprising; a plurality of access keys, said access keys manually set to the directory number for which data is to be recorded, a plurality of write keys, said write keys set to the data to be recorded on said record means, a corresponding plurality of write signal amplifier means, said amplifier means output directly connected to said readout means, a manually operated service request key, an even or odd record section readout means connect key, said connect key operated to the position corresponding to the location to be written onto, a plurality of lamps corresponding to each bit of a set of data, a manual access register, said access register operated to register the directory number set by said access keys, said allotter means and said first process means operated in response to said service request key operation to enable said sender pulsing means, said manual access register and said first monitor control means in said process control means operated to disable said outgoing sender, said manual access register operated by said pulsing means to transfer said keyed manual access register information to said incoming register, said translator thereafter upon operation to a directory number coincidence to control said write amplifiers to write onto said record means, other means in said process control means operated after said write operation to cycle said translator to provide a directory number translation to said access register for the written data, and second monitor control means operated thereafter to transfer said access register stored information to said plurality of lamps for visual observation and verification.

References Cited by the Examiner

UNITED STATES PATENTS 3,055,983 9/1962 Baker ............... 179—18

KATHLEEN H. CLAFFY, *Primary Examiner.*

WILLIAM C. COOPER, *Examiner.*